Sept. 16, 1958 D. McL. FROTHINGHAM 2,852,764
DATA CONVERSION SYSTEM
Filed June 25, 1953 22 Sheets-Sheet 1

Sept. 16, 1958

D. McL. FROTHINGHAM 2,852,764

DATA CONVERSION SYSTEM

Filed June 25, 1953

Sept. 16, 1958  D. McL. FROTHINGHAM  2,852,764
DATA CONVERSION SYSTEM
Filed June 25, 1953  22 Sheets-Sheet 3
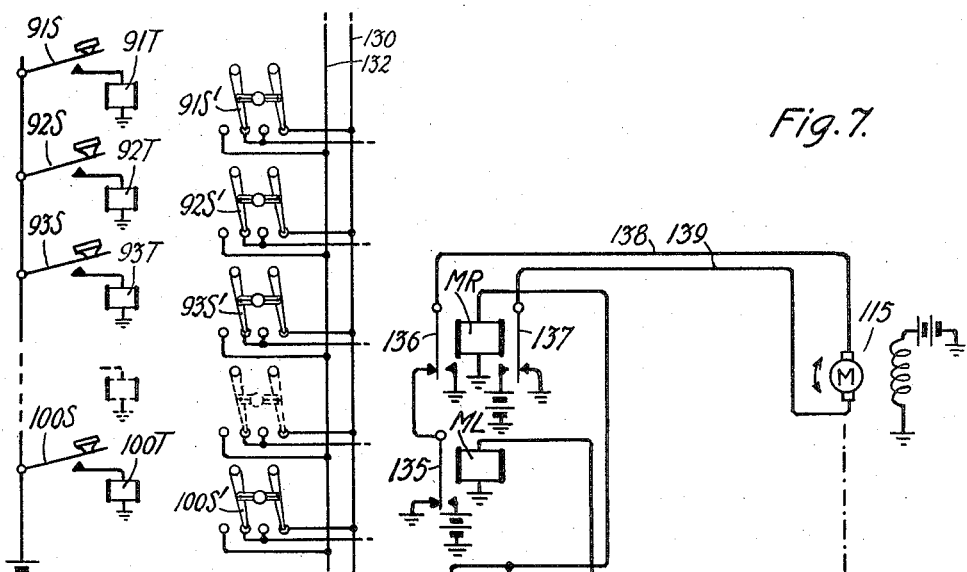
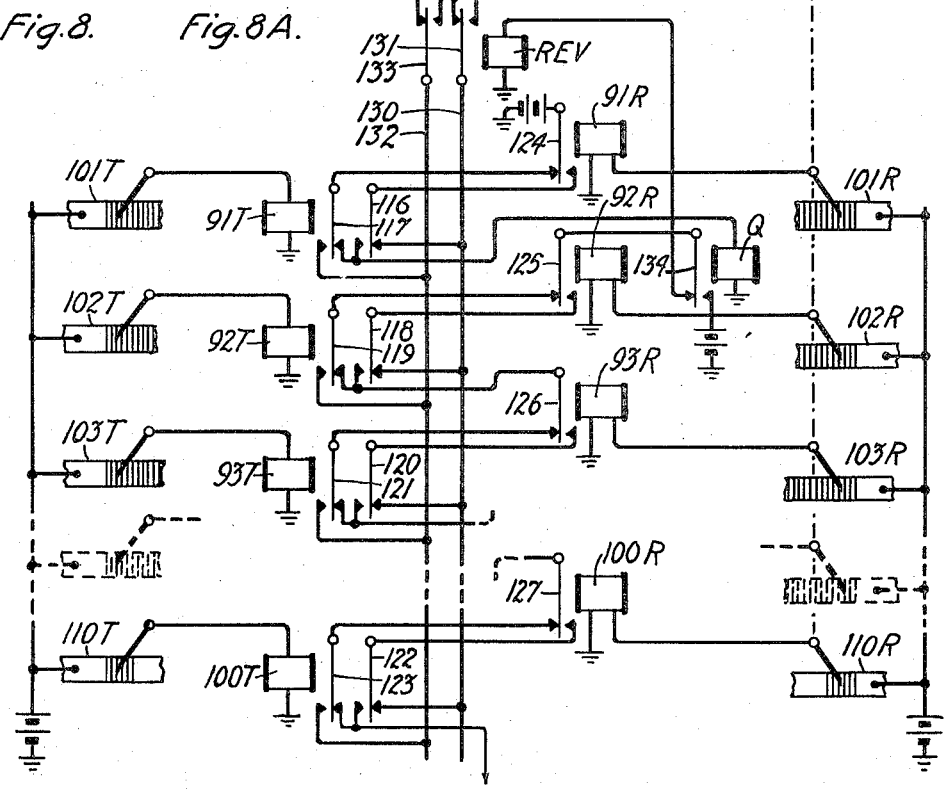

Sept. 16, 1958   D. McL. FROTHINGHAM   2,852,764
DATA CONVERSION SYSTEM
Filed June 25, 1953   22 Sheets-Sheet 4
Fig. 9.
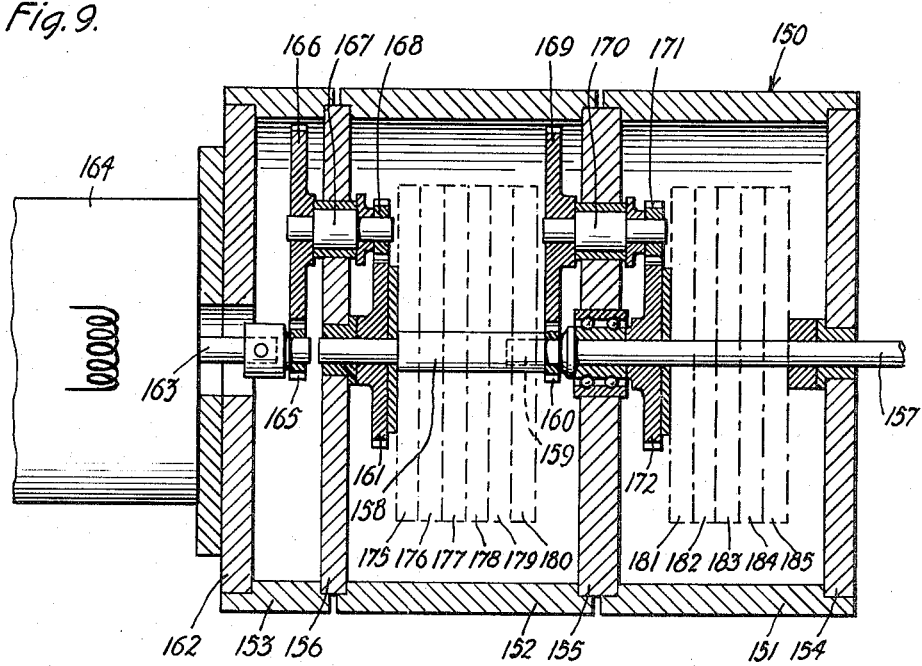
Fig. 10.
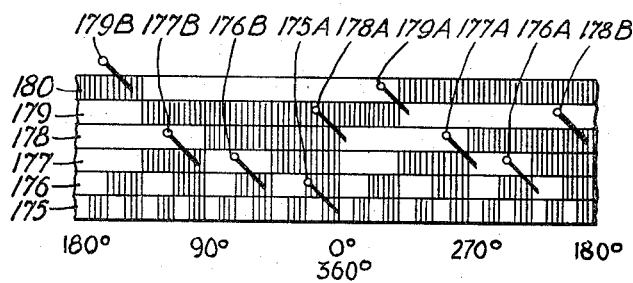
Fig. 11.
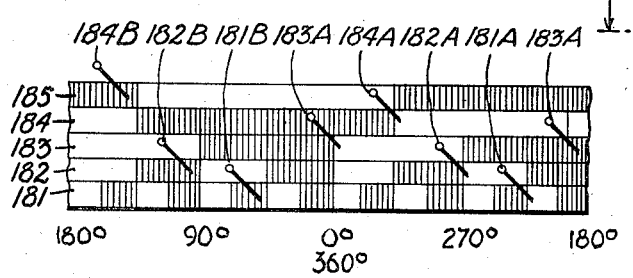
Fig. 12.
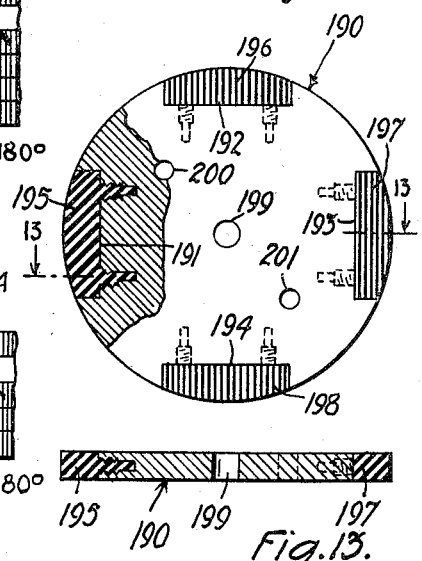
Fig. 13.

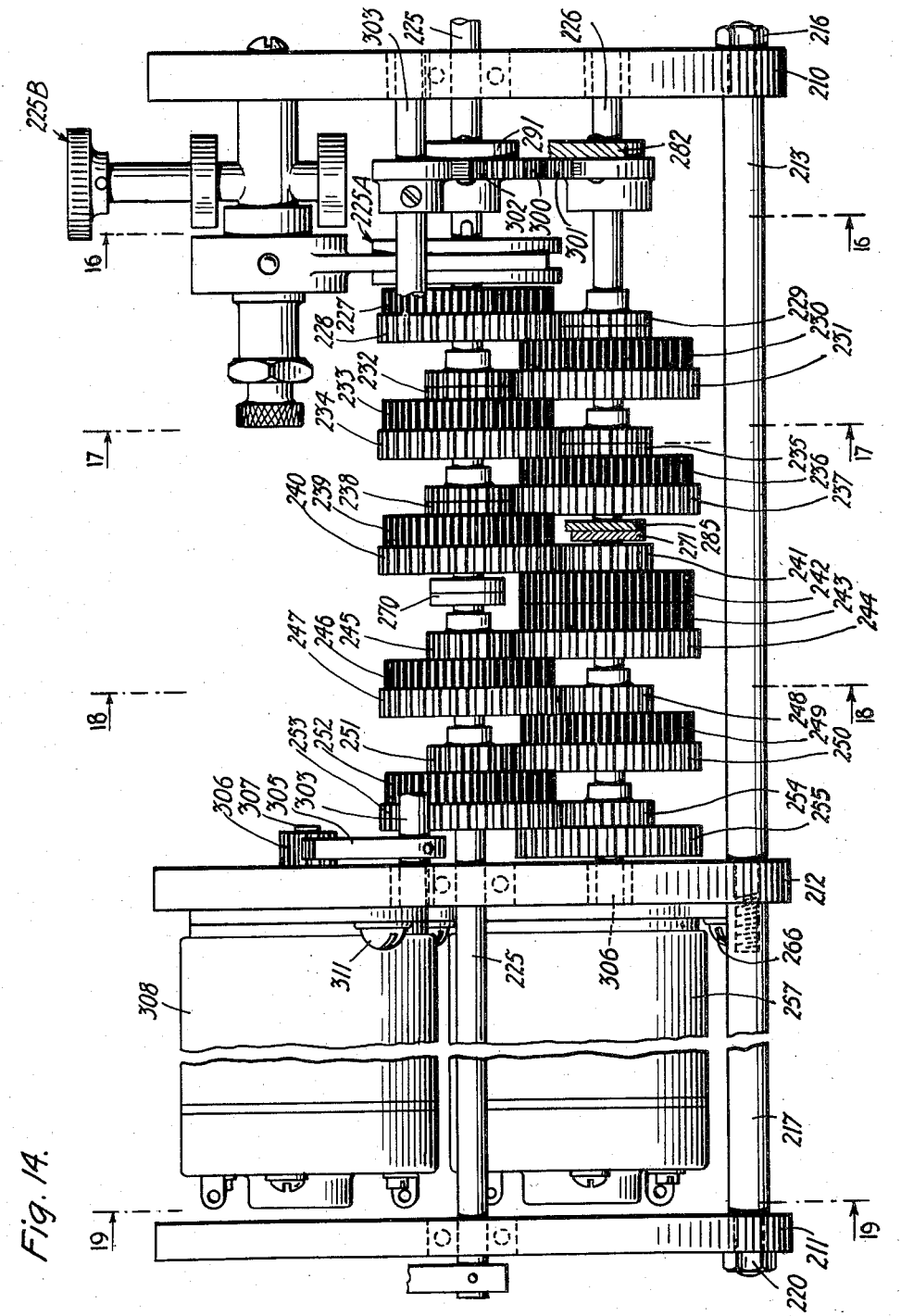

Sept. 16, 1958     D. McL. FROTHINGHAM     2,852,764
DATA CONVERSION SYSTEM

Filed June 25, 1953                         22 Sheets-Sheet 7

Sept. 16, 1958     D. McL. FROTHINGHAM     2,852,764
DATA CONVERSION SYSTEM

Filed June 25, 1953     22 Sheets-Sheet 8

Sept. 16, 1958  D. McL. FROTHINGHAM  2,852,764
DATA CONVERSION SYSTEM
Filed June 25, 1953  22 Sheets-Sheet 9

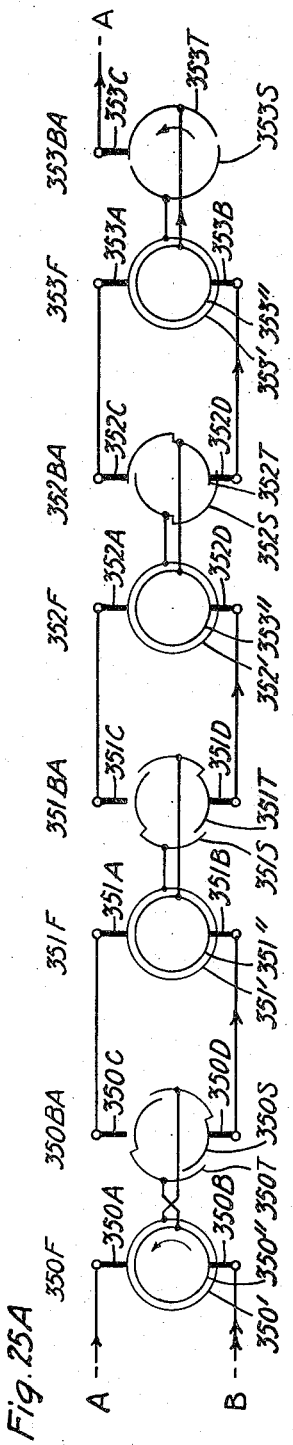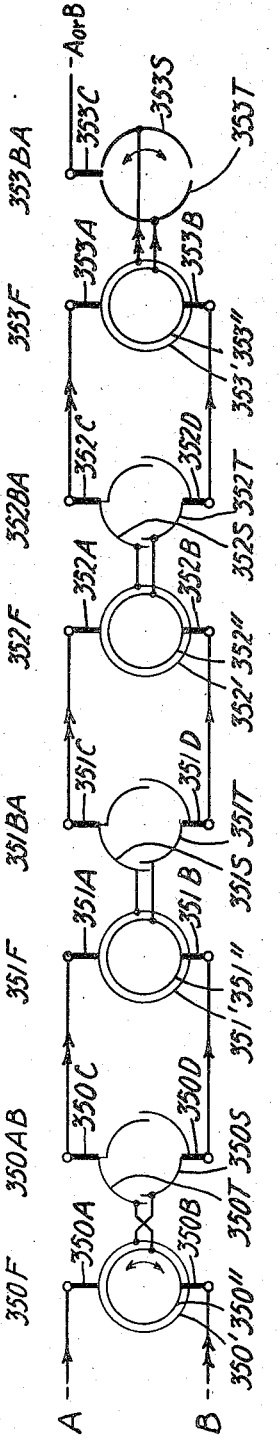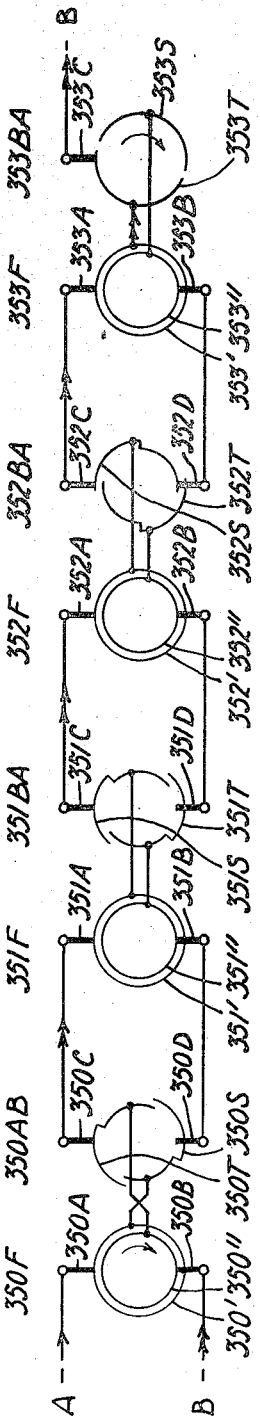

Sept. 16, 1958   D. McL. FROTHINGHAM   2,852,764
DATA CONVERSION SYSTEM
Filed June 25, 1953   22 Sheets-Sheet 12

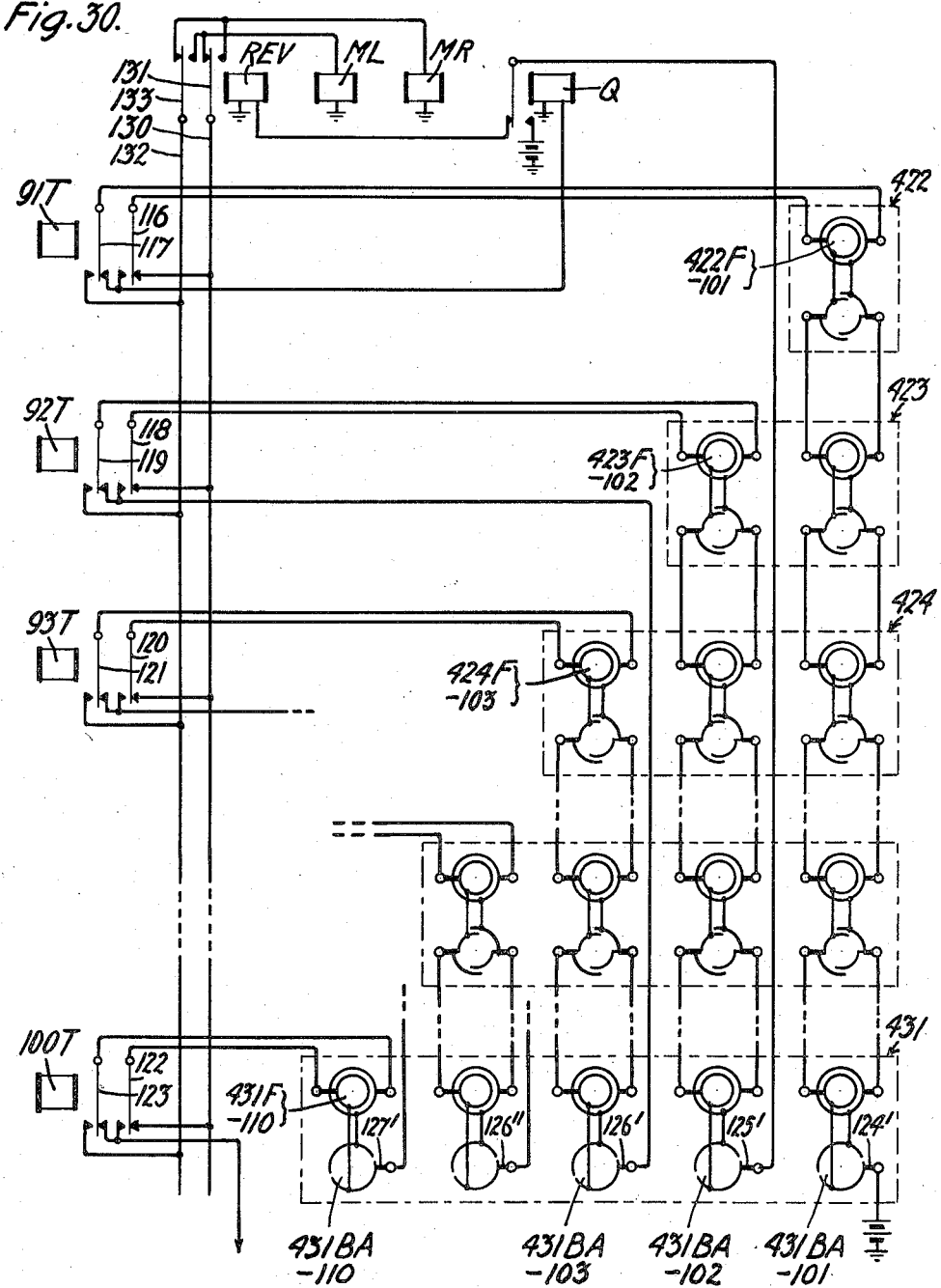

Sept. 16, 1958        D. McL. FROTHINGHAM        2,852,764
DATA CONVERSION SYSTEM
Filed June 25, 1953        22 Sheets-Sheet 15

Sept. 16, 1958   D. McL. FROTHINGHAM   2,852,764
DATA CONVERSION SYSTEM
Filed June 25, 1953   22 Sheets-Sheet 16

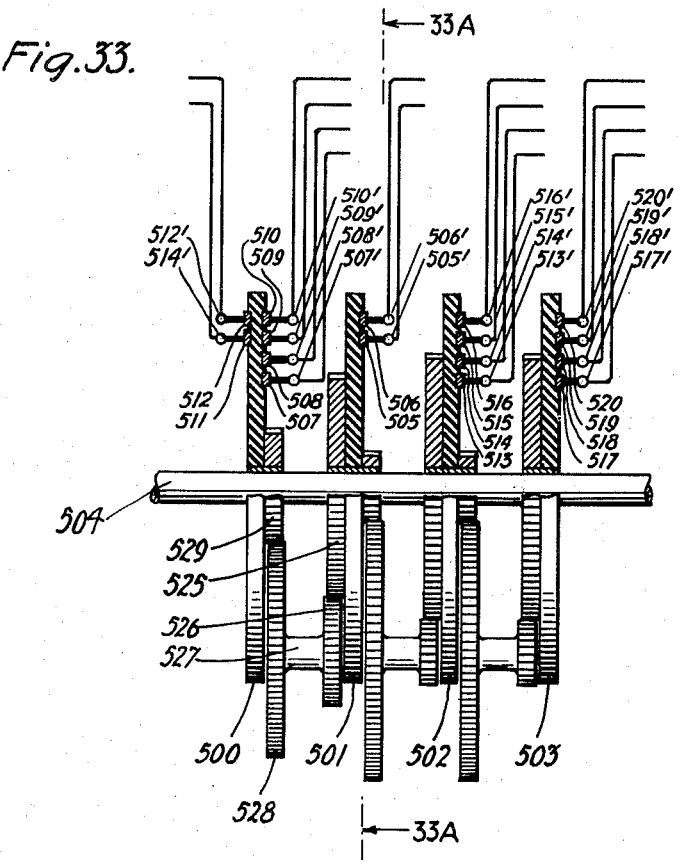
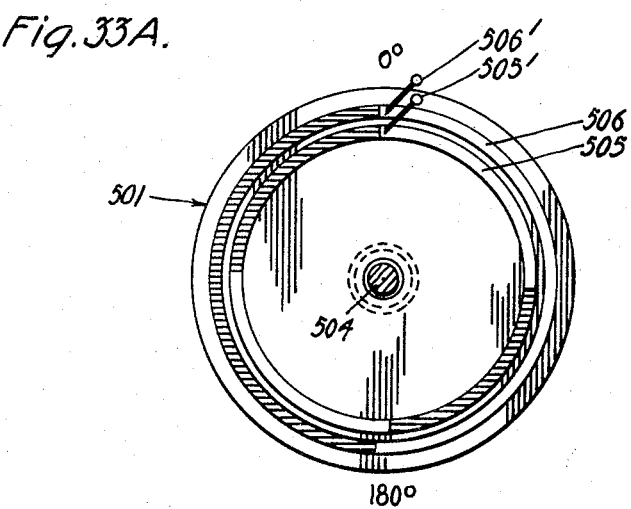

Sept. 16, 1958  D. McL. FROTHINGHAM  2,852,764
DATA CONVERSION SYSTEM
Filed June 25, 1953  22 Sheets-Sheet 18
Fig. 34.
Fig. 35.
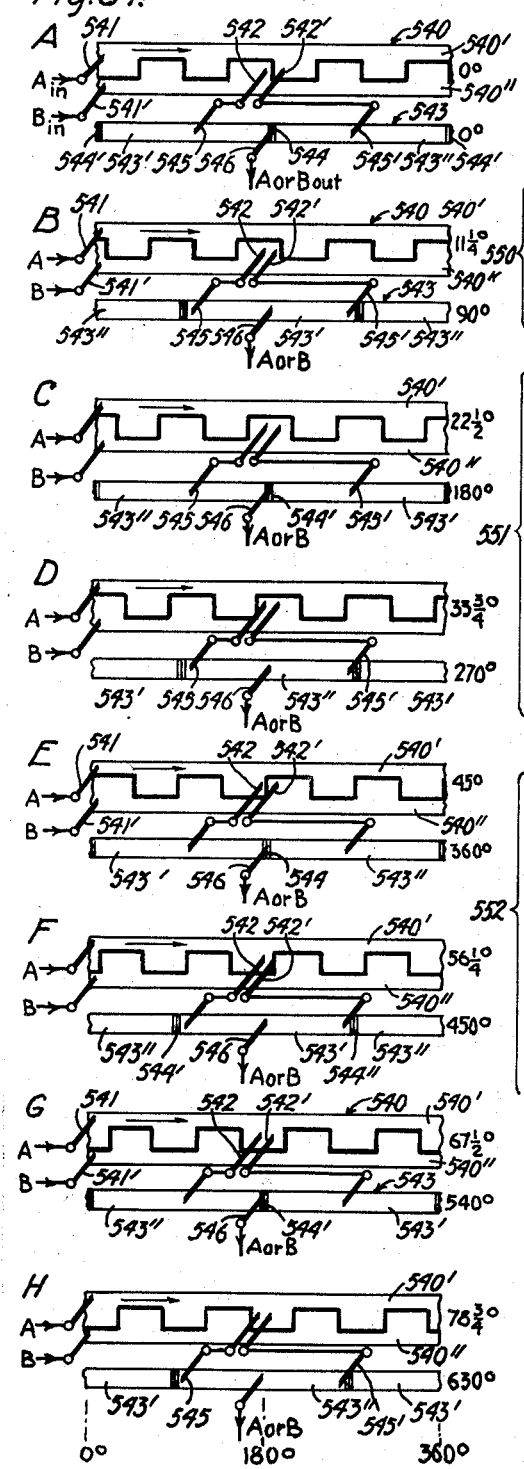
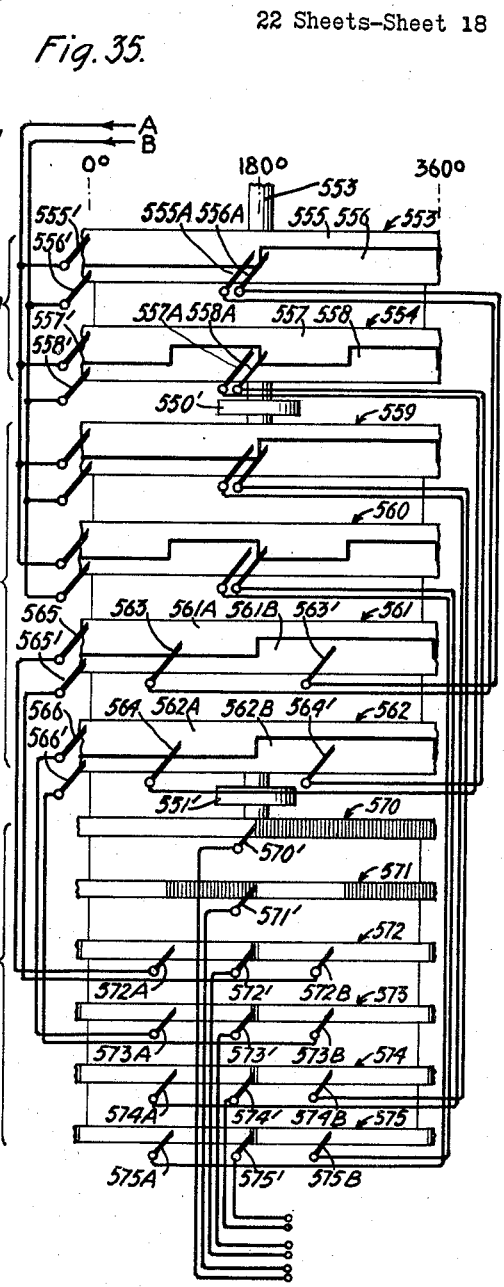

Sept. 16, 1958     D. McL. FROTHINGHAM     2,852,764
DATA CONVERSION SYSTEM
Filed June 25, 1953     22 Sheets-Sheet 19
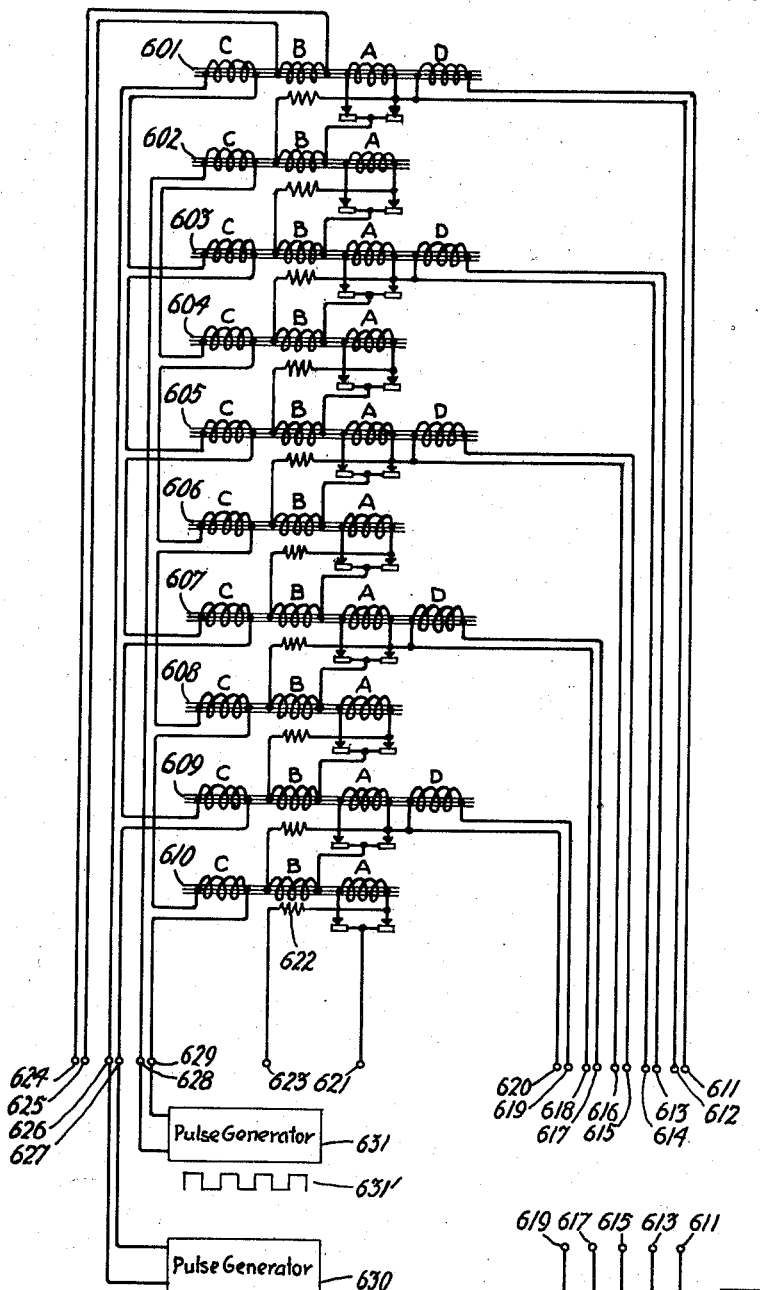
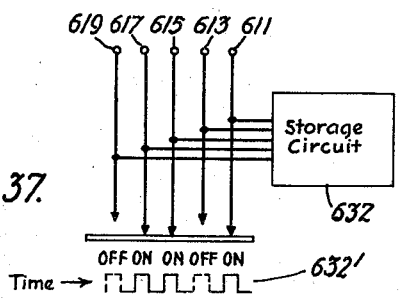

Sept. 16, 1958
D. McL. FROTHINGHAM
2,852,764
DATA CONVERSION SYSTEM
Filed June 25, 1953
22 Sheets-Sheet 20
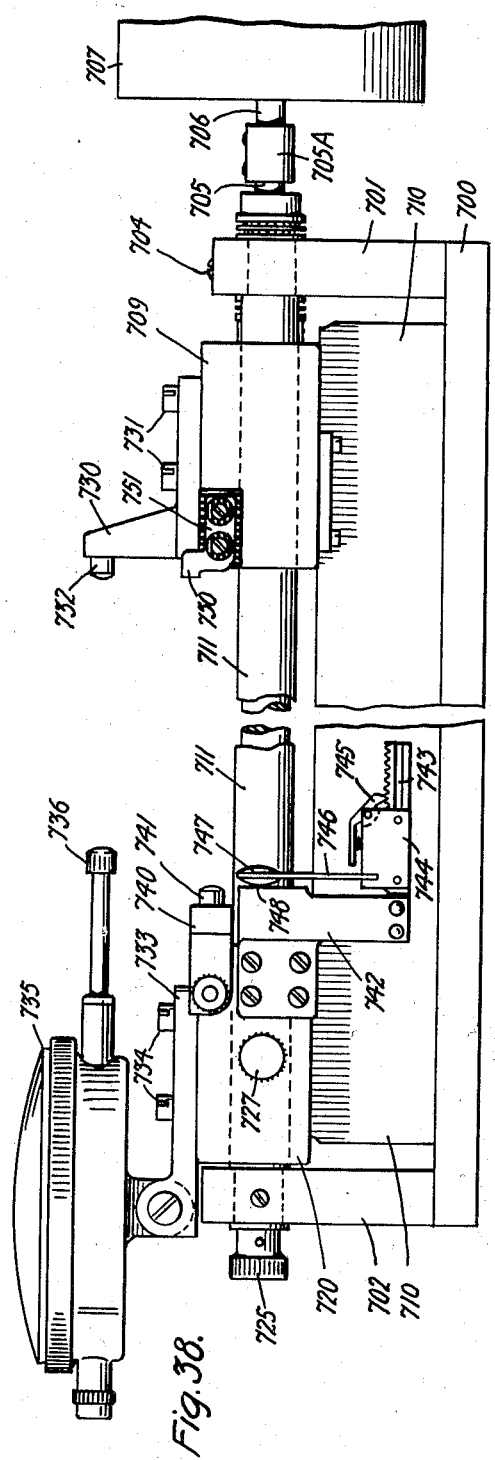
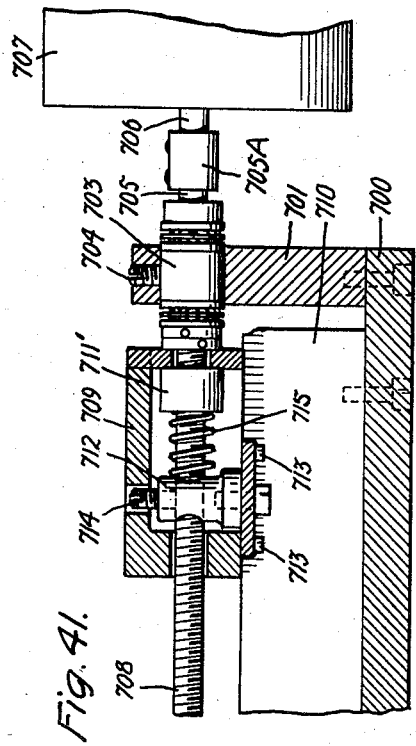
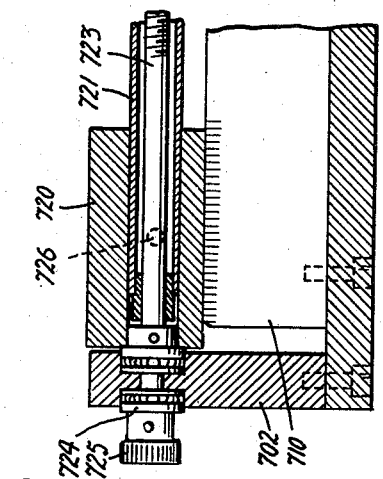

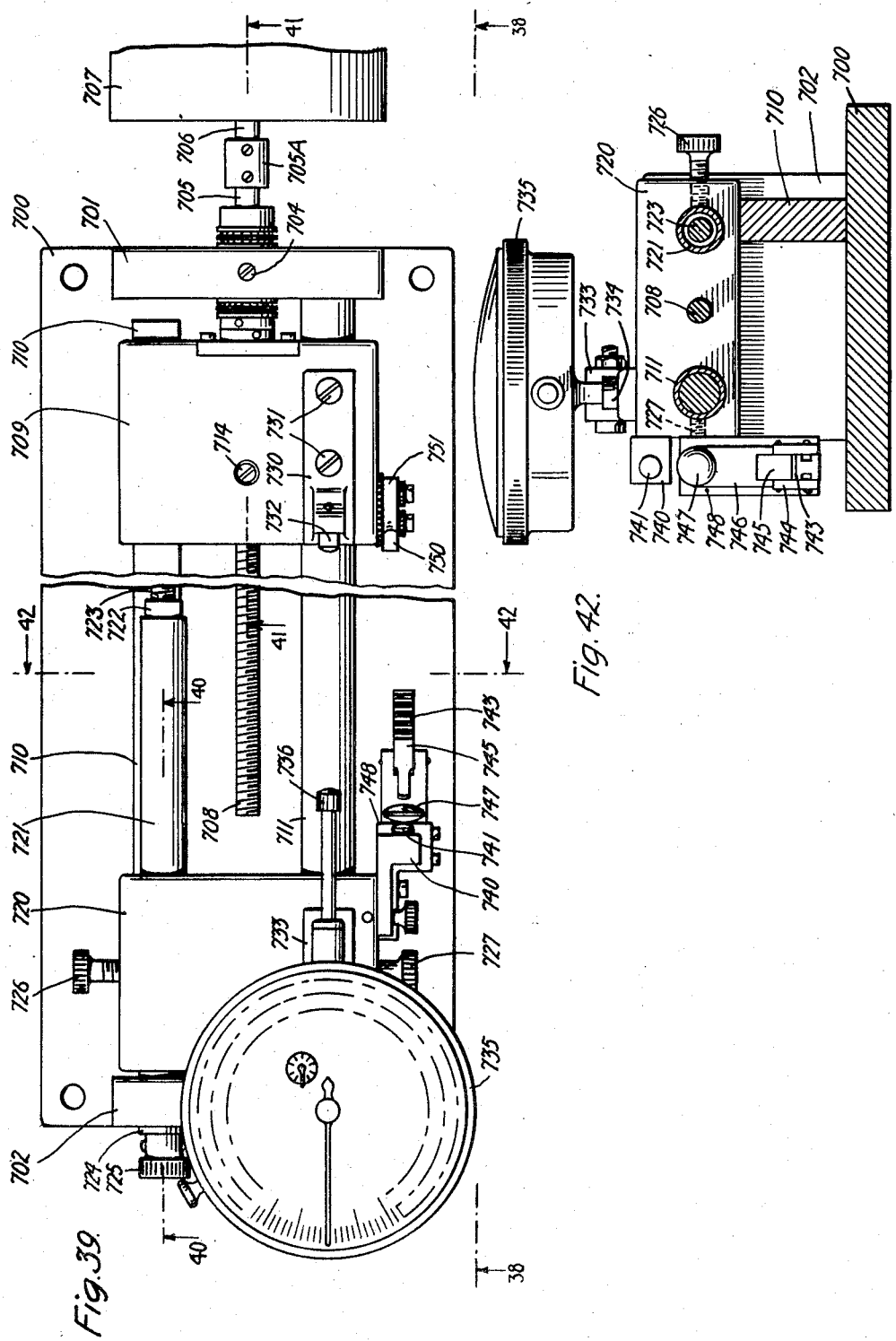

United States Patent Office 2,852,764
Patented Sept. 16, 1958

2,852,764

DATA CONVERSION SYSTEM

Donald McL. Frothingham, Darien, Conn., assignor, by mesne assignments, to Barnes Engineering Company, Stamford, Conn., a corporation of Delaware Application June 25, 1953, Serial No. 364,098

16 Claims. (Cl. 340—204)

The present invention relates to electrically represented data conversion systems and more particularly to a conversion system responsive to input data to produce output data which bears a desired relationship thereto.

Various means have heretofore been suggested for the conversion of information from analog form to digital form, the electrical transmission of the information in the digital form and the reconversion of the information to the analog form. Systems for performing these operations have generally been very complicated and have required relatively expensive equipment. It has also been difficult to achieve satisfactory correspondence between the input and the output analog information.

A principal object of the present invention has been to provide novel and improved means for efficiently and accurately converting information from analog to digital form, transmitting the information in digital form, and reconverting the information from digital to analog form.

More particularly, it has been an object of the invention to provide novel and improved means for converting angular position of a shaft into electrical impulses in binary digital form, to transmit the impulses and to reconvert the transmitted impulses into angular position of a receiving shaft.

Another object of the invention has been to provide novel and improved means for translating electrical impulses in binary digital form into a corresponding angular disposition of a shaft.

Still another object of the invention has been to provide novel and improved means for translating the angular disposition of a shaft into electrical impulses in binary digital form.

A further object of the invention has been to provide novel and improved means for axially positioning a lead screw or elements driven therefrom in accordance with rotational information provided by electrical impulses in binary digital form.

Another object of the invention has been to provide novel and improved means for providing information in the form of electrical impulses representative of the axial displacement of a lead screw or elements driven therefrom.

A feature of the invention has been the provision of apparatus for comparing electrical impulses in binary digital form derived from a plurality of sources and for producing a control indication adapted to operate on one or more of the sources to reduce the divergence between the electrical impulses derived therefrom and the electrical impulses derived from another of the sources to a predetermined value.

Another feature of the invention has been the provision of apparatus for eliminating ambiguity in the conversion of information between analog form and binary digital form.

Still another feature of the invention has been the provision of manually operable means for controlling the apparatus adapted to transmit electrical positional information in binary digital form.

Other and further objects, features and advantages of the invention will appear from the following description.

The data conversion system, in accordance with the invention, comprises a rotatable element, means for producing a first plurality of electrical indications in unique combinations each representative of a desired discrete angular disposition of the rotatable element, a transducer associated with the rotatable element for generating a second plurality of electrical indications in unique combinations each representative of a discrete angular disposition of the rotatable element, means for comparing the first and second electrical indications, for sensing differences in the combinations thereof and for providing energy for rotating the rotatable element until the electrical indication generated by the transducer matches the electrical indication produced by the first mentioned means. Also in accordance with the invention, the transducer associated with the rotatable element and which is adapted to provide a plurality of electrical impulses in unique combinations each representative, in binary digital code, of a discrete angular disposition of the rotatable element, comprises a plurality of sensing elements, each operatively coupled to the rotatable element for rotation in predetermined manner relative thereto and each arranged to control a respective electrical circuit to provide an indication of respective arcs of angular disposition of the rotatable element, each of the sensing elements providing a respectively different number of control operations on the associated electrical circuit for a predetermined arc of rotation of the rotatable element whereby the conditions of the electrical circuits provide an indication in binary digital code of the angular disposition of the rotatable element.

The invention will now be described in greater detail with reference to the appended drawings in which:

Fig. 7 is a wiring diagram illustrating an improved comparing and control circuit in accordance with the invention;

Fig. 8 illustrates a modification of a portion of the circuit of Fig. 7;

Fig. 8A illustrates another modification of a portion of the circuit of Fig. 7;

Fig. 9 is a cross-sectional view illustrating the construction of a suitable transmitting or receiving transducer in accordance with the invention;

Fig. 10 is a view of one group of code wheels of Fig. 9 in developed form;

Fig. 11 is a view of another group of code wheels of Fig. 9 in developed form;

Fig. 12 is a side view of a code wheel suitable for use in the structure of Fig. 9 and with a portion of the surface broken away to illustrate the construction of the code wheel;

Fig. 13 is a cross-sectional view taken along the line 13—13 of Fig. 12;

Fig. 14 is an elevational view of another type of transducer constructed in accordance with the invention, and may be considered as taken along the line 14—14 of Fig. 16;

Figs. 25, 25A and 25B illustrate the transducer of Fig. 24 in still other rotational positions thereof.

Fig. 30 is a schematic illustration of a circuit arrangement similar to the one shown in Fig. 7 but employing code wheels of the type shown in Figs. 24 and 25, certain portions of the circuit of Fig. 30 which correspond exactly to like portions of Fig. 7 being omitted;

Fig. 33 is a schematic view illustrating another form of transducer constructed in accordance with the invention;

Fig. 33A is an elevational view of one of the code wheels of Fig. 33 and is taken along the line 33A—33A of Fig. 33;

Figs. 34A through 34H illustrate various positions of two code wheels forming another type of transducer constructed in accordance with the invention;

Fig. 35 is a schematic illustration of a transducer embodying the principles of Figs. 34A–H;

Fig. 36 is a circuit diagram of a magnetic storage system for converting time parallel impulses into time series impulses;

Fig. 37 is a diagram illustrating the operation of Fig. 36;

Fig. 38 is a side elevational view of a measuring and positioning unit constructed in accordance with the invention;

Fig. 39 is a plan view of the measuring and positioning unit of Fig. 38;

Fig. 40 is a cross-sectional view taken along the line 40—40 of Fig. 39;

Fig. 41 is a cross-sectional view taken along the line 41—41 of Fig. 39;

Fig. 42 is a cross-sectional view taken along the line 42—42 of Fig. 39; and

Figure 1:
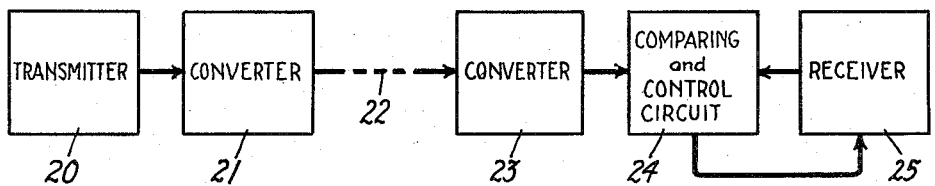
Fig. 1 is a block diagram illustrating a system, in accordance with the invention, for deriving and transmitting positional information in binary digital form and for controlling the position of a shaft at the receiving end of the system.

Referring now to the drawings, and more particularly to Fig. 1, the system comprises a transmitting transducer unit 20, the output of which consists of electrical impulses in binary digital or pulse-code form, a converter unit 21 which serves to convert the time parallel pulses from the unit 20 into time series or sequential pulses for delivery to a radio link, wire line or other communication channel 22, a second converter unit 23, which receives the time series pulses from the link 22 and delivers the same in time parallel to a comparing and control circuit 24. The circuit 24 also receives time parallel pulse code signals from a receiving transducer unit 25. The pulse code outputs of the transducers 20 and 25 represent in binary digital code the angular positions of a shaft or other rotatable element within the respective transducer units. The circuit 24 compares the pulse codes from the transducers 20 and 25 and produces an error signal which is delivered to the receiving transducer 25 in a sense to adjust the angular position of the shaft of the unit 25 into coincidence with the shaft of the unit 20.

Figure 2:
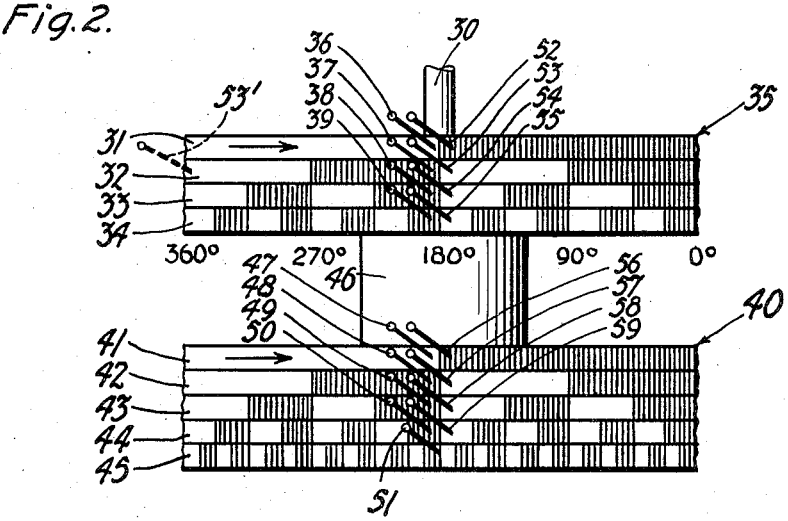
Fig. 2 is a schematic illustration in developed form of a transducer constructed in accordance with the invention.

A simple form of transducer unit for providing a pulse code indication of shaft angular position is illustrated in Fig. 2. In this figure, a shaft 30 has mounted thereon four code wheels or disks 31, 32, 33 and 34, forming a code wheel group designated generally at 35. For convenience, the code wheels 31—34 have been illustrated in developed form so that the illustration of each wheel represents 360° of the peripheral surface thereof. The code wheels 31—34 are arranged to rotate together and may, if desired, be made as integral unit for mounting on the shaft 30. It will be observed that the periphery of code wheel 31 is divided into two segments, an electrically conductive segment represented by the unshaded area and a non-conductive segment represented by the shaded area. The code wheel 32 is divided into four equal segments, two of which are conductive and two non-conductive. The code wheel 33 is divided into eight equal segments, four of which are conductive and four non-conductive, while the code wheel 34 is divided into sixteen equal segments, eight of which are conductive and eight of which are non-conductive.

Each of the code wheels 31—34 is provided with a brush 36–39, respectively, adapted to wipe the surface of the corresponding code wheels to include the same in appropriate electrical circuits to be described hereinafter. If the brush 36 is connected to a source of potential and if the conductive segment of the code wheel 31 is connected to the ground, current will flow through the brush 36 and the conductive segment of the wheel 31 when the brush 36 wipes this conductive segment. However, when the brush 36 wipes the non-conductive segment of the code wheel 31, no current will flow.

It will be evident that if current is flowing through the brush 36, there will be an indication that the brush is wiping some point along the periphery of the code wheel between the points marked 180° and 360°. Similarly, when no current flows through the circuit, the brush 36 must be wiping a point along the code wheel 31 between 0° and 180°. Thus, an examination of the condition of the circuit including the brush 36, provides a very rough indication of the angular disposition of the wheel 31 and therefore a like indication of the angular disposition of the shaft 30. Since the code wheel 32 is divided into four segments, current flowing through the brush 37 indicates that brush 37 is wiping a point on the code wheel 32 between 90° and 180°, or between 270° and 360°. If current is flowing through both brushes 36 and 37, then the brushes must be wiping the code wheels 31 and 32, respectively, at some point between 270° and 360°, since only within this interval are both code wheels 31 and 32 conductive.

A similar relationship holds for code wheels 33 and 34, so that a condition of current flow through all of brushes 36—39 indicates that the brushes are wiping the code wheels at points between 337.5° and 360°. If no current were flowing through any of the brushes 36–39, the brushes would be wiping the respective code wheels at some point between 0° and 22.5°. If current flowed only through brush 37, the brushes would be wiping the respective code wheels at some point between 90° and 112.5°.

It is evident that the conductive conditions of a row of brushes placed in line axially on the code wheels indicates the rotational position of the shaft 30 to an accuracy determined by the angular length of the segments on the most minor code wheel, i. e., the wheel with the largest number of segments. Greater accuracy could be achieved by providing one or more additional code wheels with correspondingly greater numbers of segments. For example the addition of a fifth code wheel would make possible an accuracy of one part in 32 ($2^5$). Any number of code wheels $n$ will provide an accuracy of $2^n$, although physical limitations will limit the maximum number of segments which may conveniently be provided. These limitations are the maximum permissible diameter of the wheel and the minimum permissible length of segment.

When these physical limitations are reached and further accuracy is desired, it may conveniently be achieved by providing an additional code group designated generally as 40. The code group 40 comprises code wheels 41, 42, 43, 44 and 45. The code wheels 41–44 may be identical with the code wheels 31–34, while the code wheel 45 is provided with twice the number of segments as the code wheel 44. The code wheels 41–45 are arranged to rotate together and are mounted on a shaft (not shown) coupled to the shaft 30 through a gear connection 46 adapted, in the arrangement illustrated, to rotate the wheels of the code group 40 at sixteen times the speed of the code wheels of the group 35. In general, the speed ratio of the two groups of code wheels should have the same value as the number of segments on the most minor wheel on the first or low speed shaft. Furthermore, the minor or high speed group (40 in Fig. 2) must turn faster than the major group. Each of the code wheels 41–45 is provided with a respective one of brushes 47–51. The brushes 47–51 should be aligned axially with the brushes 36–39 so that the conductive conditions of the respective brushes will provide an accurate indication of the angular disposition of the shaft 30.

Because of the 16 to 1 gear ratio between the two groups of code wheels, one revolution of the group 40 will correspond to one-sixteenth revolution of the group 35. Thus, the code wheel 41 will operate in the same manner as would a fifth code wheel included in the group 35. Since the group 40 is provided with five code wheels, the accuracy with which the angular disposition of the shaft 30 may be determined is one part in 512 ($\frac{1}{16} \times \frac{1}{32} = \frac{1}{512}$). If additional accuracy is desired, additional code wheels may be provided, or additional groups of code wheels connected through suitable gear trains may be employed. The accuracy of the system may thus be increased until the accuracy of the gear teeth becomes a significant factor.

It will be observed that the indication of angular disposition provided is in an "on-off" code ("on" when a brush wipes a conductive segment, and "off" when a brush wipes a non-conductive segment), so that assigning the digit zero to the "off" condition and the digit one to the "on" condition, the angular disposition of the shaft 30 may be read in the binary system. The brushes 36–39 and 47–51 in the positions shown in Fig. 2 provide the binary number 100,010,000, which is equivalent to an angular disposition lying between 191.25 and 191.95.

In order to achieve the most accurate possible determination of angular position with the arrangement in Fig. 2, it is desirable to provide means for eliminating ambiguity. By ambiguity is meant a faulty positional indication by one or more of the brushes. With the brush arrangement as shown in Fig. 2, there are two possible sources of ambiguity. The first lies in the possibility that the brushes 36–39 and 47–51 may not be disposed in a true straight axial line, so that one or more of the brushes may actually fall on one side of a dividing line between segments while the remainder of the brushes may fall on the other side of the dividing line. The second source of ambiguity lies in the use of the gear linkage 46, which may introduce a slight angular displacement between the brushes associated with the code wheel group 35 and those associated with the code wheel group 40. It will be observed that as the brush 51 passes over a single segment of the code wheel 45, the code wheel group 35 is caused to rotate $\frac{1}{512}$ of a revolution and hence it would be very difficult to cause all of the brushes 36–39 to cross the dividing line in such a small arc of rotation. A simple means of eliminating possible ambiguity will now be described, and other means will be described hereinafter. The first means involves the use of a second set of brushes, one for each of the code wheels of the groups 35 and 40, except for the most minor code wheel 45. Thus, brushes 52–55 are arranged to ride on the code wheels 31–34, respectively, while brushes 56–59 are arranged to ride on code wheels 41–45, respectively. The brushes 36–39 and 47–50 are arranged on the left side of a dividing line between code wheel segments, while the brushes 52–55 and 56–59 are arranged on the right side of the dividing line at the same time as the brush 51 rests directly on the 180° dividing line of the code wheel 45.

Figure 3:
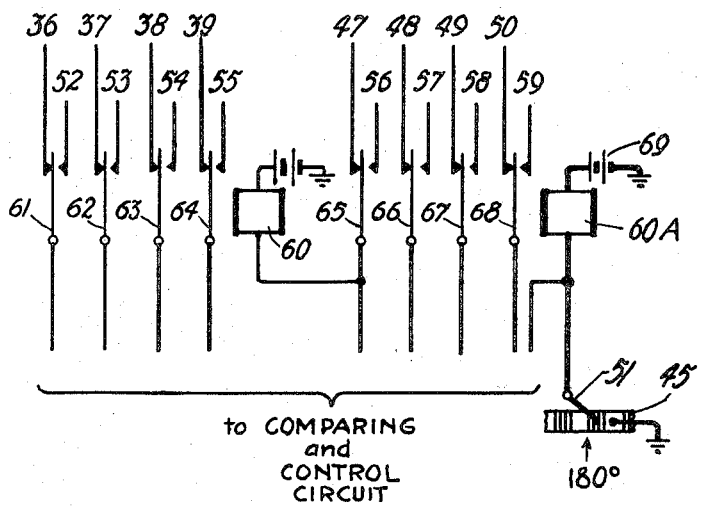
Fig. 3 shows a circuit arrangement for use with the apparatus of Fig. 2 and adapted to eliminate ambiguity.

Referring now to Fig. 3, a multi-contact relay 60 is arranged to operate a plurality of armatures 61–64 and a multi-contact relay 60A is arranged to operate a plurality of armatures 65–68. One terminal of the coil of relay 60A is connected to a source of potential 69 while the other terminal thereof is connected to the brush 51 which wipes the code wheel 45. One terminal of the coil of relay 60 is connected to a source of positive potential while the other terminal thereof is connected to armature 65. Each of the armatures 61–68 is provided with a front, or make, contact and a back contact. Each of the front contacts is connected to a respective one of the brushes 52–55 and 56–59, while each of the back contacts is connected to a respective one of the brushes 36–39 and 47–50. While the brush 51 wipes a non-conductive segment of the code wheel 45, the coil of relay 60A remains deenergized and the armatures 65–68 rest on their respective back contacts, so that each of the brushes 47–51 is connected through the associated back contacts and armatures to the comparing and control circuit to be described hereinafter. When the brush 51 passes the 180° dividing line between a non-conductive and a conductive segment of the code wheel 45, the relay 60A will be energized and thus connect the brushes 56–59 to the comparing and control circuit through their respective front contacts and armatures of the relay 60A. Each time the brush 51 passes from a non-conductive to a conductive segment of the code wheel 45, the relay 60A will be energized, whereas each time the brush 51 passes from a conductive segment to a non-conductive segment of the code wheel 45, the relay 60A will become deenergized. Thus, control of the external comparing and control circuit will pass alternately from the left-hand brushes to the right-hand brushes and vice versa as the brush 51 passes across successive dividing lines between segments of the code wheel 45. A similar sharing of control between the brushes 36–39 and 52–55 occurs under control of relay 60 which is in turn energized or deenergized in response to the conductive or non-conductive condition of the circuit including brush 47 or brush 56, as the case may be. Selection of the brushes 36–39 and 52–55 is thus under control of the brushes wiping code wheel 41. All of the brushes will, therefore, pass from "off" to "on," or from "on" to "off" at substantially the same instant, so that ambiguity due to the gear train 46 is eliminated. Furthermore, since the two brushes associated with each code wheel (except the code wheel 45) may be spaced an appreciable distance on each side of the dividing line between segments, minor misalignment of the individual brushes will not cause ambiguity. The brushes of each pair may be spaced on each side of the dividing line by a distance equal to the width of the most minor segment, i. e., segments of the wheel 45. The operation of the relays 60 and 60A is equivalent to imparting a so-called Geneva motion to the code wheels at the time the brush 51 crosses a dividing line of the code wheel 45 or at the time the brush 47 or the brush 56 crosses a dividing line of the code wheel 41. The relays 60 and 60A may therefore be termed Geneva relays.

It should be observed that when one of the Geneva relays operates or releases when a dividing line is not between a pair of brushes associated with one of the code wheels, the operation or release of the Geneva relay has no effect on that portion of the control circuit associated with that code wheel. For example, when the brush 51 passes over the 270° dividing line, no change is imparted to the external circuit connected to the armature 65, because both of the brushes 47 and 56 are wiping a conductive segment of the code wheel 41. When a change in indication to the external circuit is required, the change from one brush to another of a pair will always be in the proper direction to provide the desired change in conduction or non-conduction. For example, when the brush 51 crosses the 270° dividing line, the relay 60 will be deenergized, thus connecting the brush 48 to the armature 66. At this moment, the brush 48 should properly be wiping a conductive segment of the wheel 42, whereas previously the brush 57 should have been wiping a non-conductive segment. An examination of Fig. 2 will disclose that these conditions are properly met.

If it is described to use the Geneva relay to eliminate only the ambiguity due to a gear reduction, it is not necessary to use the relay 60A. For example, the brushes 36–39 and 52–55 could be connected to respective back and front contacts of the relay 60, while the relay 60 could be operated by a brush wiping the major code wheel of the group 40, i. e., the code wheel 41. It will be observed, however, that no Geneva action will be provided to compensate for misalignment of the brushes associated with the high speed group 40.

In order to facilitate disposition and proper alignment of the brushes, the code wheels may be shifted in position relative to each other, although the electrical alignment thereof will be preserved by suitably locating the brushes.

To further facilitate the brush arrangement, the brushes of each pair may be separated by an amount slightly less than 180°, which is equivalent to a small electrical spacing. For example, the brush 53 could be moved to the position indicated by the brush 53' and still provide operation identical to that of the brush 53. The spacing of the brush 53' from the position indicated for the brush 53, is 180°, so that the brushes 37 and 53' are spaced physically approximately 170°, whereas the electrical spacing is about 10°, which is equivalent to the electrical spacing between brushes 37 and 53. It will be evident that this wide physical spacing permits the easy adjustment and placing of the brushes of a pair. A similar 180° spacing may be provided for each of the code wheels except the most major of each group, i. e., the wheels 31 and 41. To achieve the same results with these code wheels, additional identical code wheels must be provided since these code wheels have only two segments each. Thus by providing two code wheels 31 and two code wheels 41 and by suitable spacing of the brushes, an easily constructed unit may be provided.

A transducer unit constructed in accordance with the arrangement illustrated in Fig. 2 will be described in greater detail hereinafter in connection with Figs. 9–13.

As indicated hereinbefore, the conductive or non-conductive conditions of the circuits associated with the brushes of Fig. 2, provide information in binary pulse code form of the angular position of the shaft 30. The arrangement of Fig. 2 may be included in the transmitting transducer unit 20 and in the receiving transducer unit 25 of Fig. 1. The output of the unit 20 will thus be a pulse code indication of the angular disposition of its main shaft, while the output of the unit 25 will likewise be a pulse code indication of the angular disposition of its main shaft. In the system of Fig. 1, it is desired to cause the shaft of the receiving transducer unit 25 to assume an angular disposition identical with that of the shaft of the unit 20. For this purpose, the control circuit 24 is provided to compare the pulse code outputs of the units 20 and 25, and to provide a control potential adapted to urge the shaft of the unit 25 into the desired angular position. For the purpose of the present discussion, the converter units 21 and 23 will not be considered since the output of the converter 23 may be identical with the output of the unit 20. In fact, where it is feasible to provide a large number of wires coupling the transmitter unit 20 and the comparing and control circuit 24, the units 21 and 23 and the link 22 may be omitted.

The function of the comparing and control unit 24 is to receive the binary position code from the unit 20, to compare this binary position code with the binary position code derived from the unit 25 and to supply a voltage to a motor connected to the shaft of the unit 25. This voltage should be in such a sense that the motor will correct any mismatch between the two shafts.

Figure 4:
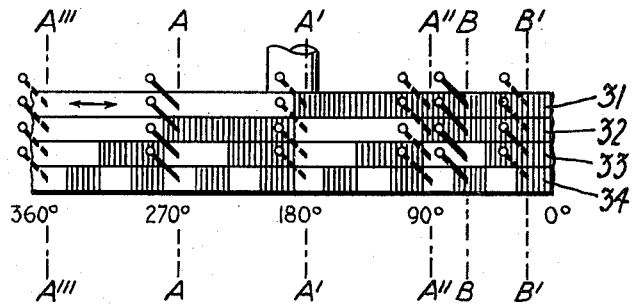
Fig. 4 is a schematic view similar to a portion of Fig. 2 and illustrating the operation of the transducer of Fig. 2.
Figure 5:
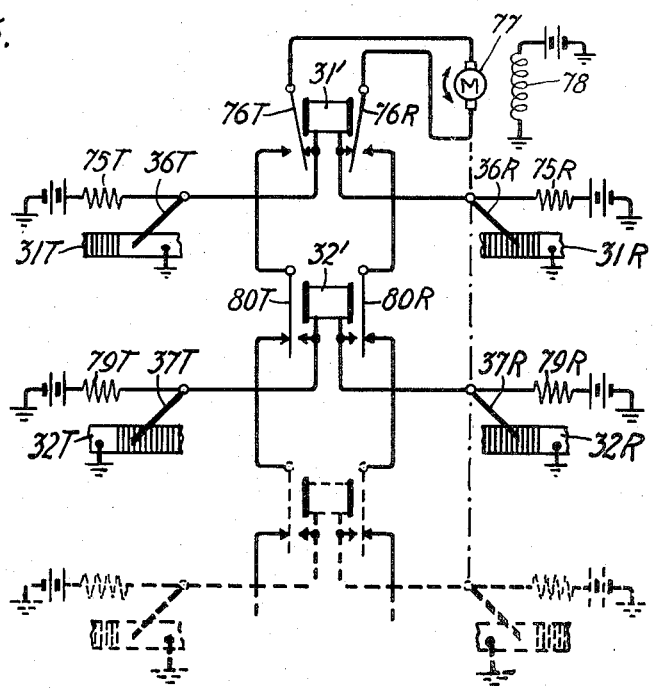
Fig. 5 is a wiring diagram of a simple comparing and control circuit in accordance with the invention.

To simplify the explanation, there is shown in Fig. 4 a developed code wheel group corresponding to the group 35 of Fig. 2. The line A—A of Fig. 5 represents the brush location on an output shaft (shaft of the receiving transducer 25), and the line B—B represents the position of the brushes on an input shaft. In an actual installation, the brushes A—A and B—B would, of course, wipe separate code wheels. However, since the code wheels of the input and output shafts may be identical, a single code wheel group is illustrated in Fig. 4 for simplicity.

The position code read by the brushes B—B is the binary number 0010 (0 represents the non-conductive or "off" condition and 1 represents the conductive or "on" condition). The position code corresponding to the brush position A—A is 1011. The comparing and control circuit should bring the brushes A—A to the position occupied by the brushes B—B. Actually, the code wheels and not the brushes move, but the operation may conveniently be described in terms of brush rather than code wheel movement. The comparing and control unit must first sense the relative positions of the brushes wiping code wheel 31. If they are mismatches, i. e., one "on" and the other "off," or one "off" and the other "on," the brushes A—A (actually the code wheel 31) must be moved in the proper direction to correct the mismatch. Thus, in Fig. 4, the brushes A—A must be moved to the right. It is always possible to move in a proper direction since there are only two kinds of mismatch—"off-on" and "on-off"—and two directions of motion, right and left. It is only necessary to insure that the first mismatch sensed causes proper corrective motion. When this is done for the first or most major code wheel, it will be correct for mismatch of more minor code wheels. Considering the code wheel 31 of Fig. 4, a mismatch of A—A "on" and B—B "off" requires brush A—A to move toward the right, whereas a mismatch of A—A "off" and B—B "on" would require the brushes A—A to move toward the left. When the brushes A—A and B—B match, i. e., both "on" or both "off," no further motion is required by the brushes wiping the code wheels 31.

As soon as the brushes wiping the code wheels 31 have been brought into matched condition, control should pass immediately to the next minor code wheel, i. e., the code wheel 32. In Fig. 4, as soon as the brushes A—A reach the position A'—A', the brushes wiping the wheel 31 are matched (both "off") and control must therefore pass to the brushes on the wheel 32 where a mismatch is sensed (A'—A' "on" and B—B "off"), so that travel of the brushes A—A continues to the right until the brushes A—A pass beyond the "on" position of the code wheel 32, at the position A"—A". In the position A"—A", the brushes are matched for both code wheels 31 and 32 since they are all wiping non-conductive segments. Similarly, in the position A"—A", match occurs with respect to the code wheel 33 since both brushes wipe a conductive segment. Hence control should pass immediately to code wheel 34 where a mismatch is sensed, the brush at position A"—A" wiping a conductive segment while the brush B—B wipes a non-conductive segment. Thus, the brushes at position A"—A" should move to the right by a distance equal to one segment of the code wheel 34 to correct this last mismatch. When the brushes A—A and B—B rest on identical segments, the correct position has been found within the accuracy provided by the transducer units, in Fig. 4, one part in 16.

In Fig. 5 there is illustrated a simple form of circuit for securing the desired comparing and mismatch elimination operations. The entire circuit is not shown in Fig. 5 since each stage after the second is identical with the second. The third stage is illustrated in dotted lines but is not described. In this circuit, a single relay is provided for comparing each pair of code wheels, i. e., the code wheel of the transmitting transducer and the corresponding code wheel of the receiving transducer. The relays illustrated are 31' and 32' corresponding to the receiving and transmitting code wheels 31 and 32, respectively. The transmitting code wheel is indicated as 31T, being wiped by a brush 36T. Similarly, the receiving code wheel is indicated at 31R and is wiped by a brush 36R. A transmitting code wheel 32T and a receiving code wheel 32R are arranged to cooperate with the relay 32' and are provided with brushes 37T and 37R, respectively. It should be understood that if Geneva action is desired, 36T, 36R, 37T and 37R, respectively, will represent connections to armatures similar to armatures 61 and 62 of Fig. 3. One terminal of the coil or relay 31' is connected to the brush 36T, while the other terminal thereof is connected to the brush 36R. Each of the brushes 36T and 36R is connected to a source of positive potential through a respective one of resistors 75T and 75R. The relay 31' is provided with two armatures 76T and 76R, each of which is in turn provided with a front contact and a back contact, the front contacts being connected to corresponding terminals of the relay coil. The armatures 76T and 76R are connected to respective terminals of the armature winding of a motor 77. The motor 77 is suitably coupled to the shaft of the receiving transducer unit (unit 25 of Fig. 1). The field winding 78 of the motor 77 is connected between a source of positive potential and ground.

The coil of the relay 32' is connected to the brushes 37T and 37R, while the brushes 37T and 37R are connected to a source of positive potential through respective resistors 79T and 79R. The relay 32' is provided with armatures 80T and 80R each having a front contact connected to a respective terminal of the coil of relay 32'. The armatures 80T and 80R are connected to back contacts of armatures 76T and 76R, respectively. The back contacts corresponding to armatures 80T and 80R are in turn connected to the corresponding armatures of a similar relay associated with the third pair of code wheels. Like connections are provided for each pair of code wheels. The arrangement is such that the armatures, or common contacts, on all but the first relay (31') are connected to the back contacts of the relay just major to it.

When one of brushes 36T and 36R is grounded ("on"), and the other not grounded ("off"), the relay 31' will operate because one of its terminals is grounded and the other connected to positive potential through one of the resistors 75, the resistance of which is small compared with the resistance of the relay coil. When the relay 31' operates, it connects one side of the armature winding of motor 77 to ground and the other side to the source of positive potential through the corresponding resistor 75. The direction of current flow through the motor armature winding depends upon which brush is "on." Thus the direction of rotation of the motor 77 depends on the type of mismatch encountered. When the code wheels 31T and 31R are matched, no voltage appears across the coil of relay 31', and the relay releases allowing the armature 76T and 76R to fall on to the associated back contacts. The armature winding of motor 77 is thus connected to the armatures 80T and 80R of the relay 32'. If the brushes 37T and 37R sense a mismatch between the code wheels 32T and 32R, the relay 32' will be energized causing the armatures 80T and 80R to make with their respective front contacts, thus supplying current to the armature winding of the motor 77 in a sense to correct the mismatch between code wheels 32T and 32R. In the arrangement illustrated, the brushes 37T and 37R are wiping non-conductive segments of their respective code wheels so that a matched condition is sensed and no current flows through the coil of relay 32'. Thus the armatures 80T and 80R will remain made with their respective back contacts and control will pass immediately to the succeeding relay (shown in dotted lines). It will be observed that rotation of the motor 77, in a sense to substantially match the transmitting and receiving transducers, will continue smoothly despite possible matched condition of certain of the pairs of code wheels because the transfer of control from a major relay to the succeeding minor relay is substantially instantaneous when a matched condition is sensed. At any time a major pair of code wheels is mismatched, the associated relay operates and removes control from all relays minor thereto until its mismatch is corrected. When all of the code wheels have been brought to a matched condition, transmitting and receiving transducers are in corresponding angular positions, the degree of correspondence depending upon the number of code wheels provided. With the number of code wheels provided in the arrangement of Fig. 2, correspondence to within one part in 512 will be achieved since there are nine code wheels. When Geneva action is desired, the brushes which wipe the code wheels may be included in a circuit of the type shown in Fig. 3, in which case the armatures 61–68 will be connected to the appropriate terminals of the control relays 31', 32', etc. of Fig. 5. The code wheel or wheels which operates the Geneva relay or relays, which in the arrangement of Figs. 2 and 3 are the most major and most minor code wheel of the high speed group, will be connected to one terminal of the Geneva relay and also to the coil of the corresponding control relay whereby the Geneva action will be secured to eliminate ambiguity, and the full accuracy provided by the most minor code wheel will be achieved.

The simple circuit described in connection with Fig. 5 has a number of disadvantages. One of these disadvantages is that all resistors draw current whenever their associated brushes are grounded.

Figure 6:
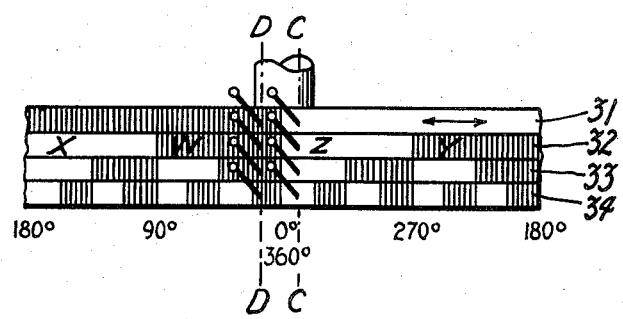
Fig. 6 is a view similar to Fig. 4 and provided to explain the operations of the transducer.

Another disadvantage of this circuit is that the direction of rotation to achieve a matched condition of all code wheels may not necessarily be such as to provide the shortest route. Referring again to Fig. 4, it was explained above that in order to bring brushes from the position A—A to the position B—B, mismatch of code wheel 31 causes motion of the brushes A—A to the right and so on under successive control of the code wheels 32, 33 and 34. If the brushes A—A had been at the position A'''—A''' in which all brushes wiped a conductive segment and were required to find position B'—B', wherein the brushes would all wipe non-conductive segments, the control unit of Fig. 5 would still cause the brushes to move, in effect, to the right. Since Fig. 4 is the development of the periphery of the code wheels, the position B'—B' is actually adjacent to the position A'''—A'''. Thus the brushes A—A would have to move to the left rather than to the right in order to reach position B'—B' by the shortest route. This is shown more clearly in Fig. 6, which represents the same development of the code wheels as Fig. 4, but with the 0°-360° position shifted to the middle of the wheels. In Fig. 6, brushes C—C must move to position D—D by the shortest route, i. e., to the left instead of to the right, the latter direction being the one in which the control circuit of Fig. 5 would normally cause it to move. More generally, any brush in the transverse area Z that is required to go to area W, must travel to the left instead of to the right to order to travel by the shortest route. Conversely, a brush in the area W which is required to go to the area Z, must travel to the right rather than to the left, although the control circuit of Fig. 5 would normally cause travel toward the left. In other words, to produce correspondence between the areas W and Z, a reversal of normal direction is required. It will be observed that one condition required for reversal is that both code wheels 31 and 32 must be in mismatch. This condition is necessary but is not a sufficient condition, for brushes in area Y and required to go to the area X or vice versa, would also meet this condition and cause an unwanted reversal of direction. However, when brushes are in the areas X and Y, code wheel 31 is different from code wheel 32, in that when one is "on," the other is always "off." This situation can be used to prevent a unwanted reversal. More particularly, the two conditions for providing reversal of direction under the desired circumstances, are (1) code wheels 31 and 32 must both be in mismatch, and (2) code wheels 31 and 32 must both be the same, i. e., both "on" or both "off". By means of suitable contacts on the comparison relays and by the use of an additional relay which may be termed the "reversing" relay, these conditions may be used to provide desired reversal. The circuit arrangement now to be described in connection with Fig. 7 will overcome the principal deficiencies of the circuit of Fig. 5 and will also achieve desired reversal of direction.

In Fig. 7, the relays 91T, 92T, 93T and 100T may be controlled directly by the transmitting transducer code wheels indicated at 101T, 102T, 103T and 110T, respectively, or they may be controlled by signals derived from the transmitting transducer or its equivalent and transmitted to the receiver chassis by suitable means such as the means to be described hereinafter. For simplicity, only four stages have been shown, the first three and the tenth. It should be understood that relays corresponding to the fourth through the ninth transmitting transducer code wheels could be included in the circuit in the same manner as the third relay 93T. The number of relays 91T–100T provided will depend on the number of code wheels employed. Thus, the relays 91T through 100T are rendered energized or deenergized in response to the incoming "on-off" code signals derived from the transmitting transducer or other source. For this purpose, one terminal of each of the coils of the relays 91T–100T is illustrated as connected to a brush arranged to wipe a corresponding one of the code wheels 101T–110T. Another group of relays 91R–100R is rendered energized or deenergized by connecting one terminal of the coil of each of these relays to a brush wiping a corresponding code wheel of the receiving transducer, these code wheels being designated 101R–110R, respectively. The other terminal of each of the relays 91R–100R is connected to ground. Similarly, the free terminal of the coils of each of the relays 91T–100T is connected to ground. If desired, the conductive segments of each of the code wheels of either or both of the receiving and transmitting transducer could be connected to ground instead of to a source of positive potential as illustrated. In such case, the corresponding relays would be connected to a source of positive potential rather than to ground.

In addition to the relays 91T–100T and 91R–100R, four additional relays are provided in the circuit of Fig. 7. These are the relays MR, ML, REV and Q, the function of each of which will be described below.

It will be remembered that the primary function of the control circuit is first to compare the corresponding transmitting and receiving transducer code wheels and, in the case of a mismatch, to supply a voltage to the receiving transducer motor in such a sense as to correct the mismatch. One type of mismatch should cause the motor to rotate in one direction and the other type of mismatch should cause the motor to rotate in the other direction. Secondly, when a mismatch between a major pair of code wheels has been corrected, or if no mismatch exists, control should immediately pass to the next minor pair of code wheels for further comparison and correction, if necessary. In Fig. 7, a motor 115 is shown as mechanically coupled to the receiving transducer code wheels. For convenience, rotation of motor 115 in one direction will be termed right and rotation in the other direction left.

Each of the relays 91T–100T is provided with a pair of armatures, each having a front contact and a back contact. The relay 91T is provided with armatures 116 and 117; the relay 92T with armatures 118 and 119; the relay 93T with armatures 120 and 121; and the relay 100T with armatures 122 and 123. The relays 91R–100R are provided with armatures 124—127, respectively, each of which has a front contact and a back contact. In Fig. 7, the armatures are illustrated as made with the back contacts of their associated relays.

A conductor 130 interconnects the back contacts of each of the armatures 116, 118, 120 and 122, and an armature 131 of relay REV. A conductor 132 interconnects the front contacts of armatures 117, 119, 121 and 123 and an armature 133 of the relay REV. The front contact of each of the armatures 116, 118, 120 and 122 are connected to the corresponding back contact of each of the armatures 117, 119, 121 and 123, respectively. The back contact of the armature 117 and the front contact of the armature 116 are connected to one terminal of the coil of the relay Q, the other terminal thereof being connected to ground. The armature 124 of the relay 91R is connected to a source of positive potential while the corresponding front contact is connected to the armature 116 and the corresponding back contact is connected to the armature 117. The armature 125 of the relay 92R is connected to an armature 134 of the relay Q, while the corresponding front contact of the relay 92R is connected to the armature 118 and the back contact of the relay 92R is connected to the armature 119. The armature 126 of the relay 93R is connected to the back contact of the armature 119 and to the front contact of the armature 118, while the corresponding front contact of the relay 93R is connected to the armature 120 and the back contact of the relay 93R is connected to the armature 121. The armature 127 of the relay 100R is connected to the relay (not shown) next major thereto in the same manner as the armature 126 of the relay 93R is connected to the relay 92T. The front contact of the relay 100R is connected to the armature 122, while the back contact of the relay 100R is connected to the armature 123. The connections provided for relays 94T through 99T and 94R through 99R (not shown) would correspond exactly with the connections described for the relays 93T and 93R. It should be observed that each of the relays 91T–100T will be energized to operate its associated armatures to their front contacts when the associated brushes wipe conductive segments of the respective transmitting transducer code wheels 101T–110T. Similarly, each of the relays 91R–100R will operate its associated armature from the back contact to the front contact thereof when the corresponding brushes wipe conductive segments of the associated code wheels 101R–110R, respectively, of the receiving transducer.

The back contact of the Q relay is connected to one terminal of the coil of relay REV, while the front contact thereof is connected to a source of positive potential. The other terminal of the coil of relay REV is connected to ground. The back contact corresponding to the armature 133 of relay REV is connected to one terminal of the coil of relay MR and to the front contact corresponding to armature 131. The front contact corresponding to armature 133 is connected to one terminal of relay ML and to the back contact associated with the armature 131. The free terminals of the coils of the relays MR and ML are connected to ground. The relay ML is provided with a single armature 135 having a front contact connected to a source of positive potential and a back contact connected to ground. The relay MR is provided with an armature 136 and an armature 137, the former having a back contact connected to the armature 135 and a front contact connected to ground, while the latter has a back contact connected to ground and a front contact connected to a source of positive potential. The armatures 136 and 137 are connected to respective terminals of the motor 115, through conductors 138 and 139, respectively.

It will be remembered that, when a matched condition of a pair of code wheels occurs, either both "on" or both "off," no voltage should be supplied to the motor 115. Thus, if the brushes associated with the code wheels 101T and 101R are both wiping non-conductive segments of their respective code wheels, both relays 91T and 91R will be deenergized. No potential is thus applied to either of the conductors 130 and 132 and therefore no potential is applied to the motor 115. A similar situation occurs when the brushes wipe conductive segments of both code wheels 101T and 101R. However, if the relay 91T is energized by a connection of its associated brush with a conductive segment of the code wheel 101T while the relay 91R is deenergized (because its associated brush is wiping a non-conductive segment of the code wheel 101R), a potential will be applied to the conductor 132 through a circuit extending from the source of positive potential associated with the armature 124, and through the armature 117 and its associated front contact to the conductor 132. The potential applied to the conductor 132 is in turn applied through the armature 133 and associated back contact of relay REV to the coil of relay MR, thereby energizing the latter. Energization of relay MR causes the armature 137 thereof to make with associated front contact and thus apply a positive potential to motor 115 through the conductor 139, thereby causing the motor 115 to rotate in the direction to overcome the mismatch, for example, to the right. It will be observed that the other terminal of the motor 115 is connected to ground through the armature 136 and associated front contact of relay MR.

If the situation is reversed, i. e., the relay 91T is deenergized while the relay 91R is energized, the positive potential supplied through the armature 124 of relay 91R will be supplied to the conductor 130 through the armature 116 and associated back contact of the relay 91T. This potential will be supplied to the coil of relay ML through the armature 131 and associated back contact of relay REV. Energization of relay ML will supply an operating potential to the motor 115 to turn the same toward the left through a circuit including the armature and front contact of relay ML, the armature 136 and associated back contact of relay MR and the conductor 138. The corresponding ground connection for the other terminal of motor 115 is supplied through conductor 139 and the armature 137 and associated back contact of relay MR.

As explained above, if no mismatch had existed between the code wheels 101T and 101R, or upon cure of an existing mismatch, relays 91T and 91R would be either both energized or both deenergized, either condition resulting in no application of potential to the conductors 130 or 132 and a transference of control to the next minor pair of relays and code wheels. This transference of control occurs as follows: If the relay 91R is deenergized, for a conduition of no mismatch the relay 91T must be deenergized. Thus the positive potential applied to the armature 124 will be applied through the armature and back contact 117 and through the coil of the relay Q to ground. Energization of relay Q will apply positive potential from the front contact of the armature 134 thereof to the armature 125 of relay 92R. If the relays 91R and 91T are both energized, positive potential from the armature 124 will be supplied through the armature 116 and associated front contact of the relay 91T, resulting in energization of the relay Q and an application of potential to the armature 125 of relay 92R in the same manner. The relays 92R and 92T respond to a matched or mismatched condition of their associated code wheels in the same manner as the relays 91T and 91R. Thus, one condition of mismatch will result in an application of potential to the conductor 130, while the other condition of mismatch will result in an application of potential to the conductor 132. When the relays 92R and 92T are matched, thus indicating a matched condition of their associated code wheels, control passes to the next minor pair of relays 93T and 93R. The positive potential required to be applied to the armature 126 of relay 93R to permit response of relays 93R and 93T is derived through the circuit described above for application of potential to the armature 125 of relay 92R and through the front or back contacts of relay 92R and the back contact of armature 119 or the front contact of armature 118, as the case may be. Each of these latter contacts is connected to the armature 126.

Upon a matched condition of the relays 93T and 93R being reached, control will pass to the next minor pair of relays (not shown) and so on, until finally the relays 100T and 100R reach a matched condition. It should be observed that, if a major pair of relays senses a mismatched condition after control has been passed to a more minor pair of relays, the major pair of relays will again assume control by breaking the circuit applying positive potential to the next most minor R relay and by its applying potential to the conductors 130 or 132, as the case may be. Such a change in control function might occur, for example, upon a variation in position of the transmitting transducer before both transducers are matched or it might occur when a match is sought between the transmitting and receiving transducers under dynamic conditions, i. e., constant rotation of the transmitting transducer.

As pointed out above, it is frequently desirable for the receiving transducer motor to be reversed in direction under certain circumstances in order to achieve the travel to a matched condition by means of the shortest possible path. In order to achieve this result, i. e., rotation in a direction opposite to the normal direction of rotation for a given mismatch, two conditions of code wheel positioning relative to the brushes should be selected. With the arrangement described in connection with Fig. 6, the conditions selected were (1) code wheels 31 and 32 must both be in mismatch, and (2) code wheels 31 and 32 must both be the same, i. e., both "on" or both "off." Applying these conditions to Fig. 7, code wheel 101T must be in mismatch relative to code wheel 101R. Furthermore, the next most minor pair of code wheels which are in mismatched condition must have the same type of mismatch as the code wheels 101T and 101R to provide the desired reversal. It will be remembered that the relay Q is energized only when the relays 91R and 91T are matched, i. e., both "on" or both "off." Such a matched condition of this pair of relays causes a potential to be applied to the armature 125 of the relay 92R. This represents normal operation of the control circuit. However, when the most major code wheels 101T and 101R are mismatched, a decision must be made as to whether the motor 115 will rotate in the normal direction described above in connection with the type of mismatch or whether the direction of rotation will be reversed. Thus, when the relays 91T and 91R sense a mismatch, the relay Q will be deenergized and the coil of the reversing relay REV will be connected through the back contact and armature 134 of relay Q to the armature 125 of relay R. If the relays 92R and 92T are mismatched, the armature 125 and hence the coil of relay REV will be connected to either conductor 130 or 132, depending upon the type of mismatch. If the mismatch between the relays 92R and 92T is of the same type as the mismatch between the relays 91R and 91T, the potential applied to the conductor 130 or the conductor 132 in response to the mismatch between relays 91R and 91T will operate relay REV, thus causing application of the potential appearing at the conductor 130 or 132 to the opposite one of relays MR and ML, resulting in a reverse rotation of motor 115. If the mismatch sensed by relay 92R and 92T is different from the mismatch sensed by relays 91R and 91T, the relay REV will remain deenergized and hence rotation of the motor 115 will be in the direction determined by the mismatch between the relays 91R and 91T, i. e., the direction determined by the circuit connections described above. It should be observed that, if the relays 92R and 92T are matched, control of the reversing relay REV will pass downward until a pair of relays in mismatch is reached. This latter pair of relays will determine whether or not the relay REV is operated.

The relays 91R–100R of Fig. 7 can be eliminated by using a receiving transducer of the type described hereinafter in connection with Figs. 24 and 25. In the foregoing discussion, it has been assumed that the relays 91T–100T are connected to brushes wiping the code wheels 101T–110T. It will be evident, however, that the relays 91T–100T can be operated from a source of "on-off" code other than the code wheels 101T–110T. Such a source may be a receiving circuit remote from the transmitting transducer, as illustrated in Fig. 1, or it might be a bank of switches, a tape reading mechanism or other suitable source adapted to provide an "on-off" code having a number of digits equivalent to the number of relays 91T et seq., which are to be operative. A suitable switching circuit for operating the relays 91T–100T is illustrated in Fig. 8.

In Fig. 8, as in Fig. 7, one terminal of the coil of each of the relays 91T–100T is connected to ground. The other terminal of each coil of these relays is connected to a contact of a respective one of switches 91S–100S. Thus, if an "on-off" code corresponding to the binary number 1010000001 is to be applied to the coils of relays 91T–100T, switches 91S, 93S and 100S should be closed to energize the associated ones of relays 91T–100T. This will correspond to connection of conductive segments of code wheels 101T, 103T and 110T to the associated brushes in Fig. 7 and will cause the receiving transducer to assume the angular disposition corresponding to the selected binary number. It will be evident that the switches 91S–100S could conveniently be replaced with switches responsive to the individual fingers of a perforated tape reading device of the type well known in the telegraph art, whereby suitable code perforations in the tape will cause the desired selective operation of the relays 91T–100T. Other devices could, of course, be employed selectively to energize the relays of 91T–100T.

When it is desired to control the receiving transducer by means of switches, the relays 91T–100T of Figs. 7 and 8 may be omitted, as shown in Fig. 8A. In Fig. 8A, the armatures, front contacts and back contacts of the relays 91T–100T are replaced with double pole double throw switches 91S'–100S', thus eliminating the relays 91T–100T.

A suitable transducer for use in connection with either the receiver or transmitter is illustrated in Fig. 9. The transducer of Fig. 9 comprises a generally cylindrical casing or housing 150 formed in three sections, 151, 152 and 153. The outer end of the section 151 is closed by an annular wall member 154, arranged to be seated in a recessed portion of the section 151. A second annular wall member 155 is provided between the sections 151 and 152, while a third annular wall member 156 is provided between the sections 152 and 153. A shaft 157 is suitably journaled in the wall members 154 and 155 and extends outwardly of the wall member 154. The shaft 157 is the shaft which, in a receiving transducer, is to be positioned, and, in a transmitting transducer, is to be matched by the shaft of the receiving transducer.

A second shaft 158 is journaled at one end thereof in a suitable bushing provided in the wall member 156. The other end of the shaft 158 extends nearly across the chamber between the walls 156 and 155 and is provided with a cut out or recessed portion adapted to accommodate therein a reduced diameter hub portion 159 of a gear 160. The arrangement is such that the gear 160 rotates with the shaft 158. A gear 161 is mounted on the shaft 158 adjacent the other end thereof. The end of the casing 150 opposite the wall 154 is closed by a similar annular wall 162, having journaled for rotation therein a shaft 163 of an electric motor 164. The electric motor 164 might correspond, for example, to the motor 115 of Fig. 7. A gear 165 is mounted on the end of the shaft 163 between the walls 156 and 162 and is arranged to mesh with a gear 166 mounted on a shaft 167 suitably journaled in the wall 156 at a point therein remote from the center thereof. The end of the shaft 167, located between the walls 155 and 156, is provided with a gear 168 adapted to mesh with the gear 161. The gears 165, 166, 168 and 161 thus constitute a gear train adapted to rotate the shaft 158 in response to rotation of the motor 164. The gear 160, which is arranged to rotate with the shaft 158, meshes with a gear 169 mounted on a shaft 170 journaled for rotation in the wall 155, at a point therein remote from the center thereof. The shaft 170 extends into the space between the walls 154 and 155 and is provided with a gear 171 adapted to mesh with a gear 172, carried by the shaft 157. The gears 160, 169, 171 and 172 constitute a gear train intercoupling the shafts 158 and 157. The gear ratio between these shafts is selected to provide the desired speed ratio therebetween. Thus, if the shaft 157 corresponds to the shaft 30 of the low speed code wheel group 35 of Fig. 2, and if the shaft 158 corresponds to the shaft of the high speed code group 40 of Fig. 2, the gear ratio between these shafts should be selected to provide a speed reduction of 16:1 between the shaft 158 and the shaft 157. The gear ratio between the shafts 163 and 158 may be selected to have any desired suitable value.

Six code wheels 175–180 are mounted on the shaft 158, for rotation therewith. The code wheels are constructed in the form of annular disks and are preferably provided with recessed portions along the peripheries thereof adapted to receive inserts of non-conductive material, thus forming the required conductive and non-conductive segments. It will be observed that the conductive portions of the code wheels 175–180 may be connected together and grounded through the shaft 158 and the casing 150. The code wheel 175 may correspond to the code wheel 45 of Fig. 2, and similarly the code wheels 176–179 may correspond to the code wheels 44–41, respectively, of Fig. 2. The code wheel 180 is identical with the code wheel 179 but is rotated 180° with respect thereto to facilitate placing of the brushes. The code wheels 175–180 are illustrated in developed form in Fig. 10, which also illustrates a suitable location of the brushes relative to the respective code wheels. The brushes, which are omitted from Fig. 9 for purposes of clarity, are arranged to wipe the corresponding code wheels. The brush 179A wipes the code wheel 179, while the brush 179B wipes the code wheel 180. In each other case, the A and B brushes wipe the wheels having the same reference numerals. However, the two brushes of each pair are displaced approximately 180°. Since it is impossible to effect this displacement on a wheel having only two segments, there is provided an additional code wheel 180 identical to the code wheel 179 but rotated 180° relative thereto, thus providing suitable brush separation for effectively achieving the Geneva action. The separation of 180° provided between the brushes of each of the other pairs likewise provides the electrical equivalent of the close spacing illustrated in Fig. 2. Since the most minor code wheel of the group is provided with thirty-two segments, all pairs of brushes should be spaced apart not more than about 10° electrically or about 170° physically. The Geneva relay is operated by the brush 175A which wipes the most minor code wheel 175. The Geneva relay referred to would correspond with the relay 60 of Fig. 3.

Another group of code wheels 181, 182, 183, 184 and 185, is mounted for rotation on the shaft 157 and hence corresponds to the group 35 of Fig. 2. The code wheels 181–185 are illustrated in developed form in Fig. 11, which also shows the brushes associated therewith. It will be observed that the code wheels 185 and 184 are identical, except that they are rotated 180° relative to each other to provide the desired brush spacing for proper Geneva action. From Figs. 10 and 11, it will be seen that each of the brushes is spaced a substantial distance from adjacent brushes so that they may conveniently be mounted in suitable holders provided in the casing 150. However, the arrangement is such that the brushes of each pair are electrically the full equivalent of the corresponding brushes of Fig. 2. The positions of brushes on adjacent code wheels can be varied relative to each other, provided the corresponding code wheels are suitably spaced so that the electrical spacing of the brushes of each pair will be proper. If desired, satisfactory positioning of the receiver transducer can often be achieved without the use of Geneva action on the high speed (minor) code wheel group since, if the brushes are positioned fairly accurately, the shaft will continue to rotate until the correct binary combination is found. Thus, the receiver high speed code wheel group could conveniently be provided with a single brush for each code wheel and the duplicate of the most major code wheel of the high speed group could be omitted. With respect to the transmitter, it is desirable to use the Geneva action with both the high speed and low speed code wheel groups.

If further accuracy than can be secured with the structure of Fig. 9 is desired, one or more additional groups of code wheels may be provided. For this purpose, suitable gearing would be provided between the shafts of adjacent groups.

In the structure of Fig. 9, the code wheels 179 and 180 are identical and the code wheels 184 and 185 are identical. The remaining code wheels in each group differ from the other code wheels of the same group because of the number of segments provided along the periphery thereof. In Figs. 12 and 13, there is illustrated a code wheel corresponding to the code wheels 177 and 182 and provided with four conductive segments and four non-conductive segments. The code wheel, which is indicated generally at 190, is provided with four spaced recesses 191, 192, 193 and 194 in the periphery thereof. The recesses 191–194 are provided with insulating inserts 195–198, respectively. The insulating inserts may conveniently be formed of plastic, and may be cast in the recesses. A pair of inwardly extending holes is provided at the base of each recess to key the insert in place in the recess. The code wheel 190 may conveniently be formed from a conductive metal so that brushes riding along the periphery thereof will alternately wipe conductive and non-conductive segments. While the segments may be made of equal width, the non-conductive segments may be wider than the conductive segments by an amount approximately equal to the width of the brush arranged to wipe the code wheel periphery. A central hole 199 is provided in the code wheels 190 and adapted to receive the transducer shaft. If desired, an outwardly extending keyway may be provided in the hole 199 to facilitate mounting of the code wheel 190 on its associated shaft. Alternatively, the code wheels may be press fit on the shaft, or other means, such as a hub associated with the code wheel group, may be provided to cause the code wheels to rotate with their associated shaft. A pair of holes 200 and 201 is provided in the code wheel 190, at points intermediate the center and periphery thereof. These latter holes are adapted to receive a bolt, dowel pin or the like, for retaining the code wheels or a group in desired angular relationship relative to each other.

In the arrangement of Fig. 9, two groups of code wheels are mechanically connected through a gear train so as to operate, in effect, as a single group. An advantage of this arrangement resides in the fact that the minor segments need not be very small. As pointed out above, the speed ratio between the groups should have the same value as the number of segments on the most minor wheel of the major or low speed shaft. If a plurality of code wheels is interconnected so as to have a 2:1 speed ratio between adjacent wheels, each code wheel can be constructed with two peripheral segments providing 180° "on" and 180° "off." Thus, all the code wheels may be identical. The binary coding achieved results from the 2:1 speed ratio, rather than from a varying number of segments. It should also be observed that satisfactory binary coding can be achieved without the use of brushes responsive to conductive and non-conductive code wheel segments. For example, the code wheel peripheries may be constructed to provide cam action for closing and opening associated switches. In Figs. 14 through 19, there is illustrated a transducer in which all the code wheels are identical and in which cam action is employed to produce binary coding desired.

Referring now to Figs. 14–19, the transducer comprises a pair of end plates 210 and 211 and an intermediate plate 212, each of the plates being formed as an annular disc. The plates 210–212 are each provided with three spaced holes adjacent the peripheries thereof and adapted to receive spacing members of rods. Spacing members 213, 214 and 215 are arranged to interconnect and maintain in spaced relationship the plates 210 and 212. For this purpose, the ends of the members 213–215 are provided with reduced diameter portions. The reduced diameter portions adjacent the plate 210 are adapted to receive nuts, such as the nut 216 shown in Fig. 14. The other ends of the members 213 are adapted for threaded engagement with spacing members 217, 218 and 219, arranged to separate and maintain in spaced relationship the plates 211 and 212. One end of each of the members 217–219 is provided with a hole having internal threads adapted to engage the reduced diameter portions of the members 213–215, respectively, while the other ends thereof are provided with reduced diameter threaded portions adapted to be engaged by nuts, such as the nut 220 illustrated in Fig. 14. A shaft 225 is journaled adjacent one end thereof in a hole provided in the center of the plate 210 and at the other end thereof in a corresponding hole provided in the plate 211. The shaft 225 also passes through and is supported in a central hole provided in the plate 212. The shaft 225 is the shaft which, in a receiving transducer, is to be positioned and which, in a transmitting transducer, is to serve as the model for positioning of the receiving transducer. In other words, the shaft 225 may be considered the output shaft of a receiving transducer and the input shaft of a transmitting transducer. A second shaft 226 is journaled, at one end thereof, in the plate 210 and at the other end thereof in the plate 212. The shaft 226 is spaced radially with respect to shaft 225 by a distance about equal to one-half the radius of the plate 210. A code wheel 227, the construction of which will be described hereinafter, is mounted for free rotation on the shaft 225. A gear 228 is likewise mounted on the shaft 225 adjacent the code wheel 227, and is rigidly affixed to the latter. A gear 229 is rigidly mounted on the shaft 226 and is arranged to mesh with the gear 228 to drive the latter, together with the shaft 225. For this purpose, the code wheel 227 is coupled to the shaft 225 through a clutch mechanism indicated at 225A and arranged for external operation by rotation of a knob 225B. A code wheel 230 and a gear 231 are freely mounted on the shaft 226 adjacent the gear 229, the gears 229 and 231 being rigidly affixed to each other. A gear 232 is mounted on the shaft 225 for free rotation thereon and is arranged to engage the gear 231 for rotating the latter. A code wheel 233 and a gear 234 are freely mounted on the shaft 225 adjacent the gear 232 and are rigidly connected to the latter for rotation therewith. A gear 235 is mounted on the shaft 226 for rotation thereon and is arranged to engage the gear 234 to drive the latter. A code wheel 236 and a gear 237 are mounted on the shaft 226 adjacent the gear 235 and are rigidly connected to the latter for rotation therewith. A gear 238, a code wheel 239 and another gear 240 are rigidly connected together and are mounted on the shaft 225 for rotation thereon, the gear 238 being arranged to mesh with and to drive the gear 237. A gear 241, a code wheel 242, another code wheel 243 and a gear 244, are rigidly connected together and are mounted on the shaft 226 for rotation thereon, the gear 241 being arranged to mesh with and to drive the gear 240. A gear 245, a code wheel 246 and a gear 247 are rigidly connected together and are mounted on the shaft 225 for rotation thereon, the gear 245 being arranged to mesh with and to drive the gear 244. A gear 248, a code wheel 249 and a gear 250 are rigidly connected together and are arranged to rotate on the shaft 226, the gear 248 being arranged to mesh with and to drive the gear 247. A gear 251, a code wheel 252 and another gear 253 are rigidly connected together and are mounted on the shaft 225 for rotation thereon, the gear 251 being arranged to mesh with and to drive the gear 250. A gear 254 and a gear 255 are rigidly connected together and are mounted on the shaft 226 for rotation thereon, the gear 254 being arranged to mesh with and to drive the gear 253. A gear 256 (Fig. 19) carried on the shaft of an electric motor 257 is arranged to mesh with and to drive the gear 255. The motor 257 is affixed to the plate 212 by means of a bracket 258 and screws 259 and 260, adapted to engage threaded holes provided therefor in the plate 212. The motor 257 thus provides driving power for the gear train interconnecting the shaft of the motor 257 and the output shaft 225. Each pair of meshing gears is arranged to provide a gear ratio of 2:1, the slowest gear (228) being connected to the most major code wheel (227) and, through the clutch 225A, to the shaft 225. It will be evident that manual rotation of the shaft 225 would be quite difficult, in view of the gearing associated therewith.

Since manual setting of the shaft 225 is desirable for many applications of a transmitting transducer, an arrangement for manual control of the motor 257 will be described in detail hereinafter with Figs. 31, 32 and 32A. In a receiving transducer, the motor 257 would be operated under the control of a comparing and control circuit such as the one described in detail in connection with Fig. 7.

Axial movement of the various gear and code wheel assemblies mounted on the shafts 225 and 226 is prevented by the close spacing between adjacent assemblies. It will be observed that the code wheel 227 is the slowest of the code wheels, and thus corresponds to the most major code wheel of Fig. 2. The code wheel 230 rotates at twice the speed of the code wheel 227, while the speed of each of the code wheels 232, 236, 238, 242, 246, 249 and 252 is twice as great as the speed of the next preceding code wheel. The code wheel 243 operates at the same speed as the code wheel 242 for reasons which will be apparent from the discussion hereinafter. The configuration of each of the code wheels may be identical, since the binary coding desired is achieved through the speed ratio provided by the various gear trains. While each of the code wheels could be provided with brushes arranged to wipe successive conductive and non-conductive segments, in the embodiment of the invention illustrated in Figs. 14–19, each code wheel is formed as a cam having a land extending for about 180° of the periphery thereof and a groove extending for the remainder thereof. This is illustrated in Fig. 18, which shows the code wheel 246 having a land portion 246' and a groove portion 246". A shoe 260 carried on a block 261 is arranged adjacent the periphery of the code wheel 246 and is adapted to ride on the land 246' when the latter passes by the extremity 260' of the shoe 260, as the code wheel 246 rotates. The shoe 260 is arranged to close a pair of contacts 262 under action of the land 246' to provide a binary code indication corresponding to the indication provided in the previous arrangement when a brush wiped a conductive segment of its associated code wheel. Conductors 263 and 264, one of which may lead to ground potential and the other to a source of a positive potential through the control circuit or other apparatus, connect the contacts 262 to the external circuit. Either of the conductors 263 or 264 may lead to the relay associated with the code wheel 246. Each of the code wheels is provided with a shoe corresponding to the shoe 260 and a pair of contacts corresponding to the contacts 262. This is best illustrated in the schematic exploded view 14A.

Figure 15:
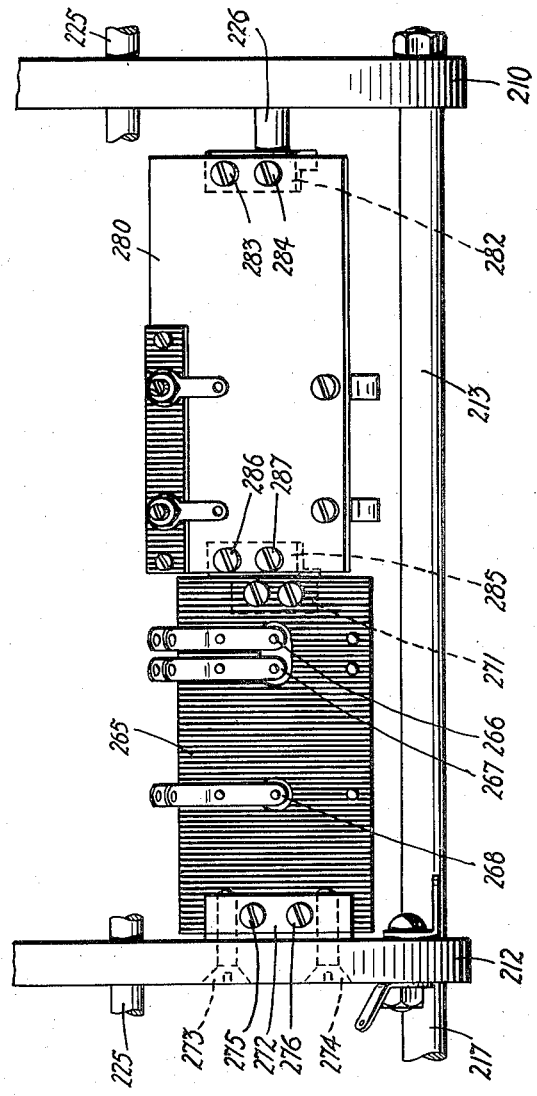
Fig. 15 is an elevational view of the transducer of Fig. 14, illustrating certain elements thereof omitted from Fig. 14 for purposes of clarity, this figure being taken along the line 15—15 of Fig. 17.

The block 261 carries not only the shoe 260, associated with the code wheel 246, but also the shoe associated with the code wheel 252. The block 261 is not shown in plan or elevation view in the drawings, although a similar block 265 is shown in Fig. 15 as well as in Fig. 18. The block 265 carries the shoes and contacts associated with the code wheels 242, 243 and 249, the contacts 266, 267 and 268 arranged to be closed by the associated shoes, respectively, being shown in Fig. 15. The block 261 is supported at one end thereof by an inwardly extending arm 270 having a hole provided therein for freely accommodating the shaft 225. The block 265 is likewise supported at one end thereof by an inwardly extending arm 271 shown in dotted lines in Fig. 15 and adapted to accommodate shaft 226. The other end of each of the blocks 261 and 265 is affixed to the plate 212, a bracket 272 connected to the plate 212 by screws 273 and 274 and to the block 265 by screws 275 and 276 being shown in Fig. 15. The bracket 272 and the similar bracket (not shown) associated with the block 261 provides a rigid connection of their associated blocks to the plate 212.

Figure 16:
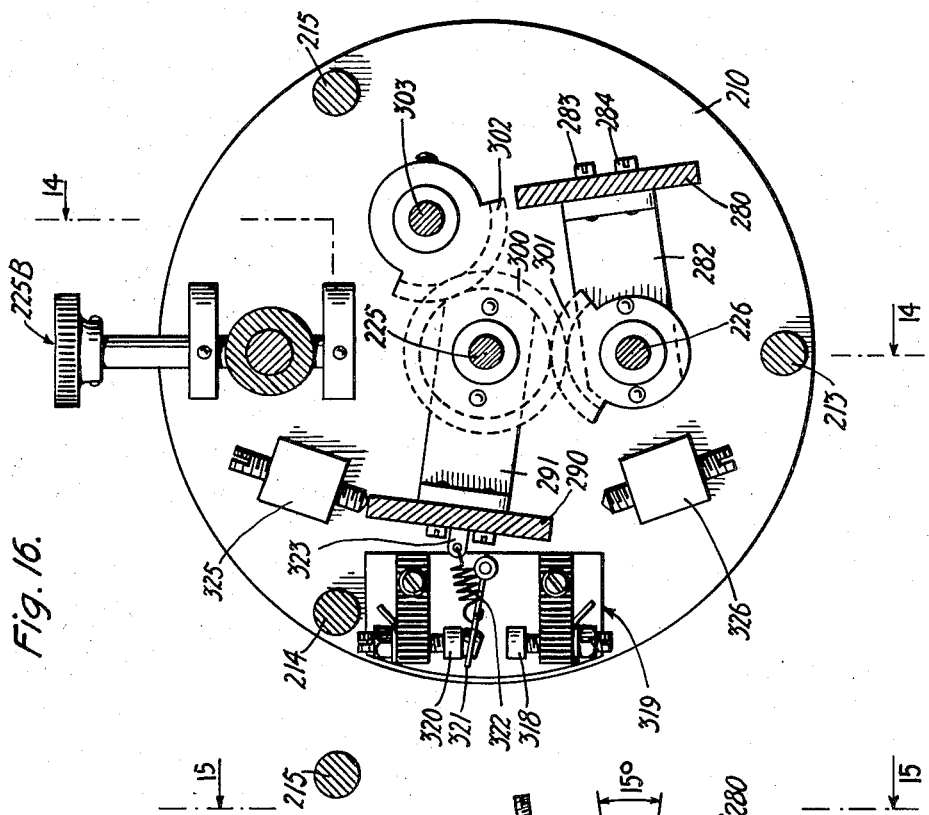
Fig. 16 is a sectional view taken along the line 16—16 of Fig. 14.
Figure 17:
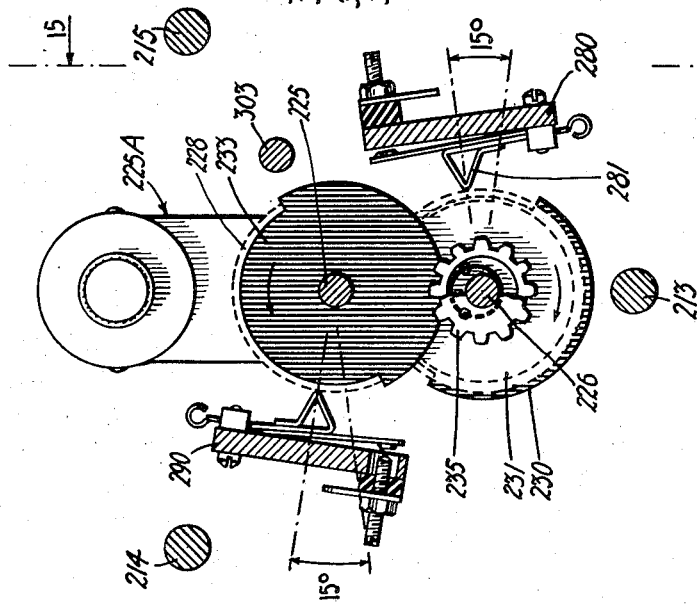
Fig. 17 is a sectional view taken along the line 17—17 of Fig. 14.
Figure 18:
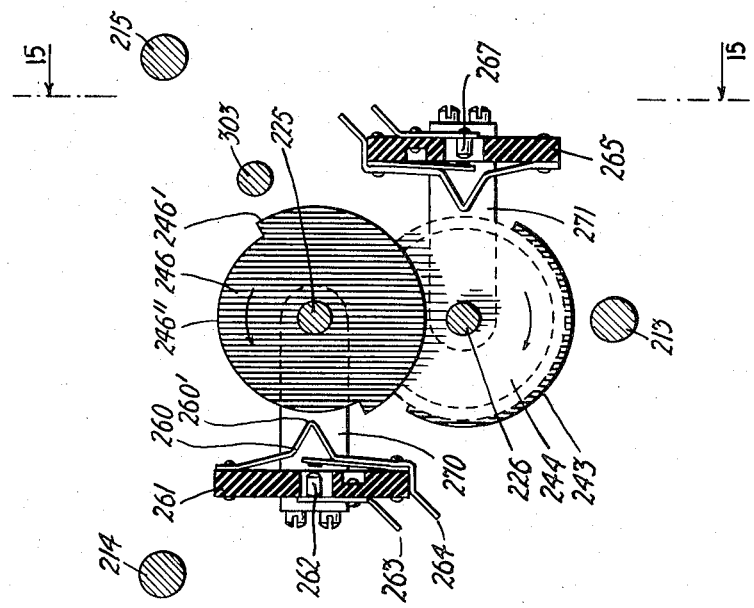
Fig. 18 is a sectional view taken along the line 18—18 of Fig. 14.
Figure 19:
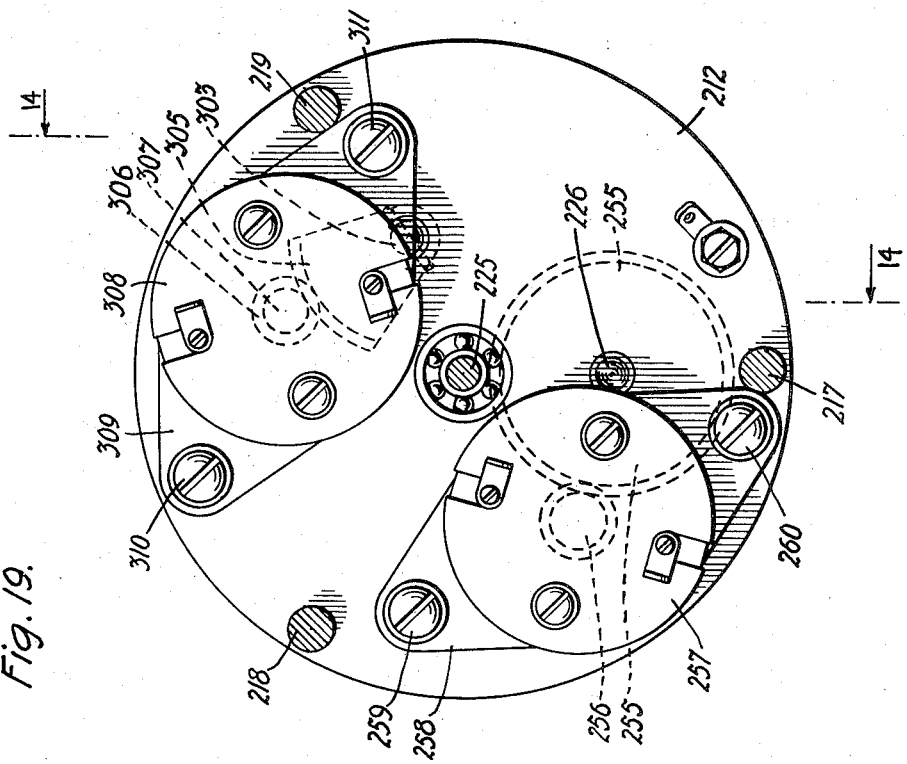
Fig. 19 is a sectional view taken along the line 19—19 of Fig. 14.

A metal plate or block 280 carrying a shoe 281 adapted to engage the land of the code wheel 230 is illustrated in Fig. 17. The plate 280 is also shown in Fig. 15. The plate 280 is rotatably mounted on the shaft 226 adjacent the plate 210 by means of a bracket 282 affixed to the plate 280 by means of screws 283 and 284 (Fig. 15). The plate 280 is similarly supported adjacent the other end thereof, by means of a bracket 285 affixed to the plate 280 by screws 286 and 287. A similar plate 290, shown in cross-section in Figs. 16 and 17, carries the shoes associated with the code wheels 277, 233 and 238 and is similarly rotatably mounted on the shaft 225. One of the brackets arranged for mounting the plate 290 is illustrated in Fig. 16, at 291. The plates 280 and 290, together with the shoes associated with the code wheels 230 and 233, are illustrated in Fig. 17.

Figure 20:
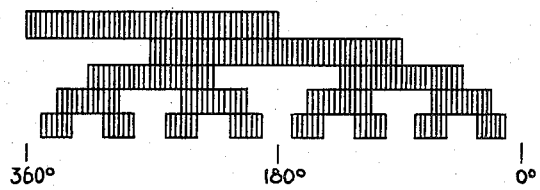
Fig. 20 illustrates a cyclic binary code.
Figure 21:
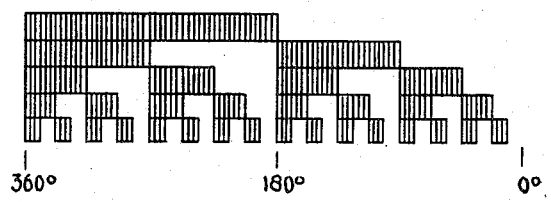
Fig. 21 illustrates a straight binary code.

The code wheels 277, 230, 233, 236 and 239 are arranged to provide a binary code indication similar to that provided by the code wheels 181–185 of Fig. 9, and hence it is desirable that Geneva action be provided. The mechanism for achieving the Geneva action will be described presently. The code wheels 242, 243, 246, 249 and 252, on the other hand, are positioned relative to each other so as to yield a binary cyclic code indication. The cyclic code, as illustrated in Fig. 20, is a binary combination in which a transfer from one segment to another occurs for only one code wheel at any one instant of time. Examination of Fig. 20 reveals that, as the five-code wheel group illustrated is read, as by brushes or cam action, no two dividing lines between segment will be crossed at the same instant of time. Hence, no ambiguity is likely to occur because of slight variations in axial alignments of the respective brushes, cam followers or the like. A five-code wheel straight binary arrangement is shown in Fig. 21 for comparison with the cyclic code of Fig. 20. From Fig. 21, which corresponds to the binary code hereinbefore discussed, it will be seen that at various instants of time the dividing lines between one, two, three, four or five code wheel segments will be crossed at the same instant, thus giving rise to possible ambiguity and rendering desirable the Geneva action as described. Of course, the minor code wheels 242, 243, 246, 249 and 252 could be arranged relative to each other to yield a binary code indication corresponding to the code of Fig. 21, rather than to the binary cyclic code of Fig. 20. In such case, it would be desirable generally to provide Geneva action for all code wheels instead of only the five most major code wheels. Furthermore, such a modification would require that the code wheel 243 operate at twice the speed of the code wheel 242, rather than at the same speed as presently indicated in Fig. 14. As illustrated, the code wheels 242 and 243 rotate at the same speed but are displaced 90° with respect to each other to accommodate the binary cyclic code of Fig. 20.

Since the straight binary code wheels 227, 230, 233, 236 and 239 must operate their associated contacts from "off" to "on," and vice versa, at the same instant, when required, Geneva action is desirable to avoid ambiguity. In the arrangement illustrated, this is achieved by providing a mechanism for imparting a Geneva-like motion to the plates 280 and 290, so that at the appropriate instants of time these plates will rock and carry their associated shoes through an arc approximately equivalent to the brush switching described in connection with Fig. 2. It will be remembered that the plate 290 was provided with an arm 291 having a hole therein arranged to accommodate the shaft 225. Similarly, the plate 280 is provided with an arm 282, similar to the arm 291 and having a hole arranged to accommodate the shaft 226. The end of the arm 291, which extends beyond the shaft 225, is provided with a gear or gear segment 300, as shown in Fig. 16. The gear teeth 300 are arranged to mesh with similar gear teeth 301, provided on the arm 282 and with a gear 302 provided on the end of a shaft 303. The arrangement is such that a rocking motion imparted to the shaft 303 produces a corresponding rocking of the plates 280 and 290 about the shafts 226 and 225, respectively, as pivots. It will be observed that each of plates 280 and 290 rocks about the shaft on which the code wheels associated with the respective plates rotate, so that rocking of the shoes and contacts is concentric with the associated code wheels. The shaft 303, which is journaled, at one end thereof, in the plate 210, is journaled at the other end thereof in the plate 212. Most of the shaft 303 is broken away in Fig. 14, for clarity. A gear segment 305 affixed to the end of the shaft 303 adjacent the plate 212, is arranged to mesh with a spur gear 306 provided on the end of a shaft 307 of an electric motor 308. The motor 308 is mounted on the plate 212 by means of a bracket 309 and screws 310 and 311. The gear segment 305 and the spur gear 306 are shown in dotted lines in Fig. 19.

When the motor 308 is energized in one direction, the spur gear 306 engages the gear segment 305, thereby rocking the shaft 303 in a direction opposite to the direction of rotation of the motor 308. Rocking of the shaft 303 is imparted to the plates 280 and 290, causing them to rock in opposite directions about their respective shafts. When the last tooth of the gear segment 305 has been reached, no further rocking should occur until the direction of rotation of the motor 308 is reversed, at which time the rocking operation will be repeated in the reverse direction, thereby returning the plates 280 and 290 to their initial positions. This corresponds to the Geneva action achieved in Fig. 2 by transferring control between the brushes of a pair, in that as soon as the rocking has taken effect, a different point along the code wheel periphery will control the circuit energization or deenergization. A rocking action of about 15°, as shown in Fig. 17, has been found desirable, although other rocking angles can be used. In operation, the plates 280 and 290 will be either in the extreme position illustrated in Fig. 17, or in the extreme position corresponding to the other end of the 15° arc of rock.

Since Geneva action is provided only for the code wheel 239 and those major thereto, it has been found desirable to control the operation of the Geneva or rocking motor 308 from the code wheel 242, the code wheel next most minor to the code wheel 239.

Figure 22:
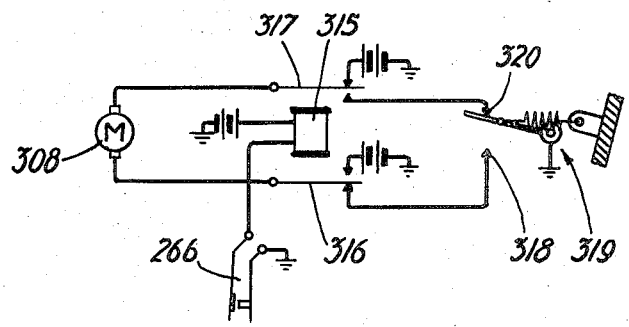
Fig. 22 illustrates a circuit arrangement for effecting Geneva action in the low speed code wheels in the transducer of Figs. 14–19.

The circuit for securing the desired Geneva action is illustrated in Fig. 22 and comprises a relay 315, the coil of which is coupled between a source of positive potential and ground, through the contacts 266 (also shown in Fig. 15). The contacts 266 are closed when the land portion of the associated code wheel 242 engages the corresponding shoe mounted on the stationery block 265 (Fig. 15). The relay 315 is provided with two armatures 316 and 317, each having a front contact and a back contact. The back contact assoicated with armature 316 is connected to a fixed contact 318 of a toggle switch assembly 319. The front contact associated with the armature 317 is connected to another fixed contact 320 of the toggle switch 319, while the movable contact or armature 321 of the switch 319 is connected to ground. As shown in Fig. 16, the armature 321 of the switch 319 is connected through a spring 322 to an eye provided in a bracket 323 mounted on the plate 290. The arrangement is such that, with the plate 290 rocked in the position illustrated, the spring 322 will urge the armature 321 into engagement with the contact 320. When the rocking motor 308 rocks the plate 290 to the other position thereof, the spring 322 will cause the armature 321 to break with the contact 320 and to make with the contact 318. The front contact associated with the armature 316 and the back contact associated with the armature 317 are each connected to a source of positive potential. The armatures 316 and 317 are connected to respective terminals of the rocking motor 308.

When the contacts 266 are closed, upon engagement of the land of the code wheel 242 with the associated shoe, the relay 315 will be energized and will complete an energizing circuit for the rocking motor 308, thus causing the same to rock the plates 280 and 290 from the positions illustrated in Figs. 16 and 17 to positions approximately 15° away, the rocking occurring about the center lines of the respective shafts 226 and 225. This energizing circuit extends from the source of positive potential through the front contact and armature 316, through the rocking motor 308, through the armature 317 and associated front contact and through the fixed contact 320 and the armature 321 to ground. As soon as the rocking of the plates 280 and 290 to their new positions is complete, the spring 322 will cause the armature 321 to open the circuit at the contact 320 and to make with the contact 318. Opening of the circuit at the fixed contact 320 breaks the energizing circuit for the rocking motor 308. When the shoe associated with the code wheel 242 rides off the land portion of the latter, the relay 315 will be deenergized and will thus complete an energizing circuit for the rocking motor 308, the circuit being arranged to rotate the motor 308 in the opposite direction from that described above. This latter energizing circuit extends from the source of positive potential through the back contact and armature 317, through the rocking motor 308, through the armature 316 and assiocated back contact and through the contact 318 and the armature 321 to ground. As soon as the rocking motor has rocked the plates 280 and 290 to the positions illustrated in Fig. 16, the spring 322 will cause the armature 321 to open the rocking motor energizing circuit at the contact 318 and to engage the contact 320. The rocking motor 308 will thus be stopped and the Geneva circuit will be prepared for the next Geneva rocking movement to take place when the land of the code wheel 242 again engages the associated shoe. A pair of stops 325 and 326 (Fig. 16) arranged to engage the plate 290 is provided for stopping the rocking motion of the plates 280 and 290 at either end of the desired motion thereof. The stops 325 and 326 are adjustable to facilitate careful regulation of circuit operation. Since the Geneva action is controlled by the code wheel 242, which is the most major code wheel of the cyclic groups, the angular location of the code wheel 242 relative to the location of the code wheels more major thereto should be carefully adjusted to provide Geneva action at points of transition from segment to segment of these major code wheels. Since all of the code wheels are identical, i. e., each being provided with a single land and a single groove, and since the code wheel 242 operates at twice the speed of the code wheel 239, the leading edge of the land of the code wheel 242 should be adjusted to close the contacts 266 at the same time as the lands of the more major code wheels 227, 230, 233, 236 and 239 engage their respective shoes to close their respective contacts. Similar coincidence of operation should be provided during the transition from land to groove.

Figure 23:
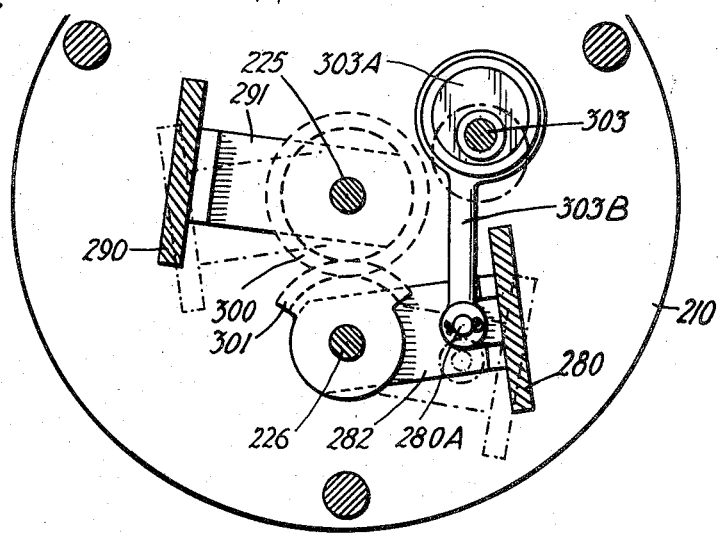
Fig. 23 is a sectional view similar to Fig. 16 and illustrating a modification of the transducer of Figs. 14–19.

It will be remembered that Geneva action on the five major code wheels 227, 230, 233, 236 and 239 is obtained by mounting the associated contacts on plates or tables which are rocked from the "off" to the "on" position and vice versa at the proper time, the tables being driven by the motor 308. It is required that the tables remain in either one or the other position thereof until the motor 308 operates to change the position. When the current to motor 308 is shut off, friction of the code wheels against the contact shoes may have a tendency in some cases to cause the plates or tables to creep from the extreme positions thereof toward the opposite positions, thereby permitting ambiguity of readings. Where this problem is serious, it may be overcome conveniently by providing an eccentric on the shaft 303 and coupling the eccentric to one of the Geneva plates 280 or 290. A suitable mechanism for this purpose is illustrated in Fig. 23, which shows the shaft 303 provided with an eccentric 303A, coupled to the Geneva table 280 by means of an arm 303B having a strap portion surrounding the eccentric and another portion connected to the table 280 by means of a pin 280A, connecting one end of the arm 303B to a bracket provided at the center of the table 280. The eccentricity of the eccentric or cam 303A should be chosen so that the eccentric will come to dead center position at each extreme rocking of the table 280. The table 280 is thus locked against unwanted motion until the motor 308 is again operated. In Fig. 24, the solid lines indicate one extreme position of the table 280, while the dotted lines indicate the other extreme position thereof. Motion may be transmitted to the other Geneva table 290 through the meshing gear sectors described above.

Figure 24A:
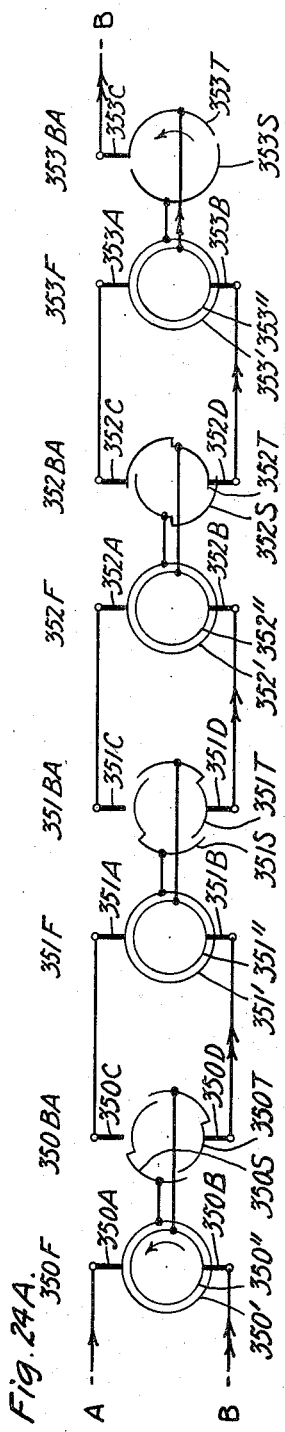
Figs. 24A and 24B illustrate the transducer of Fig. 24 in rotational positions different from that of Fig. 24.

For many applications, the receiving and transmitting transducers should be as simply constructed as possible mechanically to eliminate the possibility of mechanical breakdown of the units, in service. Furthermore, to facilitate manufacture, the majority of the code wheels should preferably be identical in construction. There will now be described a transducer unit in which all except one of the code wheels are identical and in which Geneva action is secured without providing a mechanical shifting of brushes or contacts and hence ambiguity is eliminated by a construction which may be relatively simple and rugged to provide long trouble-free service. Referring now to Figs. 24, 24A and 24B, there is illustrated in schematic form a transducer arrangement comprising four code wheels and in which the front and back of each code wheel is shown together with the electrical connections therebetween. The code wheels are 350–353 and the front faces thereof are designated with the letter F while the back faces thereof are designated with the letters BA. The front face of the code wheel 350 is provided with two continuous slip rings 350' and 350" arranged to be wiped by brushes 350A and 350B, respectively. The back face of the code wheel 350 is provided with a pair of slip rings 350S and 350T each extending for about 180° of the periphery of the code wheel and each arranged to be wiped by a respective one of brushes 350C and 350D. The slip ring 350S is provided with an outer portion arranged to be wiped by the brush 350C and an inner portion arranged to be wiped by the brush 350D during respective portions of the rotation of the code wheel 350. Similarly, the slip ring 350T is provided with an outer portion arranged to be wiped by the brush 350C and an inner portion arranged to be wiped by the brush 350D. The arrangement is such that the brush 350C contacts the slip ring 350S at the same time that the brush 350D contacts the slip ring 350T while the brush 350C contacts the slip ring 350T when the brush 350D contacts the slip ring 350S. Thus the brushes 350C and 350D are each in contact with the corresponding portions of the slip rings for 180° of rotation of the code wheel 350, the 180° being made up of spaced 90° segments. The slip ring 350' is internally connected to the slip ring 350S while the slip ring 350" is internally connected to the slip ring 350T. The code wheel 351 having a front face 351F and a back face 351BA may be constructed in the same manner as the code wheel 350 and the various portions thereof are provided with similar reference characters. The code wheel 352 may likewise be identical to the code wheels 350 and 351. The front face 353F of the code wheel 353 corresponds to the front face of the other code wheels while the back face 353BA of the code wheel 353 is provided with two semicircular isolated slip rings 353S and 353T arranged to be wiped selectively by a brush 353C. The brush 350C is connected directly to the brush 351A while the brush 350D is connected to the brush 351B. The brush 351C is connected to the brush 352A while the brush 351D is connected to the brush 352B. The brush 352C is connected to the brush 353A while the brush 352D is connected to the brush 353B. The brushes 350A and 350B are connected to respective input terminals designated A in, B in, while the brush 353C is connected to an output terminal designated A or B out.

The A and B input terminals may be connected to sources of potential for supplying the desired types of output to the control unit. Thus, for the control circuit of Fig. 7, the A input might be a source of positive potential while the B input would be disconnected or open. Alternatively, the A input might be positive and the B input negative or the A input might be one phase of a multiphase alternating current source while the B input might be another phase thereof. With the A input connected to a source of potential and the B input open, the output will be the "on-off" code described hereinbefore. A suitable circuit arrangement for a receiving transducer is illustrated in Fig. 30. In order to provide the desired binary code output and the desired Geneva action, the rotational position of each code wheel must determine its output while the output must shift from one input to the other under the control of the most minor wheel, i. e., the code wheel 353. In other words, the output brush 353C must be connected to the input A for 180° rotation of the code wheel 350 and to the input B for the next 180° rotation. Change from one input to the other must be controlled by the code wheel 353. The code wheel 350 which is the most major code wheel is connected to the output shaft of the transducer (or input shaft of a transmitting transducer) while the code wheel 351 is arranged to rotate at twice the speed of the code wheel 350. Similarly, the code wheel 352 rotates at twice the speed of the code wheel 351 while the code wheel 353 rotates at twice the speed of the code wheel 352. For additional accuracy, more code wheels may be provided and each will be identical with the code wheels 350-352, only the most minor code wheel requires a different construction. From the following discussion, it will be understood that the desired switching action is independent of the number of code wheels and will therefore be the same for four code wheels as illustrated as for 16 or any other convenient number of code wheels.

Figure 24:
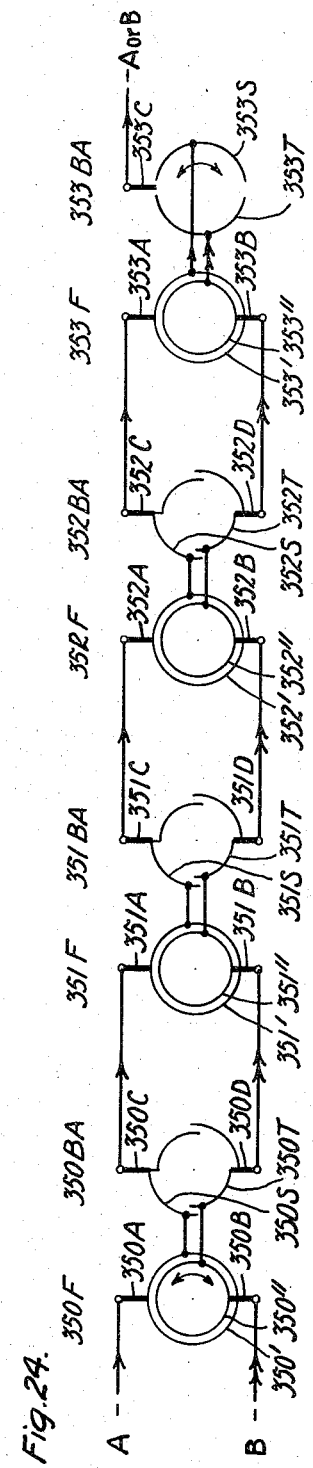
Fig. 24 is a schematic representation of another form of transducer constructed in accordance with the invention.
Figure 24B:
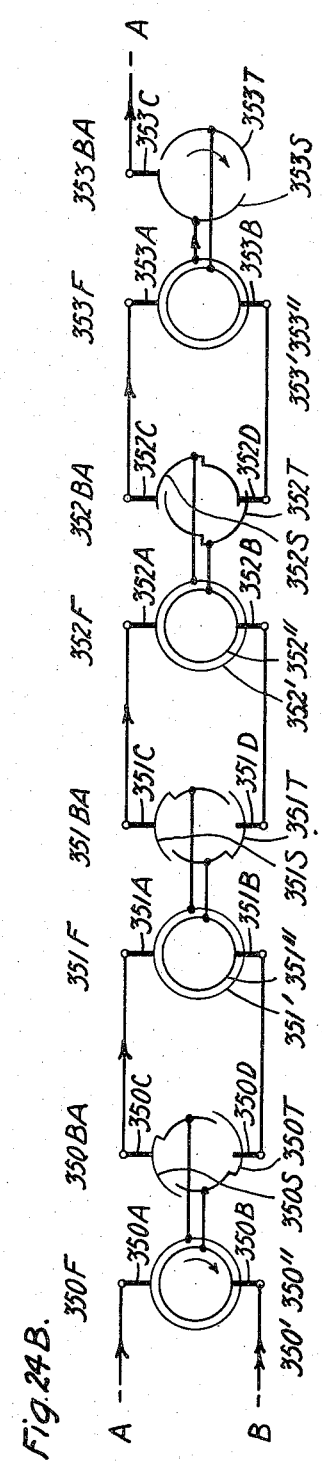

All of the brushes and slip rings illustrated in Fig. 24 are required for controlling the output of the most major code wheel 350. A similar series of brushes and slip rings is required for each succeeding code wheel, as will be described in greater detail hereinafter. However, for convenience in describing operation of the arrangement, only the circuit for the most major code wheel is shown in Fig. 24. In Fig. 24, each of the code wheel is in the zero position of a binary code and therefore may be considered at zero degree rotation. In this position, the output from the code wheel 350 must change from input A to input B (or from "on" to "off") with a very slight motion of the most minor code wheel 353. Tracing the path from the A input to the output in Fig. 24, it will be observed that current flows from the A input through the brush 350A, the slip ring 350', the slip ring 350S, the brush 350C, the brush 351A, the slip ring 351', the slip ring 351S, the brush 351C, the brush 352A, the slip ring 352', the slip ring 352S, the brush 352C, the brush 353A, the slip ring 353', the slip ring 353S and through the brush 353C to the output terminal. A similar circuit may be traced from the B input (which is here considered open) except that the slip ring 353T is not connected to the output terminal. As soon as the code wheel 353 rotates a short distance in the clockwise direction indicated, the brush 353C will connect the slip ring 353T to the output terminal, thus providing a conductive path between the B input terminal and the output terminal. Since the B input terminal represents an open circuit, the output will have shifted from a condition or current flow to non-current flow or from "on" to "off." It will be observed that a small rotation of the most minor code wheel 353 will represent an even smaller rotation of the most major code wheels. Continued rotation of the code wheels after a change of output must cause no further change of output until the most major code wheel 350 has rotated 180°. In Fig. 24, counterclockwise rotation from the zero degree position causes a continued connection of the A input terminal to the output terminal while clockwise rotation causes a connection of the B input terminal to the output terminal. It will be noted that a 180° rotation of the code wheel 353 in either direction will correspond to a 22½° rotation of the code wheel 350. However, no change in output should result until a 180° rotation of code wheel 350 occurs. The four code wheels in positions corresponding to 180° counterclockwise rotation of the code wheel 353 are illustrated in Fig. 24A and a similar view for a clockwise rotation of 180° is illustrated in Fig. 24B. From Fig. 24A, it will be observed that the B input will be connected to the output with this rotation, which corresponds to the condition described above for clockwise rotation. Similarly, in Fig. 24B the A input will be connected to the output for a clockwise rotation of 180° of the code wheel 353.

Another critical position of the code wheels occurs at the time that code wheel 353 is within 180° of the next output change (code wheel 350 within 22½° of its 180° position). In Fig. 25, the code wheels are illustrated in their 180° position, while in Fig. 25A they are illustrated in the position corresponding to a counterclockwise rotation of 22½° of the code wheel 350 from its 180° position and in Fig. 25B in a position corresponding to a clockwise rotation of the code wheel 350 to 22½° from its 180° position. From Fig. 25A, it will be observed that the A input is still connected to the output and so still corresponds to Fig. 24B. Thus, in traveling in a clockwise direction from the zero degree position of Fig. 24 to the 180° position of Fig. 25, the A input continues to be connected to the output. For travel in a counterclockwise direction, through the position of Fig. 24A and the position of Fig. 25B, the B input should be connected to the output until the 180° position is reached. It will be observed from Figs. 24A and 25B that this condition is met. Thus, for 180° of rotation of the code wheel 350 in either direction from the zero degree position, no further change in output occurs. When going through the 180° position of Fig. 25, a change will occur and it should be observed that this change is opposite to the change which occurred at the zero degree position for a similar direction of rotation. For convenience in tracing the circuits, the A input and its associated circuit have been illustrated with single arrowheads, while the B input and its associated circuit have been indicated with double arrowheads.

In the arrangement of Figs. 24 and 25 having four code wheels, all outputs are derived from the most minor code wheel, i. e., code wheel 353, and hence the front face of this code wheel requires eight slip rings while the back face requires four slip rings each divided into two insulated approximately 180° segments. The code wheel 352 would require six slip rings on each face, the code wheel 351 four slip rings on each face, and the code wheel 350 two slip rings on each face (as illustrated). However, so that all major wheels may be interchangeable in assembly, it is desirable that all of the code wheels except the most minor one be constructed identically and hence each should be provided with eight slip rings on each face. Thus, for a ten-code wheel system, each code wheel, except the most minor one, should have twenty slip rings on each face.

Figure 26:
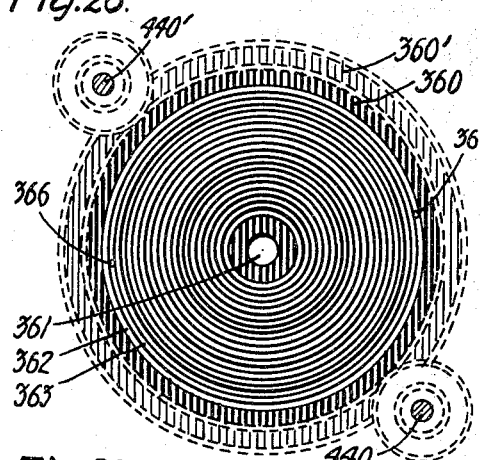
Fig. 26 is a view of one face of the most minor code wheel of a type suitable for use in an arrangement such as the one illustrated in Figs. 24 and 25.
Figure 26A:
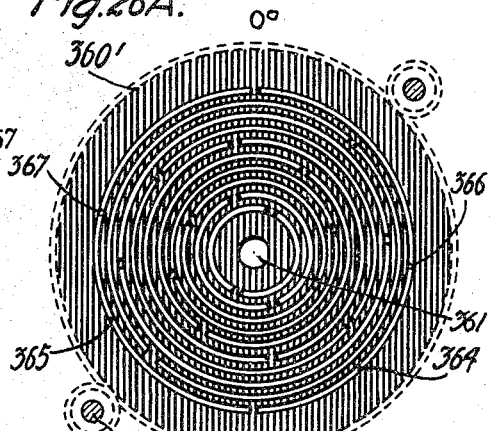
Fig. 26A is a view of the opposite face of the code wheel illustrated in Fig. 26.

In Figs. 26 and 26A, there are illustrated the front and back, respectively, of the most minor code wheel of a group of ten code wheels. This code wheel thus corresponds to the code wheel 353 of Fig. 24. The code wheel comprises a front disk 360 and a back disk 360' each having a central hole 361 adapted to accommodate the shaft on which the disks are mounted for rotation. The diameter of the front disk is larger than that of the back disk and each is provided with peripheral gear teeth, as shown. The two disks 360 and 360' are rigidly connected together to form the code wheel. The front face 360 of the code wheel is provided with ten pairs of slip rings, one pair for each of the code wheels. The outer pair, 362 and 363, correspond to the slip rings 353' and 353" of Fig. 24. All of the slip rings on the front face of the code wheel 360 are concentric and each is provided with a pair of slip rings for each code wheel. However, on the back face 360' of the code wheel, the slip rings of each pair have the same radius and each subtends a circular arc slightly less than 180° thereby leaving a gap. The slip rings corresponding to the slip rings 353S and 353T of Fig. 24 are the slip rings 364 and 365, respectively. Internal connections through the thickness of the code wheel are provided between the slip ring 363 and the slip ring 364, as indicated at 366, while a similar internal connection between the slip ring 362 and the slip ring 365 is indicated at 367. Similar internal connections are provided for the other pairs of slip rings. The faces 360 and 360' of the code wheel may conveniently be constructed as printed circuits having conductive and non-conductive areas and in which the conductive areas are adapted to be wiped by brushes for appropriate completion of the circuits as described above. The output of each code wheel is derived from the back face 360' of the code wheel and hence the brushes wiping this face should be connected to the external equipment such as a comparing and control circuit of the type indicated in connection with Fig. 7. For a receiving transducer, the connections may be made as shown in Fig. 30.

Figure 27:
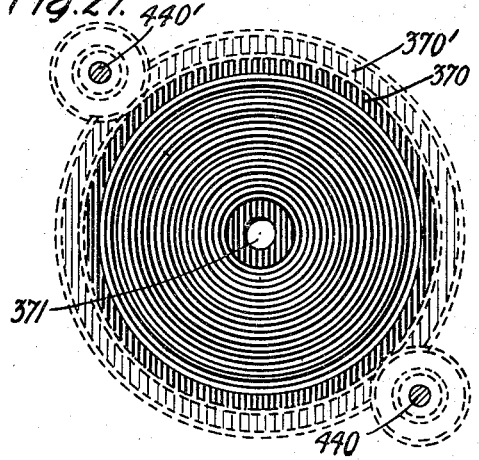
Fig. 27 is a view of one face of a major code wheel for use in the arrangement of Figs. 24 and 25.
Figure 27A:
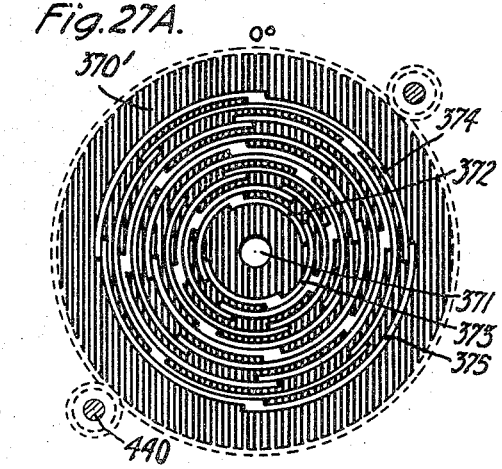
Fig. 27A is a view of the face opposite the face illustrated in Fig. 27.

The front and back faces 370 and 370', respectively, of a code wheel suitable for use as any one of the nine most major code wheels of a ten-code wheel group are illustrated in Figs. 27 and 27A, respectively. The disks 370 and 370' forming the code wheel of Figs. 27 and 27A are provided with a central hole 371 adapted to receive the shaft on which the code wheel is mounted. The front face 370 of the code wheel (Fig. 27) is identical with the front face of the code wheel 360 (Fig. 26). The back face 370' (Fig. 27A) differs from the back face 360' of the code wheel of Fig. 26A, in that each slip ring subtends a circular arc slightly greater than 180° and each is provided with one approximately 90° portion having a slightly greater radius than the other approximately 90° portion. The corresponding portions of the slip rings of each pair have identical radii so that the corresponding brushes will be able to wipe the appropriate portions of the slip rings at the desired times. The innermost pair of slip rings 372 and 373 corresponds to the most minor code wheel, while the outermost pair 374 and 375 corresponds to the most major code wheel, i. e., the code wheel of Figs. 26 and 26A. Each pair of slip rings of the code wheel of Figs. 27 and 27A is displaced approximately 40° from the slip rings of the adjacent pairs, so that the brushes arranged to wipe the same will not be located on a radial line, thus facilitating the location of the brush holders on the cooperating stator member. The inputs for the most major code wheel are located on the front face of the most major code wheel and are transmitted through suitable brush connections from code wheel to code wheel to the output on the back face of the most minor code wheel, as indicated at Fig. 24. The inputs for the other code wheels are made through brushes wiping these respective code wheels. Thus the second code wheel front face will be wiped by four brushes, two for its input and two for the first code wheel circuit. At any instant of time, there will be ten outputs from the code wheel 360. These outputs will indicate in binary digital code the angular disposition of the shaft which rotates at the speed of the most major code wheel. As pointed out hereinbefore, the output may consist of an "on-off" indication, or other suitable 2-digit code indication, such as positive and negative potentials. With the former, i. e., "on-off," actually only a single input will be provided for each pair of slip rings, since the function of the second input will be merely to indicate an open circuit or no-current condition.

Figure 29:
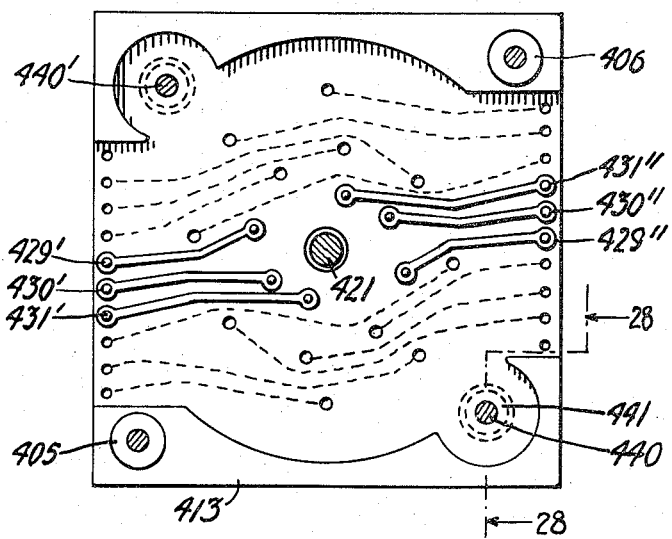
Fig. 29 is a view of a stator plate and is taken along the line 29—29 of Fig. 28.
Figure 28:
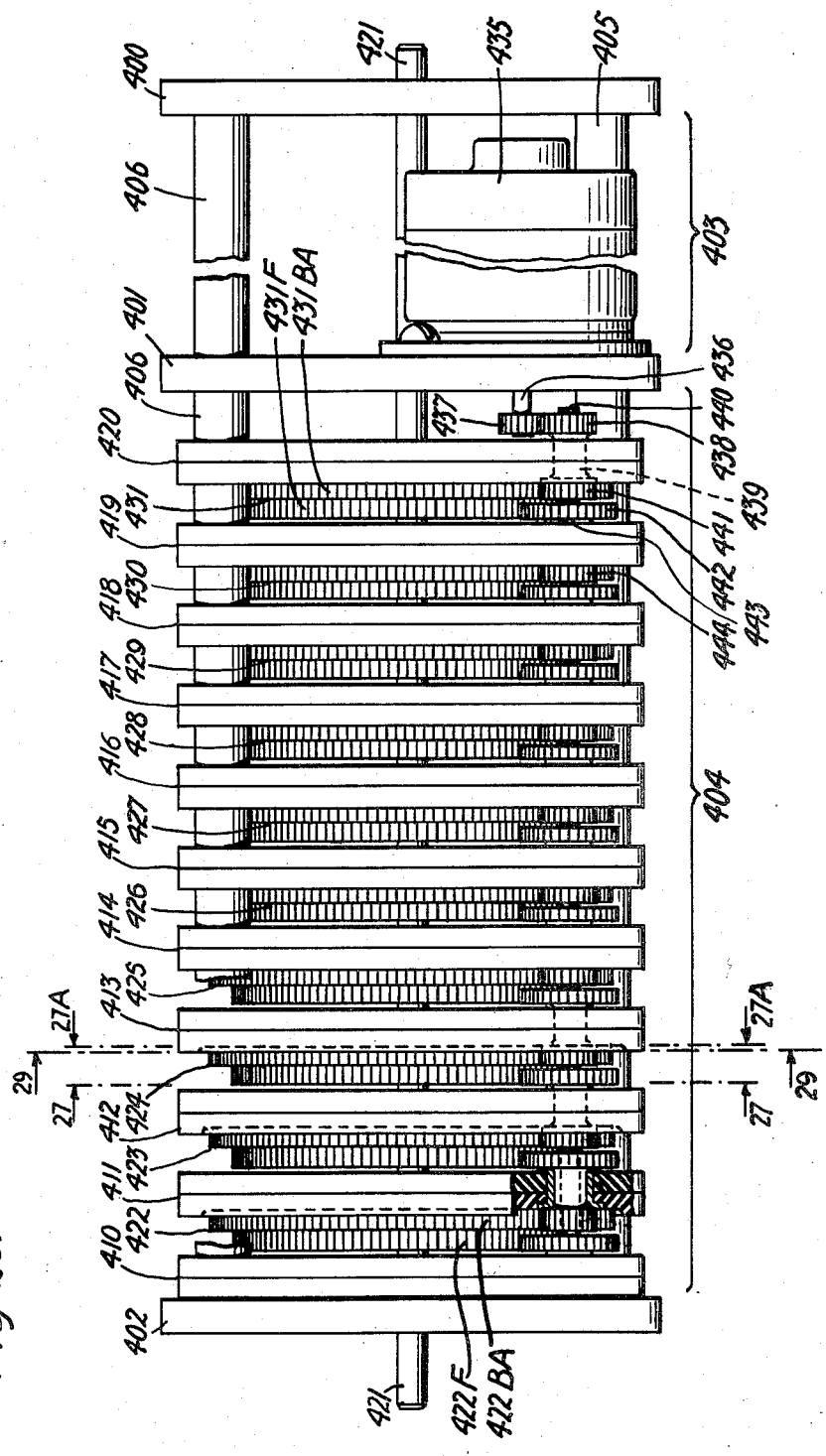
Fig. 28 is an elevational view, partly in cross-section, of a transducer assembly employing code wheels of the type shown in Figs. 26 and 27.

The mechanical construction of a suitable transducer unit for carrying code wheels of the above type is illustrated in Figs. 28 and 29, Fig. 29 being a cross-sectional view through the stator portion of the transducer unit with the rotor elements indicated in dotted lines. The transducer unit comprises three rectangular wall members 400, 401 and 402, suitably spaced to provide a motor compartment 403 and a code wheel compartment 404. At one corner of the unit, there is provided a rod 405 (Fig. 29) held at one end thereof in the member 400 and at the other end thereof in the member 402. A like rod 406 (Fig. 29) is provided in the diagonally opposite corner of the unit. The rods 405 and 406 maintain the members 400 and 401 in suitably spaced relationship. Between the members 401 and 402 there are provided eleven stator brush-retaining plates 410–420, each separated by a relatively thin spacing washer mounted on the rod 405 and a like washer mounted on the rod 406. As will be explained more fully in connection with Fig. 29, these stator plates are adapted to retain the brush elements in proper alignment for contacting the various code wheels. The plate 410 is affixed to the member 402, while the plate 420, at the other end of the compartment 404, is spaced from the member 401.

At the center thereof, the members 400, 401 and 402 are provided with circular holes adapted to receive and journal for rotation a shaft 421. In a receiving transducer, the shaft 421 is the output shaft which is to be positioned, while in a transmitting transducer the shaft 421 is the shaft which is to serve as a guide for positioning the receiving transducer shaft. The most major code wheel, i. e., the slowest code wheel, is formed as two disks connected together and mounted on the shaft 421 for rotation therewith. This code wheel is designated by the numeral 422 and is located between the stator plates 410 and 411. The front face, corresponding to the disk 370 of Fig. 27, is designated 422F while the back face, corresponding to the disk 370' of Fig. 27A, is designated 422B.

The most minor code wheel, i. e., the fastest code wheel, is likewise formed as two disks connected together and mounted on the shaft 421. This code wheel, which is designated by the numeral 431, is freely rotatable on the shaft 421 and is located between the stator plates 419 and 420. The front face of the code wheel 431 is designated 431F and corresponds to the disk 360 of Fig. 26. The back face of the code wheel 431 is designated 431B and corresponds to the disk 360' of Fig. 26A. The code wheels located between the code wheels 422 and 431 are, in descending order of majority, 423, 424, 425, 426, 427, 428, 429 and 430. It should be understood, of course, that any other suitable number of code wheels could be employed, depending upon the accuracy desired. Each of the code wheels 423—430 is mounted on the shaft 421 for rotation thereabout and is located between a respective pair of the stator plates 411—419.

A motor 435 is mounted on the member 401 and extends within the compartment 403. The shaft 436 of the motor 435 extends between the member 401 and the stator plate 420 and is provided at the outer end thereof with a drive gear 437 arranged to mesh with a gear 438 mounted for rotation on a sleeve 439 carried by a countershaft 440 (Fig. 29). The countershaft 440 is journaled at one end thereof in the plate 401 and, at the other end thereof, in member 402 and extends through suitable holes provided in the stator plates 410–420. The sleeve 439 is journaled for rotation in the stator plate 420 and extends approximately half-way between the stator plates 419 and 420. The sleeve 439 carries at the end thereof a gear 441 adapted to mesh with the gear teeth of the disk 431B and thus to drive the code wheel 431. The disk 431F which rotates with the disk 431B is likewise provided with teeth along the periphery thereof. These teeth mesh with a gear 442 carried on a sleeve 443 extending through the stator plate 419 and arranged to rotate about the shaft 440. It will be remembered that the front faces of the code wheels have smaller diameters than the back faces so that the gear 441 which meshes with the face 431B has a smaller diameter than the gear 442 which meshes with the front face 431F. The sleeve 443 carries at the other end thereof a gear 444 similar to the gear 441. The gear 441 meshes with the back face of the code wheel 430. The gear ratio of the train of gears intercoupling the code wheel 431 and the code wheel 430 is such as to drive the code wheel 430 at one-half the speed of the code wheel 431. A like assembly of gears intercouples the remaining code wheels so that each will be driven at one-half the speed of the next most minor code wheel. The most major code wheel, i. e., the code wheel 422 is thus driven at $\frac{1}{512}$ the speed of the code wheel 431. The code wheel 422, being rigidly affixed to the shaft 421 causes the latter to rotate. Thus in a receiving transducer, power supplied to the motor 435 under control of the comparing and control circuit causes the shaft 421 to assume the desired angular position. In a transmitting transducer, means may be provided for similarly adjusting the angular position of the shaft 421 through operation of the motor 435. If desired, manual means for positioning the shaft 421 of a transmitting transducer may be provided.

In order to reduce backlash in the gear trains intercoupling the various code wheels and thus to provide greater accuracy, a similar train of gears may be arranged to mesh with the respective code wheels, as shown in Fig. 29. Thus, a shaft 440′ may be provided diagonally opposite to and parallel with the shaft 440. The shaft 440′ carries sleeves similar to the sleeves carried by the shaft 440 and which in turn carry the gears arranged to mesh with the code wheels. These latter gears may be spring loaded to reduce backlash.

In Fig. 29, which is a view of one face of the stator plate 413, the stator plate positioned between the code wheels 424 and 425, there are provided in the center portion a number of brush holders and along the outer portion a number of terminals, each brush holder being connected to a terminal by means of a printed circuit. The brush holders and terminals shown connected by dotted lines represent additional elements which would be provided for stator plates associated with more minor code wheels. The brushes are adapted to extend outwardly from the respective faces of the stator plate to engage the corresponding slip rings on the back and front faces of the code wheels 424 and 425, respectively. Along the left edge of the plate 413 in Fig. 29, there are shown terminals 429′, 430′ and 431′. Along the right edge of the plate 413 there are shown terminals 430″, 429″ and 428″. Each of these terminals is connected to the corresponding brush. Each stator plate is provided with two wire connections which are equivalent to the make and break springs of a relay C contact. These represent the input connections for the next most minor code wheel. Thus the stator plate 410 will be provided with two input terminals and the circuits made therethrough will extend in cascade fashion through the various code wheels and will be taken out through brushes provided in the stator plate 420. The stator plate 411 will likewise be provided with input terminals and brushes and also terminals and brushes for carrying the circuits from the plate 410.

When operating, the transducer of Figs. 28 and 29 is electrically equivalent to a group of relay C contacts. The first contacts operate and release at the frequency of rotation of the output shaft 421. The second contacts operate and release at twice this frequency, the third at four times the frequency, and so on to the tenth which operate and release at 512 times the frequency. This construction insures that proper Geneva action will be achieved, i. e., all contacts operate and release at the same instant under control of the most minor code wheel.

The code wheels of Figs. 24–29 may be utilized in connection with a comparing and control circuit somewhat simpler than the circuit of Fig. 7. A suitable circuit constituting a modification of Fig. 7 is illustrated in Fig. 30 which shows the slip rings 422F 101–431F 110 which would be provided on the respective front faces of the major code wheels and the slip rings 431BA 101–431BA 110 provided on the back face of the most minor code wheel. The intervening code wheels are not all illustrated (only those for a five-code wheel transducer being shown) but would correspond to the connections shown for the most major code wheel in Fig. 24. The relays 91T–100T, Q, REV, ML and MR correspond to the like relays shown in Fig. 7. It will be observed, however, that the relays 91R–100R are omitted. This can be done since the code wheel circuits provide the same switching action achieved in the arrangement of Fig. 7 by means of the relays 91R–100R. In Fig. 7, the armature 124 of relay 91R supplies positive potential selectively to the armatures 116 and 117 of the relay 91T. In Fig. 30, this selective application of potential is achieved by connecting the source of positive potential to the brush wiping the split slip ring segments corresponding to the most major code wheel and located on the most minor or output code wheel. Thus the brush 124′ of Fig. 30 corresponds to the armature 124 of Fig. 7. The brushes wiping the slip rings on the face of the most major code wheel and corresponding to the most major code wheel, i. e., the slip rings 101 of code wheel 422F, are employed selectively to apply the positive potential from the brush 124′ to the armatures 116 and 117. The selection is achieved by the connections provided in the intervening code wheels and correspond to the arrangement illustrated in Fig. 24. Similarly, the brushes 125′–127′ correspond to and function as the armatures 125–127 of Fig. 7. The other pairs of slip rings provided on the front faces of the code wheels 423F 101–431F 110 are wiped by brushes which provide connections corresponding to the front and back contacts associated with the armatures 125–127 of Fig. 7. It will be seen that the operation of the circuit of Fig. 30 corresponds to the operation of Fig. 7 since the code wheels operate exactly as the armatures and contacts of the relays 91R–100R (Fig. 7) operate under control of their respective code wheels 101R–110R.

As was pointed out hereinbefore, for many purposes it is desirable to provide for manual rotation of the transmitting transducer input shaft. Due to the high gear ratio provided in the various forms of the transducer described, it will generally not be possible to provide direct manual rotation of the input or low speed shaft. Rotation of the high speed shaft will require 512 turns (in the arrangement of Fig. 28) to achieve one turn of the low speed shaft. Such a large number of turns would be impractical for most purposes. In accordance with a feature of the invention, means may be provided to operate in conjunction with the transmitting transducer for providing manual control of the low speed shaft. A suitable embodiment of this feature of the invention is illustrated in Figs. 31 and 32.

Figure 31:
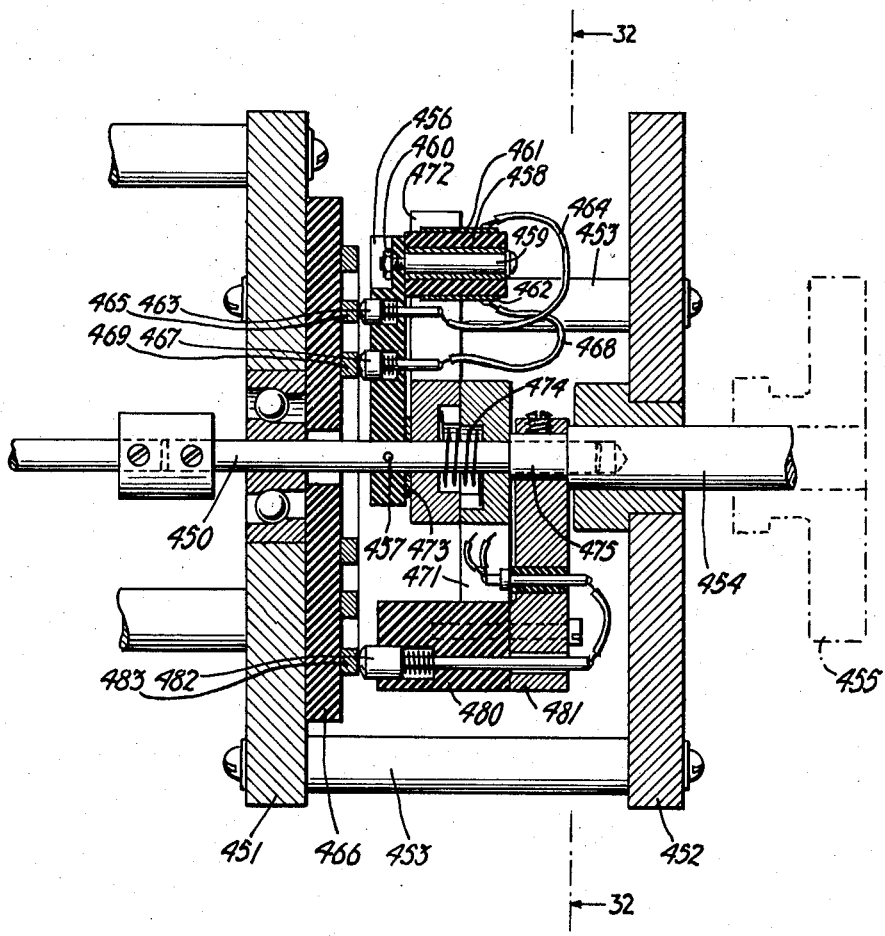
Fig. 31 is a front sectional view of a manually operable switching mechanism for effecting powered rotation of the transducer shaft and is taken along the line 31—31 of Fig. 32.
Figure 32:
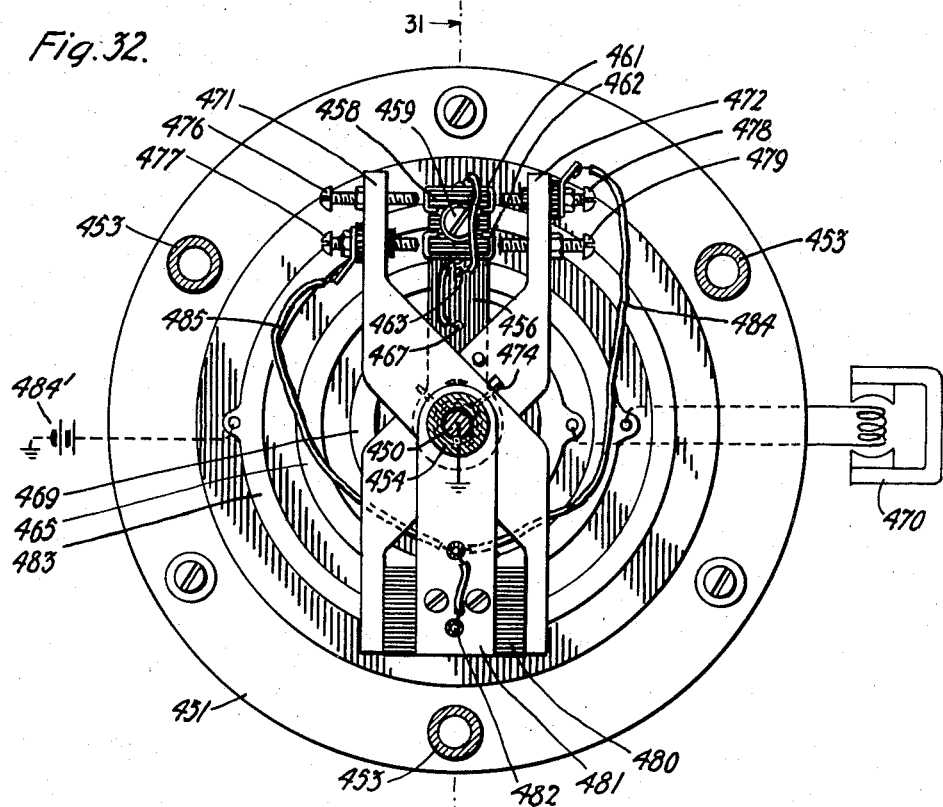
Fig. 32 is a side sectional view taken along the line 32—32 of Fig. 31.
Figure 32A:
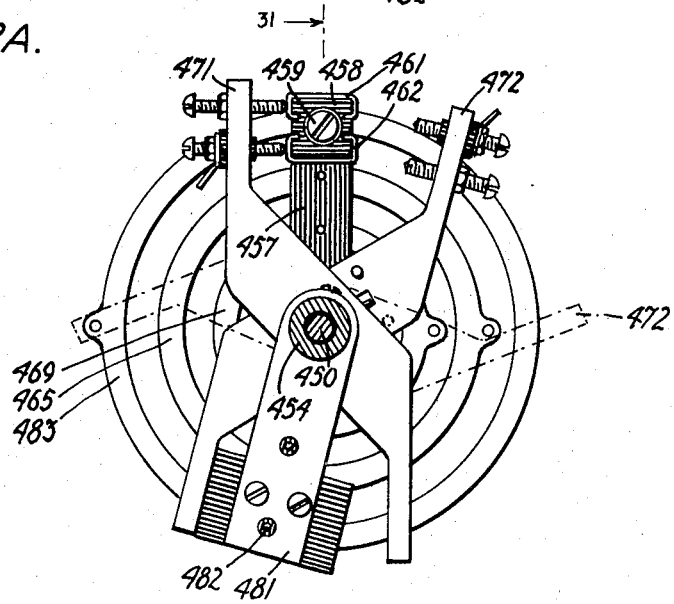
Fig. 32A is a sectional view, similar to Fig. 32, but with parts omitted, and showing the mechanism in operated condition.

Referring now to Figs. 31 and 32, the low speed shaft of the transmitting transducer is indicated at 450. The shaft 450 might be, for example, the shaft 421 of Fig. 28, the shaft 157 of Fig. 9 or the shaft 225 of Fig. 14. Thus the plate 451 of Figs. 31 and 32 might correspond to the plate 211 of Fig. 14. The manual driving mechanism is located between two plates 451 and 452 held in suitable spaced relationship by through bolts 453 provided around the periphery thereof. The shaft 450 is suitably journaled in the plate 451 and extends between the plates 451 and 452 to a point adjacent the inner edge of the plate 452. A shaft 454 which is to be manually turned by means of a hand wheel indicated schematically at 455 or by other suitable means, is journaled for rotation in the plate 452 and is provided with a central recess or counterbore adapted to receive and to journal therein the end of the shaft 450. The arrangement is such that the shaft 450 may rotate relative to the shaft 454. The requirements of operation are that the shaft 450 must follow the shaft 454 within the dynamic tolerance of the system and must come to rest within the static tolerance of the system when the shaft 454 is stopped. A radially extending arm 456 is suitably affixed to the shaft 450 adjacent the plate 451 by means such as the pin 457. Adjacent its outer end the arm 456 carries an outwardly extending insulating block 458 affixed to the arm 456 by means of a stud 459 and a nut 460. The arrangement is such that the insulating block 458 is free to rotate or rock about the stud 459. The upper edge of the block 458 is provided with a metallic contact shown at 461. The contact 461 extends downwardly along each side of the block 458 for a short distance as best shown in Fig. 32. A similar metal contact 462 is provided at the bottom edge of the block 458 and extends upwardly a short distance along the sides of the block 458.

The contact 461 is connected to a brush 463 by means of a conductor 464. The brush 463 is mounted in the arm 456 and is arranged to wipe a slip ring 465 carried on an insulating block 466 which is rigidly affixed to the plate 451. The contact 462 is connected to a similar brush 467 by means of a conductor 468. The brush 467, which is mounted in the arm 456, is arranged to contact a slip ring 469 mounted on the insulating plate 466. The slip rings 465 and 469 are connected to respective terminals of the transmitting transducer driving motor 470, as shown in Fig. 32. The motor 470 might correspond to the motor 257 of Fig. 14. A pair of scissor arms 471 and 472 are pivotally mounted on the shaft 450 and are spaced from the arm 456 by means of a washer 473. The hub portions of the scissor arms 471 and 472 are provided with recessed portions having shoulders adapted to receive a coil spring 474 mounted on the shaft 450. The spring 474 serves to urge the scissor arms toward each other. The outer end of the hub portion of the scissor 471 is retained in position on the shaft 450 by means of a collar 475 provided on the shaft 450. The scissor arm 471 carries a contact point 476 and a contact point 477 adapted for engagement with the contacts 461 and 462, respectively, along one side of the block 458. The scissor arm 472 carries a similar pair of contacts 478 and 479 adapted for engagement with the contacts 461 and 462, respectively, along the other side of the block 458. The other ends of the scissor arms 471 and 472 are arranged to rest against an insulating block 480 rigidly affixed to the end of an arm 481 carried by the hub extension 475 of the shaft 454. The block 480 carries a brush 482 adapted to wipe a slip ring 483 provided on the plate 466 and concentric with the slip rings 465 and 469. The slip ring 483 is connected to a source of positive potential as shown in Fig. 32. The brush 482 is connected by means of conductors 484 and 485 to contacts 478 and 477 at the other ends of the scissor arms. The contacts 478 and 477 are insulated from their respective scissor arms by means of suitable brushings or the like. The contacts 476 and 479 are connected to ground through the scissor arms and the shaft 450.

When the shaft 454 is at rest, the scissor arms 471 and 472 are pressed against the block 480 under action of the spring 474. The contacts 476-479 are adjusted so that there is a very small gap provided between each of them and the contacts provided on the block 458. Therefore, in this rest condition, no current is supplied to the armature of the motor 470 and the transducer remains at rest. If the shaft 454 is rotated slightly clockwise (Fig. 32) the block 480 moves to the left since it is rigidly affixed to the shaft 454 by means of the arm 481. The block 480 in traveling toward the left carries the scissor 472 with it. The spring 474 will urge the scissor 471 to follow the scissor 472 and will cause the contacts 476 and 477 carried by the scissor 471 to engage the contacts 461 and 462 on the block 458, thus supplying voltage to the motor 470 in a sense such that corresponding rotation of the shaft 450 will move the block 458 to the right. In other words, the shaft 450 will tend to follow the shaft 454. Motion will continue until the scissor arms 471 and 472 once again rest on the block 480 and the unit comes to rest. Similarly, if the shaft 454 is rotated in a counterclockwise direction (Fig. 31) voltage, in a reverse sense, is supplied to the motor 470 through the contacts 478 and 479 and again the shaft 450 will follow the shaft 454 until the latter comes to rest.

While it is possible to turn the shaft 454 very rapidly manually, the speed of the shaft 450 is determined by the speed of the motor 470. It may therefore be possible under some circumstances to open a relatively large gap between the scissor arms 471 and 472. This gap may be limited to any suitable value such as, for example, 90° by providing suitably abutting surfaces on the scissor arms. When the shaft 454 is rotated at a speed below the top speed of the shaft 450, a contact is made at the block 458 and is almost immediately broken by appropriate rotation of the block 450. Rotation of the shaft 450 under these circumstances will therefore be intermittent. When the shaft 454 is rotated at fairly substantial speed but still below the speed of the shaft 450, the discontinuous rotation of the shaft 450 will be barely noticeable and then only at the high speed end of the transducer.

The gap between the contacts 476-479 and the contacts 461 and 462 enters directly into the overall tolerance of the transducer system. For example, if a sufficiently large gap is introduced such that a 1° rotation of the shaft 454 is required before contact is made, the tolerance of the system cannot exceed plus or minus ½°. It is desirable that the gap be as small as possible consistent with satisfactory making and breaking of the contacts.

The various transmitting transducer units described above have been adapted to reduce shaft rotational disposition within an arc of 360° to a binary code indication. Similarly, the receiving transducer units have been adapted to adjust shaft rotational disposition to a desired point in an arc of 360° under control of a binary code indication derived from a transmitting transducer, a group of switches, or other suitable means. Within practical limits, any degree of accuracy desired may be obtained by increasing the number of binary digits, the number of discrete possible positions being $2^n$, where $n$ is the number of digits. While, for most applications, control to within a fraction of a revolution is required, for many applications additional control for an integral number of revolutions as well as for a fractional revolution is desirable. In the arrangements described hereinbefore, continuous rotation is possible during dynamic operation if provision is made for reversal while passing through the zero degree position. However, coding for positional location, as in the circuits of Figs. 8 and 8A, is limited to 360°.

In Fig. 33 there is illustrated a transducer arrangement suitable for use in coding shaft position to more than 360° or for adjusting shaft position in response to a coded indication of more than 360°. Thus from one set of digits, supplied by switches, a punched tape, a transmitting transducer, or the like, the receiver shaft is enabled to make several revolutions and then position to a fraction of a revolution. It will be evident that it is necessary to provide means for counting the revolutions before positioning to a fraction of a revolution as previously described. In order to avoid ambiguous positioning of either full or fractional rotation, the Geneva action, as previously described, should be applied to the counting means.

Referring now to Fig. 33, four code wheels 500, 501, 502 and 503, are mounted on a shaft 504 which may be the output shaft of a receiving transducer or the input shaft of a transmitting transducer. Each of the code wheels 500-503 corresponds to a code wheel group of the type illustrated in Fig. 2. However, each wheel is provided with several code tracks each serving the function of a single code wheel of a group in Fig. 2. One face of the code wheel 501 is illustrated in Fig. 34 from which it will be seen that an outer track having a 180° conductive segment and a 180° non-conductive segment is provided near the periphery of the code wheel while an inner track having two spaced 90° conductive segments and two spaced 90° non-conductive segments is provided adjacent the outer track. Thus the outer track 506 and the inner track 505 of the code wheel 501, when wiped by brushes, will operate in the same manner as the code wheels 31 and 32 of Fig. 2. One track is required for each digit of the binary position code. In Fig. 33, it will be noted that the code wheel 500 is provided with six tracks, the four tracks 507, 508, 509 and 510 being on one side and the two tracks 511 and 512 being on the other side. The code wheel 501 is provided with only two tracks, 505 and 506. The code wheel 502 is provided with four tracks, 513, 514, 515 and 516, while the code wheel 503 is likewise provided with four tracks, 517, 518, 519 and 520. It will be observed that the number of tracks provided on each of the code wheels may be varied as desired and the arrangement illustrated is intended solely as a suitable example. Each of the tracks 505–520 is wiped by a respective brush designated with a primed reference numeral corresponding to the reference numeral applied to the associated track. An additional set of brushes may be provided, as described in connection with Fig. 2, to achieve the Geneva action for eliminating ambiguity. The code wheel 501 is rigidly mounted on the shaft 504 for rotation therewith. A gear 525 is affixed to the code wheel 501 and likewise rotates with the shaft 504. A gear 526 is mounted for rotation with a countershaft 527 which is suitably journaled by means not shown for rotation about an axis parallel with the axis of the shaft 504. The other end of the shaft 527 carries a gear 528 adapted to mesh with a gear 529 rigidly affixed to the code wheel 500. The code wheel 500 and the gear 529 are arranged to rotate on the shaft 504. The gear ratio between the code wheel 501 and the code wheel 500 is four to one, the code wheel 500 being the high speed code wheel. The code wheels 502 and 503 are similarly mounted on the shaft 504 for rotation thereabout, the code wheel 502 being connected to the code wheel 501 through a suitable gear train adapted to drive the code wheel 502 at $\frac{1}{16}$ the speed of the code wheel 501. The code wheel 503 is similarly connected to the code wheel 502 through a gear train adapted to drive the latter at $\frac{1}{16}$ the speed of the code wheel 502. Thus the code wheel 502 rotates at $\frac{1}{16}$ the speed of the shaft 504 while the code wheel 503 rotates at $\frac{1}{256}$ the speed of the shaft 504. The most minor track of the code wheel 502 has sixteen segments so that the brush 513' which wipes this track will travel across one segment thereof for each revolution of the shaft 504. If the more major tracks on the code wheel 502 are arranged in binary form, the brushes wiping these tracks will count, in binary code, the full rotations of the shaft 504. Similarly, the code wheel 503 will count the rotations of the code wheel 502 so that the combination of the code wheels 502 and 503 will therefore count $2^4 \times 2^4 = 16 \times 16 = 256$ revolutions of the shaft 504. Any number of wheels may be added for higher counts. The requirements for Geneva action and the methods of providing such action hereinbefore described apply equally to the code wheels which count revolutions as to those which position within one revolution. It should be understood that code wheels constructed as shown in Fig. 33 may be used in the same manner as the code wheels of Fig. 2. Similarly, the code wheels of Fig. 2 may be used to count full revolutions as described in connection with Fig. 33.

Figure 14A:
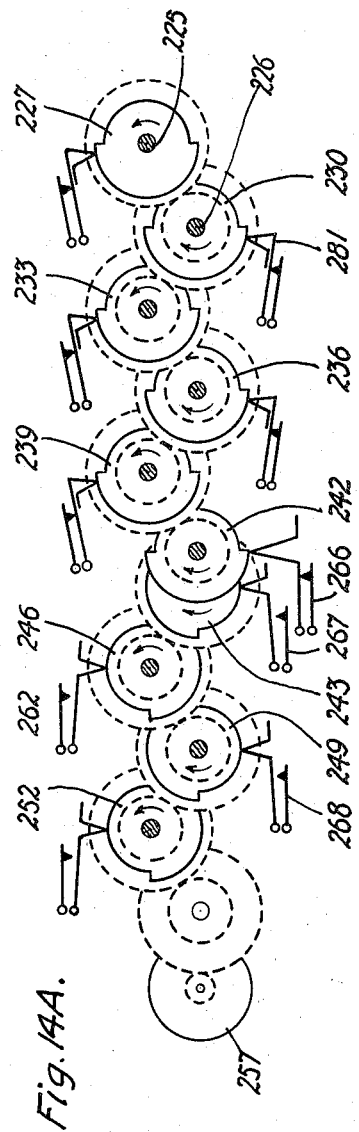
Fig. 14A is an exploded view in schematic form showing the code wheel arrangement of Fig. 14.

It will be remembered that the gear ratio between code wheel groups should be such that the most minor group rotates at a higher speed than the next most major group, the speed ratio therebetween being equal to the number of segments provided on the most minor code wheel or track of the major group. Thus in Fig. 33, in which the code wheel 501 has four segments in its most minor track, the code wheel 500 must operate at four times the speed thereof. Similarly, the code wheel 502, which has sixteen segments in its most minor track, must operate at $\frac{1}{16}$ the speed of the code wheel 501, the code wheel 502 being major to the code wheel 501. In the arrangement of Fig. 14, wherein each of the code wheels is provided with the equivalent of two segments, each code wheel must rotate twice the speed of the next most major code wheel. In any system of code wheels in which the code wheels or groups of code wheels are properly interconnected by means of gears or the like, and which are provided with adequate Geneva action, the digits of the wheel or group which is fixed to the input or output shaft and the digits of all wheels or groups minor thereto, i. e., those rotating faster, will position the shaft within 360° to one part in $2^n$, where $n$ is the total number of such digits. All digits of wheels or groups major to the one fixed to the shaft, i. e., rotating at slower speeds than the shaft, will count whole revolutions of the shaft to a limit of $2^m$, where $m$ is the number of such major digits.

It will be understood that the circuit arrangement of Fig. 7 may conveniently be used with a code wheel grouping of the type shown in Fig. 33 by simply providing a sufficient number of stages since control passes sequentially from the most major code wheel or track in the direction of the most minor code wheel or track. Thus the circuit of Fig. 7 would require sixteen stages to accommodate the code wheels of Fig. 33.

It will be recalled that in the arrangement of Figs. 24 and 25, Geneva action was secured by providing suitable internal circuitry in the transducer so that all outputs were taken under control of the most minor code wheel. This method of operation may conveniently be termed "cascade Geneva" since the circuit for each digit follows a "cascade" path through the code wheels more minor to that in which it is located. In the arrangement of Figs. 24 and 25, a 2:1 gear ratio was provided between adjacent code wheels. In a similar manner cascade Geneva action may be secured between code wheel groups where the gear ratio is greater than 2:1.

A suitable arrangement will now be described in connection with Figs. 34 and 35. There are two objectives to be gained. First, internal circuitry should be provided in the transducer so that the equivalent of a "c" contact (double throw, break before make) or "d" contact (double throw, make before break) is available for each binary digit. Second, all changes of these "c" or "d" contacts, when they occur, should take place at the same instant as the most minor digit of all the groups. The first objective eliminates the need of a relay connected to the code wheel, so that a comparing and control circuit arrangement of the type shown in Fig. 30 may be used, and the second eliminates any possibility of ambiguity due to brush misalignment or slowness of the major groups.

To secure the advantages of the cascade Geneva arrangement when using code wheel groups with a gear ratio of more than 2:1 between code wheel groups, there must be provided on the most minor group a separate track or wheel for each of the digits of each of the more major groups. Furthermore, on each group between the most major and the most minor group, a separate track or wheel must be provided for each of the digits of more major groups. All of these separate tracks or wheels are in addition to the digits which are already part of the minor group or groups. The most minor group thus has as many tracks or wheels as there are digits in the entire system. In Fig. 34A there is shown a code wheel 540 which might correspond, for example, to the code wheel 33 of Fig. 2. The code wheel 540 comprises two conductive portions 540' and 540", which are insulated from each other. The outer area of the portion 540' is formed as a slip ring and it is arranged to be wiped by a brush 541. Similarly, the outer area of the portion 540″ is formed as a slip ring arranged to be wiped by the brush 541′. The brush 541 and the brush 541′ lead to the A input and B input terminals, respectively. The portion or track 540″ is shown cross-hatched to distinguish it from the portion or track 540′, both tracks being conductive throughout their lengths, but being insulated from each other. The mating portions of the tracks 540′ and 540″ are toothed, as shown in Fig. 34A, to provide the desired number of code wheel segments, in this case, eight. A pair of brushes 542 and 542′, corresponding to the brushes 38 and 54, respectively, of Fig. 2, are disposed adjacent to each other and are arranged to wipe the code wheel 540 within the inter-engaging tooth portions of the tracks 540′ and 540″. A code wheel 543 having a first conductive portion 543′ and a second conductive portion 543″ is suitable for connection to the most minor code wheel group, and hence in the arrangement of Fig. 2 would be affixed to and rotated with the code wheel group 40. The portions 543′ and 543″ are both conductive and each extends for slightly less than 180° of the periphery of the code wheel 543. Insulating gaps 544 and 544′ are provided between the portions of 543. A pair of brushes 545 and 545′ is arranged to wipe the code wheel 543 at points along the periphery thereof separated by slightly less than 180°. An output brush 546 also wipes the code wheel 543 at a point approximately halfway between the brushes 545 and 545′ on the shorter arc. If the brush 546 has a width less than that of the insulating segments 544 and 544′, the brush 546 operates as a "c" contact. However, if the width of the brush 546 is greater than that of the segments 544 and 544′, the brush 546 acts as a "d" or make before break contact. A number of code wheels, each identical to the code wheel 543, would be associated therewith where a number of code wheels similar to the code wheel 540 forms a code wheel group. Thus, in an arrangement corresponding to Fig. 2, four code wheels similar to the code wheel 540, but with varying numbers of segments corresponding to the group 35 of Fig. 2, would be provided on the shaft 30 of Fig. 2. A second code wheel group, identical to the group 40 of Fig. 2, would be arranged to rotate at sixteen times the speed of the more major group, including the code wheel 540. In addition to the code wheels 41–45 forming the minor group, there would be provided four code wheels identical to the code wheel 543. In such an arrangement, Geneva action would be provided only for the major code group.

Figs. 34B through 34H illustrate the code wheels of Fig. 34A rotated by varying amounts as indicated on the drawing. Thus, in Fig. 34B, the code wheel 543 is rotated 90°, while the code wheel 540 is rotated the corresponding amount, namely, 11¼°. In order to accomplish the objectives outlined above, the circuit from brush 546 must change from the A input to the B input in exactly one revolution of the minor track 543 and from the B input back to the A input at the end of the next revolution. In Figs. 34A–H, the motion of both tracks is considered to be to the right, so that left-hand motion would reverse the actions to be described. In Fig. 34A, the brush 546 is just entering the segment 543′ and the circuit is just being completed through brush 545 to the B input. In Fig. 34B, the minor track 543 has advanced 90° and the circuit from brush 546 to the B input is made through both brushes 545 and 545′. Fig. 34C shows the minor track 543 at the end of one-half revolution, and the circuit from brush 546 to the B input, which has been made through the brush 545′, is about to change to the brush 545, although the circuit is still to the B input. In Fig. 34D, which represents a 270° rotation of the minor track 543, the circuit to the B input is about to change back through brush 545′. In Fig. 34E, when the brush 546 enters the segment 543′ again, exactly one revolution from the position shown in Fig. 34A, the circuit from brush 546 changes from brush 545′ to brush 545, and therefore from the B input to the A input. Figs. 34F, G and H show positions during the next revolution of the high speed track 543, and hence are equivalent to the arrangements illustrated in Figs. 34B, C and D, respectively. After the position illustrated in Fig. 34H, the circuit changes from the A input to the B input, as shown in Fig. 34A. If the sectors of the low speed track 540 were wider by a factor of 2, 4 or 8, as would be the case with more major tracks of the same group, it is evident that the positions of Figs. 34B, C and D (or F, G and H) would be repeated one or more times before arriving at the change positions of Figs. 34E or A.

In Fig. 35, there is shown an arrangement comprising three code wheel groups, 550, 551 and 552, of which the code wheel group 550 is the most major, and hence is connected to the output shaft 553 corresponding to the shaft 30 of Fig. 2. If rotational control for more than 360° is desired, the code wheel group 551 might be affixed to the shaft and arranged to rotate at a higher speed than the group 550. In a transmitting transducer the shaft 553 would be the input shaft. The code wheel group 550 comprises two code wheels or tracks 553 and 554, each constructed as shown in Fig. 34A, but having segments corresponding to the code wheels 31 and 32 of Fig. 2. The code wheel 553 has a segment 555 and a segment 556, these segments being insulated from each other and having slip ring portions adapted to be wiped by the brushes 555′ and 556′, respectively, the latter being connected to the A input and B input terminals, respectively. The segments 555 and 556 are also wiped by brushes 555A and 556A corresponding to the brushes 542 and 542′ of Fig. 34. The code wheel 554, which corresponds to the code wheel 32 of Fig. 2, has two conductive portions 557 and 558 adapted to be wiped by brushes 557′ and 558′, respectively, the latter being connected to the A input terminal and B input terminal, respectively. These common connections would be used for a transmitting transducer. Other connections could, of course, be used. For example, the output brushes could be connected to a common source and the input brushes used for separate outputs. For a receiving transducer, separate connections would be provided as illustrated in Fig. 30. The segments 557 and 558 are wiped by brushes 557A and 558A, corresponding to the brushes 542 and 542′ of Fig. 34A. The code wheel group 550 is connected to the code wheel group 551 through a gear box 550′ having a 1:4 gear ratio. The code wheel group 551 comprises code wheels or tracks 559 and 560, which correspond to the code wheels 553 and 554. The various brush connections for the code wheels 559 and 560 will not be described since they are the same as for the code wheels 553 and 554, respectively. The group 551 also is provided with code wheels or tracks 561 and 562, each having two segments designated 561A and 561B and 562A and 562B, respectively. The segment 561A is insulated from the segment 561B, and, similarly, the segment 562A is insulated from the segment 562B. Each of the segments 561A and 561B is formed as a mating tooth extending for 180° of the periphery thereof, and adapted to be wiped alternately by brushes 563 and 563′, which are spaced by slightly less than 180°. The brush 563 is connected to the brush 555A while the brush 563′ is connected to the brush 556A. The code wheel 562 is constructed in the same manner and is provided with a brush 564 connected to the brush 557A, and a brush 564′ connected to the brush 558A. Each of the segments 561A and 561B is provided with a slip ring portion adapted to be wiped by brushes 565 and 565′, respectively. Similarly, the segment 562A is adapted to be wiped by brush 566, while the segment 562B is adapted to be wiped by brush 566′. The code wheels 561 and 562 are intermediate code wheels provided to interconnect the code wheels on the most major code wheel group 550 with the corresponding output code wheels on the most minor code wheel group 552. The code wheel group 552 is connected to the code wheel group 551 by a gear box 551' adapted to provide a 4:1 gear ratio, the group 552 being the high speed group, just as the group 551 is the high speed group relative to the group 550.

The group 552 is provided with two code wheels 570 and 571 which may be identical to the code wheels 31 and 32 of Fig. 2. If the group 552 is not the most minor group of the transducer, then the code wheels 570 and 571 should correspond to the code wheels 553 and 554, respectively. The group 552 also comprises four code wheels 572, 573, 574 and 575, each constructed in the same manner as the code wheel 543 of Fig. 34A. The code wheels 572–575 are provided with output brushes 572'–575', respectively. Similarly, the code wheels 570 and 571 are provided with output brushes 570' and 571', corresponding to the brushes 36 and 37 of Fig. 2. Each of the code wheels 572–575 is provided with a pair of brushes corresponding to the brushes 545 and 545' of Fig. 34A, the brushes 572A and 572B being connected to the brushes 565 and 565', respectively. The brushes 573A and 573B are connected to the brushes 566 and 566', respectively. The brushes 574A and 574B are connected to the respective brushes wiping the code wheel 559, while the brushes 575A and 575B are likewise connected to the brushes wiping the code wheel 560.

It will be observed that the code wheel group 552 is provided with two code wheels or tracks of the type shown in Fig. 2, and four output tracks, one for each of the code wheels provided in the more major groups. Thus Geneva action is provided for the code wheel groups 550 and 551, but not for the code wheel group 552. If complete Geneva action were desired, an additional code wheel group having six code wheels or tracks similar to the tracks 572–575 would have to be provided. In such case, the tracks 572–575 would be constructed in the same manner as the tracks 561 and 562 providing the necessary intermediate connection. The output brushes of the code wheel group 552 may be connected to the comparing and control circuit of Fig. 30. However, it should be observed that two relays similar to the R relays of Fig. 7 would have to be provided for the brushes 570' and 571', since these brushes do not act as relay "c" contacts as do the brushes 572'–575'. Alternatively, the code wheels 570 and 571 could be replaced with code wheels similar to code wheels 553 and 554, respectively, but requiring only a single output brush. In this way, a "c" contact effect is secured in a simple manner.

It should be observed that code wheels constructed in the same manner as the code wheels 553 and 554 could be used to form a transducer which will provide "c" contact operation without the use of associated relays in a circuit such as that of Fig. 7. In such an arrangement, the first two code wheels might be identical to the code wheels 553 and 554 while additional code wheels would have additional segments. Furthermore, assemblies of such code wheels could be coupled in groups driven at related speeds as described hereinbefore. Each code wheel could be provided with a single output brush, such as the brushes 555A and 557A. However, if Geneva action is desired, pairs of brushes such as 555A–556A and 557A–558A could be used in connection with a circuit such as the one described in connection with Fig. 3. While the arrangement of Fig. 35 illustrates a transmitting or receiving transducer having three code wheel groups, each having two digit producing code wheels, it should be understood that any convenient number of code wheels may be provided in each group, and any convenient number of groups may be provided to achieve the desired accuracy. Geneva action, as described, may be provided for as many of the code wheels as desired.

As pointed out above, the comparing and control circuit 24 of Fig. 1 may receive intelligence in binary digital form from a transmitting transducer or from some other source such as a punched tape or a switching arrangement such as the ones shown in Figs. 8 and 8A. When the coded information is to be transmitted over a relatively short distance to the comparing and control circuit, a plurality of conductors may be employed to interconnect the comparing and control circuit and the source of the coded information. When the information is to be transmitted over a considerable distance, the use of a relatively large number of conductors may prove undesirable, and in lieu thereof a radio link or a normal communication channel may be employed, as indicated by the dotted line 22 of Fig. 1. When transmitting the coded information over a communication channel, it is desirable that the information be reduced to such a form that it can conveniently be transmitted over a normal voice frequency channel to a remote location.

The transmitting transducer 20 yields a plurality of simultaneous "on-off" code impulses which should be converted into time series impulses for convenient transmission over the voice channel to the receiving converter 23. The receiving converter 23 reconverts the time series impulses into simultaneous impulses suitable for application to the comparing and control circuit 24. For dynamic control of the receiving transducer, it will be necessary periodically to apply the transmitting transducer "on-off" output pulses to the converter 21, and the converter 23 must periodically reconvert the pulses from time series form to simultaneous form. The operation of the converter 21 must be sufficiently rapid that the conversion from time parallel or simultaneous form to time series form occurs during the interval between readings. Transmission of one set of readings over the link 22 must be completed and the pulses must be accepted and converted to time parallel form before the next set of pulses is transmitted. Furthermore, arrival of a subsequent set of pulses at the converter 23 must cause no change in the comparing and control circuit until the entire group of pulses has been received, so that the comparing and control circuit 24 may operate smoothly. It will be evident that the dynamic tolerance of the system, i. e., the closeness with which the receiving transducer may follow the transmitting transducer, will depend in part upon the frequency at which the readings of transmitting transducer position are taken. The conversion of simultaneous "on-off" impulses into time series impulses and the reconversion thereof to simultaneous form will be described in connection with Figs. 36 and 37.

Referring now to Fig. 36, there is provided a series of magnetic cores 601–610 on each of which are wound several coils. The odd numbered cores are each provided with four coils designated A, B, C and D, whereas the even numbered cores are each provided with three coils designated A, B and C. The core material is preferably of a type which can assume only two magnetic conditions, magnetized fully in one direction and magnetized fully in the opposite direction, i. e., to opposite ends of its hysteresis loop. A suitable core material is that sold under the trade name "Delta-max" manufactured by Allegheny Ludlum Steel Corp. The various cores are interconnected as shown in Fig. 36. The free end of each of the D coils is connected to a respective odd numbered one of a group of input terminals 611–620. The other end of each of the coils D is connected to a respective even numbered one of the input terminals 611–620 and is also connected, through a respective resistor, to the lower end of the coil B associated with the next higher numbered core. The lower end of each of the D coils is connected to the upper end of the A coils associated with the corresponding cores. The ends of the A cores are connected to the upper end of the next succeeding B winding through respective rectifier elements. The rectifier elements associated with the coil 610A are connected to an output terminal 621, while the upper end of the coil 610A is connected through a resistor 622 to an output terminal 623. The ends of the coil 601B are connected to respective input terminals 624 and 625. The lower end of the coil 601C is connected to an input terminal 626 while the upper end thereof is connected through a series circuit embracing the remaining C coils associated with odd numbered cores to an input terminal 627. Similarly, the lower end of the coil 602 is connected to an input terminal 628 while the upper end thereof is connected through a series circuit embracing the remaining even numbered coils to an input terminal 629.

For convenience, one magnetized condition of each core will be termed "state A" while the other magnetized condition will be termed "state B." The input terminals connected to the free ends of the D coils are connected to a source of positive potential while the input terminals connected to the other ends of the D coils are connected to ground potential; one group of connections being effected through a transmitting transducer code wheel or its equivalent. Thus, the input terminal 611 might be connected to the armature 61 of Fig. 3 while the input terminal 612 might be connected to a source of positive potential. When current flows through the respective coils D, the magnetomotive force is such as to cause the associated cores to assume their respective "state B." Since each of the code wheels is read simultaneously, the various coils D will be energized simultaneously, if at all. If the circuit through a code wheel is open, as where the brush is wiping a non-conductive segment, the coil D associated therewith will not be energized. Accordingly, if the cores 601–610 are initially each in "state A," those of the odd numbered cores which assume "state B" will be representative of the "on-off" code indication of transducer angular disposition. It will be observed that the circuit of Fig. 36 will store code indications from only five code wheels. If the five most minor code wheels are connected to the terminals 611–620, an identical circuit may be used for five more major code wheels by connecting the terminals 624 and 625 to the terminals corresponding to 623 and 621, respectively, of Fig. 36. In such case terminals 623 and 621 of Fig. 36 will represent the output terminals of the storage unit and would be connected to the link 22 of Fig. 2. If the circuit of Fig. 36 were connected to a major group of code wheels, the output terminals 621 and 623 could be connected to terminals corresponding to 625 and 624, respectively, of the similar circuit associated with the more minor code wheels. It will be observed that such connections correspond to the addition of more stages to the arrangement of Fig. 36. The core having a coil D connected to the most major code wheel of the transducer may have its B winding omitted or merely disconnected.

A pulse generator 630 is connected to input terminals 626 and 627 and is arranged to provide a square wave output pulse as shown at 630'. A similar pulse generator 631 is connected to the input terminals 628 and 629 and is arranged to provide a square wave output pulse as shown at 631'. It will be observed that the square wave 630' is 180° out of phase with the square wave 631'. If it be assumed that each of the odd numbered cores of the group 601–610 is in its respective "state B," as a result of the associated code wheels having conductive segments wiped by their brushes, then the circuit operation is as follows: The square wave 630' is applied to the coil 601C with a magnitude and in a sense such as to produce a magnetomotive force which will cause the core 601 to shift from its "state B" to its "state A." A similar shift will occur for the cores 603, 605, 607 and 609 because of the series connections of their associated C coils. The magnetomotive force set up in the odd numbered cores will induce voltages in the corresponding A windings in such a sense as to apply potentials to the next higher B winding to cause the core associated with each of these B windings to shift from the "A state" to the "B state" thereof. A pulse is then applied to the terminals 628 and 629 from pulse generator 631 such as to cause the even numbered cores to shift from their "B states" back to their "A states." When the core 609 is shifted from the "B" condition thereof to the "A" condition thereof, the core 610 also shifts from its "A state" to its "B state" because of the magnetomotive force set up in the core 610 as a result of the voltage induced in the A coil of core 609. When the pulse from generator 631 is applied to the C coil of core 610, it will be in a sense to cause the core 610 to resume its "A state." However, the magnetomotive force induces a voltage in the winding A or the core 610 in such a sense as to apply a square pulse output to the terminals 621 and 623. If the core 609 had been initially in its "A state," the advancing pulse applied to the coil 609C would not have changed its condition since the effect of this pulse is to change the odd numbered cores from "state B" to "state A." As a result no voltage would be induced in the winding 609A and the core 610 would remain in its "A state" so that the pulse applied to the C coil of the even numbered windings would not induce a voltage in the coil 610A and no output would result. It will be evident that the alternate application of the pulses to the C windings of the odd and even numbered cores will cause a transfer of transducer output pulses to the right because of the corresponding change in status of the next even numbered core. When no transducer output pulse is stored in a D coil, no such change of state occurs in the next even numbered core and this condition will be transferred toward the right with each advancing pulse. A transducer output pulse stored in the coil 609C will be the first to be applied to the output terminals 621–623. The transducer output pulses stored in the remaining D coils will be each advanced to the right one step by the pulse which reads out the stored impulse in the core 609 and will be read out in order with succeeding pulses from the pulse generators. Obviously, transducer output pulses cannot be introduced into the D coils while odd numbered advancing coils (C coils) are energized. The pulses will appear at the output terminals 621–623 at the repetition rate of the advancing pulses from the pulse generators. If no transducer pulse has been introduced into one of the odd numbered cores, at the time that such pulse is due to appear at the output terminals 621–623, an equal period of time will elapse but no output pulse will appear. The conversion from time parallel to time series is shown clearly in Fig. 37 which shows "on" impulses applied simultaneously to terminals 611, 615 and 617 resulting in a square wave output as shown at 623'. It will be observed that two output pulses are missing, these being shown in dotted lines.

The time series pulse 623' may be transmitted to a receiving station by any suitable radio or wire circuit. The pulses must then be reconverted to time parallel. The circuit of Fig. 36 may be used to effect the conversion from time series to time parallel. It will be remembered that an odd numbered core is changed from "state A" to "state B" by means of a pulse advancing through the unit, the change of flux inducing a voltage in the D winding of that coil. Similarly, as the core is returned to "state A," the change of flux induces an oppositely polarized voltage in the D winding. Thus, as a pulse passes through an odd numbered core, a positive or negative voltage force appears in the terminals of the associated C coil. Thus by applying the received time series pulses to the terminals 624 and 625, and by applying locally generated pulses having the same frequency but 180° out of phase therewith to the terminals 628 and 629, the D coils will have voltages induced therein corresponding to the "on-off" code indications originally applied to the storage circuit at the transmitting end.

The various transducer arrangements described hereinbefore can be used either to position accurately a shaft or to read accurately the position of a shaft. If the shaft is realized as a lead screw, it may conveniently be employed for accurate longitudinal positioning or longitudinal measuring. A suitable mechanical arrangement for so employing a transducer will now be described in connection with Figs. 38 through 42.

Referring now to Figs. 38–42, there is provided a generally rectangular base plate 700 having a front plate 701 mounted at one end thereof and a rear plate 702 mounted at the other end thereof, the plates 701 and 702 extending at right angles to the plate 700. The plate 701 is provided with an aperture adapted to receive a bearing sleeve 703 held in place in the plate 701 by means of a set screw 704. A shaft 705 is journaled for rotation in the sleeve 703. The shaft 705 is coupled to a shaft 706 which is the main shaft of a transducer 707, a coupling element 705A being provided to interconnect the shafts 705 and 706. For measuring purposes, the transducer 707 acts as a transmitting transducer so that the shaft 706 would be the input shaft thereof. For positioning purposes, the transducer 707 acts as a receiving transducer so that the shaft 706 is the output shaft thereof. The other end of the shaft 705 is provided with threads to form a lead screw 708.

A carriage block 709 is supported at one side thereof by a carriage rail 710, and at the other side thereof by a carriage rod 711, the rod 711 having a bearing-like surface and passing through an aperture provided therefor in the carriage block 709. The carriage block 709 is hollow and is provided along opposite sides thereof with apertures adapted to receive the lead screw 708. Within the carriage block 709 there is provided a threaded nut 711' arranged to be in threaded engagement with the lead screw 708. Another nut member 712 is provided within the carriage block and is rigidly affixed therein by means of screws 713 and 714. The nut member 712 is likewise in threaded engagement with the lead screw 708. A coil spring 715 surrounds the lead screw 708 and bears against facing surfaces of the nuts 711' and 712 whereby the nut 711' is urged against the adjacent inner face of the carriage block 709 under the spring pressure. This arrangement eliminates backlash. Rotation of the shaft 706, under action of the transducer driving motor, causes the lead screw 708 to rotate in the same direction as the shaft 706. Rotation of the lead screw 708 produces longitudinal motion of the carriage block 709 because of the threaded engagement of the lead screw 708 and the nuts 711' and 712. Thus, while the lead screw 708 rotates, the carriage block 709 will move to the left or to the right depending upon the direction of rotation of the lead screw. It will be evident that for most purposes the transducer 707 should preferably be able to position or measure by an amount corresponding to a rotation of many revolutions.

A second carriage block 720 is similarly supported adjacent one side thereof on the rail 710 and is provided at the other side thereof with an aperture adapted to receive the carriage rod 711. Additional support for the carriage block 720 is provided by a sleeve 721 passing through an aperture provided in the carriage block 720 above the rail 710. The block 720 is provided with a centrally located aperture adapted to receive the lead screw 708, the aperture being large enough so that no engagement between the lead screw 708 and the carriage block 720 occurs. The end of the sleeve 721 remote from the carriage block 720 is provided with an internally threaded nut portion 722 adapted to threadedly engage an advancing screw 723. The advancing screw 723, which is carried within the sleeve 721, is also supported for rotation by a bearing member 724 provided in an appropriate aperture in the back plate 702. A knurled nut 725 is affixed to the end of the advancing screw 723 projecting beyond the back plate 702. The arrangement is such that rotation of the knurled nut 725 causes advancement of the sleeve 721 in a longitudinal direction depending upon the direction of rotation of the knurled nut 725. The sleeve 721 is prevented from rotating with the advancing screw 723 by means of a thumb screw 726 acting in a threaded hole provided in the side of the carriage block 720 and adapted to engage the sleeve 721. The block 720 may be positioned by turning the knurled nut 725 with the thumb screw 726 engaging the sleeve 721. If the thumb screw 726 is backed off, the block 720 may be positioned by merely sliding the same along the bearing surface of the sleeve 721. Once the block 720 is in the desired longitudinal position thereof, it may be firmly retained in place by tightening up the thumb screw 726 and by tightening a thumb screw 727 acting in a threaded hole provided in the oposite side of the carriage block 720, and adapted to engage the surface of the rod 711.

For positioning purposes, the carriage block 709 is provided with an anvil bracket 730 affixed to the upper edge of the block 709 by means of screws 731. The face of the anvil bracket 730 facing the block 720 carries an anvil or pointer 732 which represents the movable point to be positioned. The block 720 carries a bracket 733 affixed thereto by means of screws 734 and carrying a measuring gauge 735 having an outwardly extending pointer or anvil 736 arranged in axial alignment with the anvil 732. The gauge 735 could, of course, conveniently be replaced with a bracket and anvil identical to or similar to the anvil bracket 730 and the anvil 732. In order to position the anvil 732 at a desired axial position, the transducer 707 is energized with a code indication corresponding to this axial position and the lead screw 708 rotates until the anvil 732 assumes the desired axial position. For this purpose, the axial position must be set forth in terms of lead screw rotation since the transducer is responsive to binary code indications of angular position. The gauge 735 measures axial travel of the anvil 736 so that the arrangement provides a demonstration of the accuracy of position of the anvil 732. More particularly, if rotation of the shaft 705 is commenced when the anvils 732 and 736 just abut each other, the gauge 735 will provide a direct indication of the longitudinal travel afforded to the anvil 732 in response to rotation of the shaft 706. If the anvil 736 and gauge 735 were replaced with a fixed anvil and bracket, accurate relative positioning between the two anvils would be provided by the transducer operation. For example, if it were desired to provide a 1.0005 inch spacing between the anvil 732 and the anvil 736 (or fixed anvil corresponding thereto), the block 720 would be manually positioned at a convenient zero location, while the block 709 would likewise be backed off to a convenient zero (or equivalent) location. Then the transducer 707 would be supplied with an on-off code indication corresponding to the necessary travel of the block 709 between the zero position thereof and the desired 1.0005 inch position. The lead screw 708 would then be advanced by the transducer the corresponding number of rotations until the anvil 732 were positioned as desired. The spacing between the anvils 732 and 736 could then be used to check the thickness or other dimension of a piece of work. The accuracy provided by the system may be made as great as desired by providing an appropriate number of code wheels in the transducer 707. For many purposes, the zero position of the transducer is preferably considered as the maximum forward position thereof.

For measuring purposes, there is provided along one edge of the block 720 another anvil bracket 740 carrying an anvil 741. Another bracket 742 is affixed to the block 720 below the bracket 740 and is provided with an outwardly extending rack 743 carrying a block 744 having a spring urged tooth 745 adapted to engage the teeth of the rack 743. The block 744 carries a spring arm 746 having an anvil 747 at the upper end thereof and adapted to retain work between the anvil 747 and a mating face 748 of the bracket 742. The face 748 is in vertical alignment with the anvil 741 carried on bracket 740. An anvil 750 carried by a bracket 751 is mounted on the side of the block 709 in axial alignment with the anvil 741. The anvil 750 and bracket 751 are electrically insulated from the block 709 and may be connected to a source of potential through an appropriate relay circuit (such as the one shown in Fig. 43). To measure the thickness of the work held between the anvil 747 and the face 748, the transducer 707 is rotated in an appropriate direction to advance the block 709 toward the work. When the anvil 750 strikes the work, an electrical circuit to ground through the unit frame will be completed. This circuit will stop the transducer motor so that the angular position of the lead screw 708 will provide an indication of the travel of the block 709 and hence of the thickness of the work. If work which is non-conductive is to be measured, the anvil 750 may be provided with a micro-switch or the like adapted to be closed upon engagement with the work. As soon as the transducer motor is stopped, the angular position of the lead screw 708 is transmitted by the code wheels of the transducer in electrical binary code form to an appropriate circuit for giving an indication of the angular location of the lead screw 708. This binary code indication may conveniently be translated into longitudinal displacement by appropriate tables or otherwise, thus yielding the thickness of the work. For larger pieces of work, the rack 743 and the block 744 may be removed and the work may be supported directly on the base 700. One edge of the work will then abut the face 748 and the anvil 741, while the opposite edge thereof will be engaged by the anvil 750 as the block 709 approaches.

Figure 43:
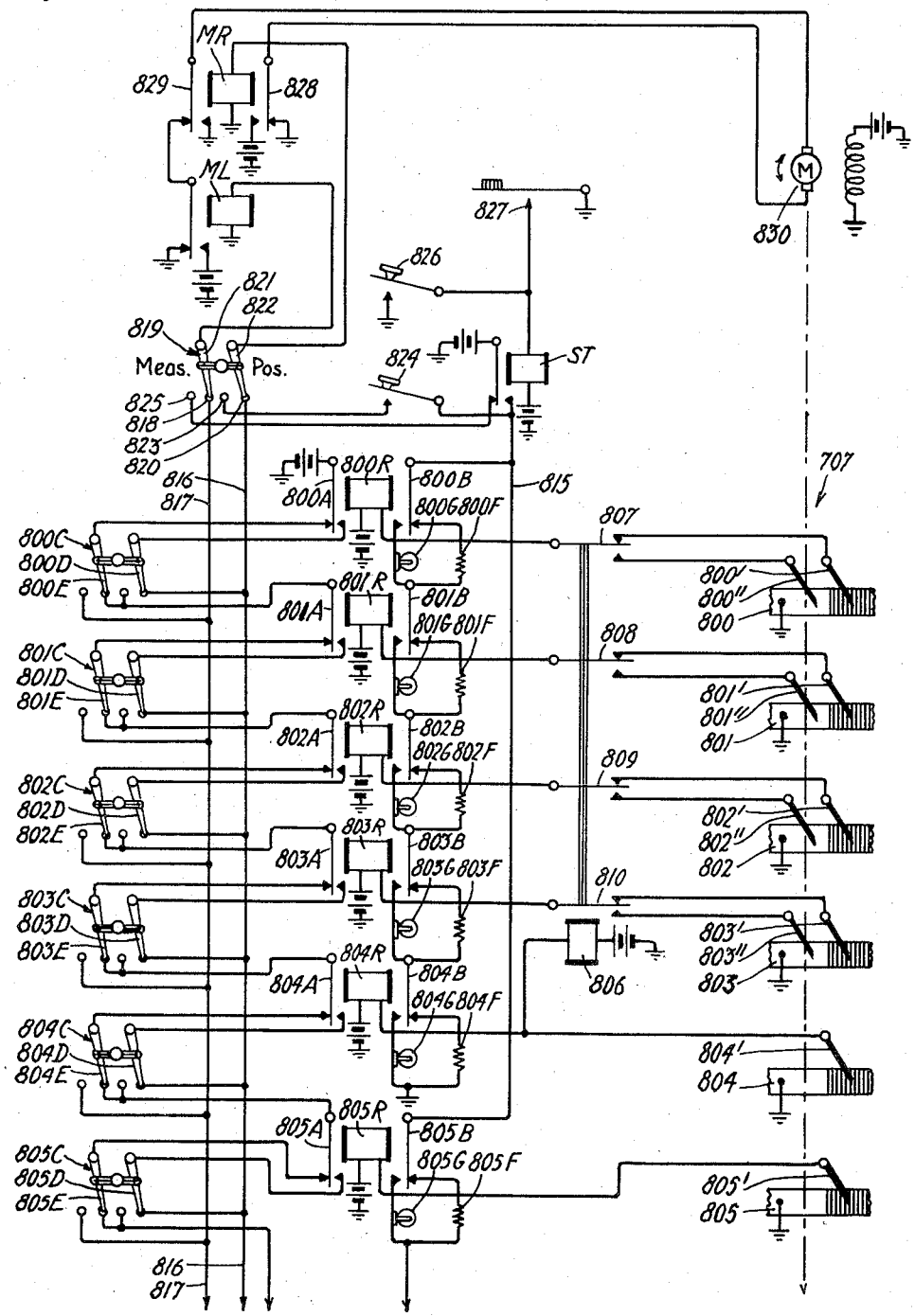
Fig. 43 is a schematic illustration of a comparing, control and indicating circuit for use with the measuring and positioning unit of Figs. 38–42.

A suitable circuit arrangement for controlling the operation of the transducer 707 for both measuring and positioning operations will now be described in connection with Fig. 43. For simplicity, the transducer 707 in Fig. 43 is illustrated as made up of code wheels of the type shown in Fig. 2, although it should be understood that other types of code wheels could be used. Only six code wheels are illustrated, although it will be evident that many more may be provided. The transducer 707 comprises code wheels 800–805, the code wheels 800–803 forming a group corresponding to the group 35 of Fig. 2, while the code wheels 804–805 are included in a more minor group such as the group 40 of Fig. 2. The code wheels 800–803 will generally be arranged to rotate at a speed slower than the shaft 706 so that positioning or measuring by an amount corresponding to more than 360°' rotation of the lead screw 708 will be provided. In such an arrangement, the group containing the code wheels 804 and 805 might conveniently rotate at the speed of the shaft 706, while one or more additional groups rotating at a higher speed would be provided to provide accurate positioning by amounts smaller than 360° rotation of the lead screw 708. The code wheel 800 is wiped by brushes 800' and 800'', while the code wheels 801–803 are wiped by similar brushes similarly designated. The code wheels 804 and 805 are wiped by brushes 804' and 805', respectively. Only a single brush is provided for each of these latter code wheels since, in the arrangement illustrated, Geneva action is provided only for the code wheels 800–803. If Geneva action is desired for more minor code wheels, it may be provided in any suitable manner such as by providing an additional Geneva relay and corresponding additional brushes. Each of the brushes 800'–803' is connected to a respective front contact of the Geneva relay 806, while each of the brushes 800''–803'' is connected to a respective back contact of the Geneva relay 806. The Geneva relay 806 is provided with armatures 807–810, one for each of the code wheels 800–803.

Each of the code wheels 800–805 is provided with a respective comparison relay 800R–805R, corresponding to the relays 91R–100R of Fig. 7. Each of the relays 800R–805R is provided with a pair of armatures 800A–805A and 800B–805B, respectively. Each of these armatures has a respective front contact and a respective back contact. For each of the code wheels there is also provided a double-pole double-throw switch, 800C–805C, respectively. The switches 800C–805C correspond to the switches 91S'–100S' of Fig. 8A. One terminal of the coil of each of the relays 800R–803R is connected to a respective one of armatures 807–810, while each of the remaining terminals of these coils is connected to a source of positive potential. One terminal of the coil of the relay 804R is connected to one terminal of the coil of Geneva relay 806 and to the brush 804'. One terminal of the coil of relay 805R is connected to the brush 805'. The remaining terminals of the coils 804R and 805R are connected to a source of positive potential, as is the remaining terminal of the coil of relay 806. The front contacts of the armatures 800A–805A are connected to the armatures 800D–805D, respectively. The back contacts of the armatures 800A–805A are connected to the armatures 800E–805E, respectively. The back contacts associated with armatures 800B–805B are each connected to one end of a respective one of resistors 800F–805F. The armature 800B is connected through a conductor 815 to the front contact of relay ST. The front contacts associated with the armatures 800B–805B are each connected to a terminal of a respective one of lamps 800G–805G. The free end of the lamp 800G and the free end of the resistor 800F are connected together and are connected to the armature 801B. The free terminals of the lamp 801G and the resistor 801F and connected to the armature 802B. Similar connections are provided for the lamps 802G–804G and the resistors 802F–804F. The free ends of the lamps 804G and the resistor 804F are connected to ground. The free terminal of the lamp 805G and the free terminal of the resistor 805F are connected to the armature of a succeeding relay (not shown). The armature 805B is connected to the conductor 815. The respective back contacts associated with the armatures 800D–805D and the respective front contacts associated with the armatures 800E–805E are provided with respective common connections. This common connection of the switch 800C is connected to the armature 801A, while the corresponding connections of the switches 801C–804C are connected to the armatures 802A–805A, respectively. The armature 800A is connected to a source of positive potential.

The front contacts associated with the armatures 800D–805D are connected to a conductor 816, which corresponds to the conductor 132 of Fig. 7. The back contacts associated with armatures 800E–805E are connected to a conductor 817, which corresponds to the conductor 130 of Fig. 7. The conductor 816 is connected to a contact 818 of a double-pole double-throw switch 819. Similarly, the conductor 817 is connected to a contact 820 of the switch 819. The armature 821 of the switch 819, which is associated with the contact 818, is connected to one terminal of the coil of motor relay ML, the other terminal of the coil of this relay being connected to ground. The armature 822 of switch 819, which is associated with the contact 820, is connected to one terminal of the coil of motor relay MR, the other terminal of the coil of this relay being connected to ground. A contact 823 of the switch 819 is connected to one contact of a single-pole single-throw switch 824, the other contact of the switch 824 being connected to the front contact of the relay ST. A contact 825 of the switch 819 is connected to the back contact of the relay ST. The armature of the relay ST is connected to a source of positive potential as is one terminal of the coil of relay ST. The other terminal of the coil of relay ST is coupled to ground through a single-pole single-throw switch 826. This terminal of the coil of relay ST is also connected to one contact of a switch 827. The other contact of the switch 827, which is not shown, is arranged to be closed when the anvil 750 engages the work to be measured. Alternatively, the illustrated contact of the switch 827 may be the anvil 750 and the ground connection may be completed through the work. The relay MR is provided with two armatures 828 and 829. The back contact associated with the armature 828 is connected to ground, while the front contact associated therewith is connected to a source of positive potential. The front contact associated with the armature 829 is connected to ground, while the back contact associated therewith is connected to the armature of relay ML. The armatures 828 aend 829 are connected to respective terminals of the armature winding of a motor 830, which is arranged to drive the transducer code wheels 800–805. The back contact of the armature of relay ML is connected to ground, while the front contact thereof is connected to a source of positive potential.

The switch 819 has two positions, the right-hand position being designated POS. (positioning), and the left-hand position being designated MEAS. (measuring). With the switch 819 thrown to the positioning side, the relays 800R–805R and the associated armatures 800A–805A will compare the transducer code wheel outputs with the binary code indication provided by the switches 800C–805C, in the same manner described hereinbefore in connection with Fig. 7, to energize the relay MR or the relay ML, thereby to operate the motor 830 in the proper direction to bring the code wheels 800–805 into coincidence with the angular position corresponding to the switch settings of the switches 800C–805C. It will be understood that the switches 800C–805C might be replaced by relays corresponding to the relays 91T–100T of Fig. 7 so that a transmitting transducer could be employed. The switches 800C–805C together with additional switches provided, if any, are set to a binary code indication corresponding to the desired axial advance or retreat of the lead screw 708. The motor 830 causes the transducer 707 and the shaft 708 to turn until the code indication provided by the code wheels of the transducer 707 corresponds to the setting of the switches 800C–805C. As soon as coincidence is achieved, the motor 830 will be deenergized. It will be observed that the circuit including the lamps 800G–805G will be open during the masuring operation since the relay ST is deenergized.

When it is desired to measure the distance through which the lead screw 708 advances the block 709, the switch 819 should be thrown to the measuring side thereof. The relay ML will then be energized through a circuit extending from the source of positive potential through the armature of the relay ST and associated back contact, the contact 825, the armature 821 and the coil of relay ML to ground. This will apply a potential to the armature winding of motor 830 in such a sense as to cause the lead screw 708 to advance the block 709. When the anvil 750 strikes the work, the switch 827 will be closed and will complete an energizing circuit to ground for the coil of relay ST, which may be termed the stop relay. Energization of the relay ST, will break the energizing circuit for the relay ML at the armature and back contact of relay ST, thus stopping the motor 830. The position of the block 709 may then be read in terms of a binary code indication of the angular travel of the lead screw 708 by observing the conditions of the lamps 801G–805G, etc. It will be observed that the armatures 800B–805B will be operated or released depending upon the conduction or non-conduction of the associated code wheels 800–805. Thus, if the operative one of brushes 800'–800" is wiping a conductive segment of the code wheel 800, the armature 800B will be operated to its front contact and will cause the lamp 800G to light. Where an armature of the group 800B–804B is not operated, the energizing circuit for the lamps which are to be lighted will be completed through the associated one of resistors 800F–805F, these resistors have resistance values equivalent to those of the associated lamps. It will be observed that the conductor 815 leads to a source of positive potential through the front contact and armature of relay ST. This connection prevents lamp illumination during the interval in which the lead screw is rotating. The actual axial advance of the block 709 will have to be interpreted from the binary code indication provided by the lamps. Suitable tables should be provided for this interpretation. Of course, each lamp combination will refer to a discrete axial advance of the block 709.

Once the relay ST is energized, the motor 830 will stop. However, to insure maximum accuracy, means is provided whereby the lead screw will alternately back off the block 709 a slight amount and then advance the block 709 until the anvil 750 again engages the work. This means is the switch 824, which may conveniently be termed the hunting switch. When the switch 824 is closed with the switch 819 in measuring position, the motor relay MR will be energized through a circuit, including the coil of relay MR, the armature 822, the contact 823, the switch 824 and the front contact and armature of relay ST. Energization of relay MR will operate the motor 830 in a direction such as to back off the lead screw and hence will cause the switch 827 to open, breaking the operating circuit of relay MR. The motor will thus stop. However, the relay ML will now be energized again and will cause the lead screw to advance. This alternate advance and retreat will continue until the switch 824 is opened. Each time the anvil 750 strikes the work, the relay ST will be operated to stop the lead screw advance, and also to energize the lamp circuit. The lead screw may be rotated to back off the block 709 as far as desired by returning the switch 819 to positioning location and setting an appropriate combination of the switches 800C–805C.

By providing the switch 826, which may be termed the reading switch, the binary position of the transducer 707, and hence the axial position of the block 709, may be determined at any time. To effect a reading of position, the switch 826 is closed while the switch 819 is thrown to measuring position, with the switch 824 open. Closing of the switch 826 will energize the relay ST and promptly stop the motor 830. The position of the transducer will be indicated by the combination of illuminated lamps. If the switch 824 is closed with the other switches in the conditions described, the relay ML will be energized and the motor 830 will rotate in a direction to back off the block 709. The lamps 801G–805G will indicate the changing position of the block 709.

It should be understood that the term "discrete" as used in the specification and claims herein in connection with angular disposition refers to a range of angular positions within the limit of accuracy of the transducer or system. Furthermore the term arc or angle of rotation includes arcs or angles greater than 360°.

While the invention has been described in connection with particular embodiments thereof and in connection with particular uses thereof, various modifications of the invention and various uses thereof will occur to those skilled in the art without departing from the spirit and scope of the invention as set forth in the appended claims.

What is claimed is:

1. In a data conversion system having a rotatable element and a plurality of electrical circuits, a transducer associated with said rotatable element for providing in said electrical circuits a plurality of electrical impulses in unique combinations each representative, in binary digital code, of a discrete angular disposition of said rotatable element, said transducer comprising a first code wheel assembly arranged to rotate at a predetermined speed relative to said rotatable element, said first code wheel assembly comprising a plurality of circular code elements each adapted to provide a pair of electrical paths, each code element of said first assembly having a track formed by a respectively different even number of segments, alternate segments belonging to different paths, a second code wheel assembly arranged to rotate at a higher predetermined speed relative to said rotatable element, said second code wheel assembly comprising a respective code element for each of the code elements of said first assembly, each of the code elements of said second assembly having a pair of conductive segments each extending through respective approximately 180° arcs and being insulated from each other, first brush means for coupling each path of each of the code elements of said first assembly to a respective one of a first group of said electrical circuits, second brush means for intercoupling the track of each code element of the first assembly with the corresponding code element of the second assembly, and third brush means for coupling each of the code elements of said second assembly to a respective one of said electrical circuits, the relative speeds of rotation of said code wheel assemblies and said rotatable element being selected so that each of said electrical circuits of said first group which is associated with a different code element is opened and closed a respectively different number of times for a predetermined arc of rotation of said rotatable element for producing said electrical impulses in said last mentioned electrical circuits.

2. In a data conversion system having a rotatable element and a plurality of electrical circuits, a transducer associated with said rotatable element for providing in said electrical circuits a plurality of electrical impulses in unique combinations each representative, in binary digital code, of a discrete angular disposition of said rotatable element, said transducer comprising a first code wheel assembly arranged to rotate at a predetermined speed relative to said rotatable element, said first code wheel assembly comprising a plurality of circular code elements each adapted to provide a pair of electrical paths, each code element of said first assembly having a track formed by a respectively different even number of segments, alternate segments belonging to different paths, a second code wheel assembly arranged to rotate at a higher predetermined speed relative to said rotatable element, said second code wheel assembly comprising a respective code element for each of the code elements of said first assembly, each of the code elements of said second assembly having a pair of conductive segments each extending through respective approximately 180° arcs and being insulated from each other, first brush means for coupling a respective one of the paths of each of the code elements of said first assembly to a respective electrical circuit of a first group of said electrical circuits, second brush means for coupling the other respective path of each of the code elements of said first assembly to a respective electrical circuit of a second group of said electrical circuits, third brush means for intercoupling the track of each code element of the first assembly with the corresponding code element of the second assembly, and fourth brush means for coupling each of the code elements of said second assembly to a respective electrical circuit of a third group of said electrical circuits, the relative speeds of rotation of said code wheel assemblies and said rotatable element being selected so that each of the electrical circuits of said third group is connected alternately to respective electrical circuits of said first and second groups a respectively different number of times for a predetermined arc of rotation of said rotatable element thereby to produce said electrical impulses in said first and second groups of electrical circuits.

3. In a data conversion system having a rotatable element, a source of a first plurality of electrical impulses in unique combinations each representative, in binary digital impulse code, of a desired discrete angular disposition of said rotatable element and transducer means associated with said rotatable element for generating a second and like plurality of electrical impulses in unique combinations each representative, in binary digital impulse code, of a discrete angular disposition of said rotatable element; means for comparing said first and second electrical impulses, for sensing difference in the combination thereof and for controlling an electrical quantity representative of said differences; said latter means comprising a pair of electrical circuits for each of the digits of a code combination, each of said electrical circuits having an open condition and a closed condition each corresponding respectively to a binary impulse of said code; means for connecting one electrical circuit of each pair to said source and the other electrical circuit of each pair to said transducer whereby each of said electrical circuits will assume the condition thereof corresponding to the binary impulse applied thereto; driving means responsive to said electrical quantity and adapted to rotate said rotatable element; a plurality of electrical connecting mechanisms, one for each of said pairs of electrical circuits, each of said connecting mechanisms having at least two conditions one of which is assumed when a difference exists in the conditions of the electrical circuits forming the pair associated therewith; means intercoupling said driving means and a first one of said connecting mechanisms and arranged to control the application of said electrical quantity to said driving means when said first connecting mechanism is in a condition thereof responsive to a difference in condition of the associated electrical circuits; and means for sequentially and progressively connecting said first connecting mechanism with the other connecting mechanisms, which are not in a condition thereof responsive to a difference in condition of the associated electrical circuits, until connection is made with any connecting mechanism which is in such condition, said last mentioned means being adapted to control the application of said electrical quantity to said driving means in response to assumption, by such succeeding one of said connecting mechanism, of a condition responsive to a difference in condition of the electrical circuits associated therewith.

4. In a data conversion system having a rotatable element, a source of a first plurality of electrical impulses in unique combinations each representative, in binary digital impulse code, of a desired discrete angular disposition of said rotatable element and transducer means associated with said rotatable element for generating a second and like plurality of electrical impulses in unique combinations each representative, in binary digital impulse code, of a discrete angular disposition of said rotatable element; means for comparing said first and second electrical impulses, for sensing differences in the combination thereof and for providing an electrical quantity representative of said differences; said latter means comprising a pair of electrical circuits for each of the digits of a code combination, each of said electrical circuits having an open condition and a closed condition each corresponding respectively to a binary impulse of said code; means for connecting one electrical circuit of each pair to said source and the other electrical circuit of each pair to said transducer whereby each of said electrical circuits will assume the condition thereof corresponding to the binary impulse applied thereto; driving means responsive to said electrical quantity and adapted to rotate said rotatable element; a plurality of electrical connecting mechanisms, one for each of said pairs of electrical circuits, each of said connecting mechanism having three conditions two of which are selectively assumed when respective differences exist in the electrical circuits forming the pair associated therewith; means intercoupling said driving means and a first one of said connecting mechanisms and arranged to apply said electrical quantity to said driving means when said first connecting mechanism is in one of said two conditions thereof; and means for sequentially and progressively connecting said first connecting mechanism with the other connecting mechanisms, which are not in one of said two conditions thereof, until connection is made with any connecting mechanism which is in one of said two con ditions, said last mentioned means being adapted to apply said electrical quantity to said driving means in response to assumption, by such succeeding one of said relay means, of one of said two conditions thereof.

5. In a data conversion system having a rotatable element, a source of a first plurality of electrical impulses in unique combinations each representative, in binary digital impulse code, of a desired discrete angular disposition of said rotatable element and transducer means associated with said rotatable element for generating a second and like plurality of electrical impulses in unique combinations each representative, in binary digital impulse code, of a discrete angular disposition of said rotatable element; means for comparing said first and second electrical impulses, for sensing differences in the combination thereof and for providing an electrical quantity representative of said differences; said latter means comprising a pair of electrical circuits for each of the digits of a code combination, each of said electrical circuits having an open condition and a closed condition each corresponding respectively to a binary impulse of said code; means for connecting one electrical circuit of each pair to said source and the other electrical circuit of each pair to said transducer whereby each of said electrical circuits will assume the condition thereof corresponding to the binary impulse applied thereto; a plurality of relay means, one for each of said pairs of electrical circuits, each of said relay means being adapted to assume a connecting condition when a difference in condition exists in the electrical circuits forming the pair associated therewith; driving means responsive to said electrical quantity and adapted to rotate said rotatable element, means intercoupling said driving means and a first one of said relay means and arranged to apply said electrical quantity to said driving means when said first relay means is in a connecting condition thereof; and means for sequentially and progressively connecting said first relay means with the other relay means which are not in a connecting condition until connection is made with any relay means which is in a connecting condition, said last mentioned means being adapted to apply said electrical quantity to said driving means in response to assumption of a connecting condition by such suceeding one of said relay means.

6. In a data conversion system having a rotatable element, a source of a first plurality of electrical impulses in unique combinations each representative, in binary digital impulse code, of a desired discrete angular disposition of said rotatable element and transducer means associated with said rotatable element for generating a second and like plurality of electrical impulses in unique combinations each representative, in binary digital impulse code, of a discrete angular disposition of said rotatable element; means for comparing said first and second electrical impulses, for sensing differences in the combination thereof and for providing an electrical quantity representative of said differences; said latter means comprising a pair of electrical circuits for each of the digits of a code combination, each of said electrical circuits having an open condition and a closed condition each corresponding respectively to a binary impulse of said code; means for connecting one electrical circuit of each pair to said source and the other electrical circuit of each pair to said transducer whereby each of said electrical circuits will assume the condition thereof corresponding to the binary impulse applied thereto; a plurality of relay means, one for each of said pairs of electrical circuits, each of said relay means being adapted to assume a predetermined condition when a difference in condition exists in the electrical circuits forming the pair associated therewith; driving means responsive to said electrical quantity and adapted to rotate said rotatable element; means intercoupling said driving means and a first one of said relay means and arranged to apply said electrical quantity to said driving means when said first relay means is in said predetermined condition thereof; and means for sequentially and progressively connecting said first relay means with the other relay means which are not in said predetermined condition until connection is made with any relay means which is in said predetermined condition, said last mentioned means being adapted to apply to said electrical quantity to said driving means in response to assumption of said predetermined condition by such succeeding one of said relay means.

7. In a data conversion system having a rotatable element, a source of a first plurality of electrical impulses in unique combinations each representative, in binary digital impuse code, of a desired discrete angular disposition of said rotatable element and transducer means associated with said rotatable element for generating a second and like plurality of electrical impulses in unique combinations each representative, in binary digital impulse code, of a discrete angular disposition of said rotatable element; means for comparing said first and second electrical impulses, for sensing differences in the combination thereof and for providing an electrical quantity representative of said differences; said latter means comprising a pair of electrical circuits for each of the digits of a code combination, each of said electrical circuits having an open condition and a closed condition each corresponding respectively to a binary impulse of said code; means for connecting one electrical circuit of each pair to said source and the other electrical circuit of each pair to said transducer whereby each of said electrical circuits will assume the condition thereof corresponding to the binary impulse applied thereto, a first group of relays each arranged to be energized through a respective one of the electrical circuits connected to said source; a second group of relays each arranged to be energized through a respective one of the electrical circuits connected to said transducer; driving means including an electric motor arranged to rotate said rotatable element; control means responsive to a difference in energized conditions of a first relay of each group associated with a first pair of said electrical circuits for applying an operating potential to said electric motor in a sense determined by the energized one of the first relays; and means responsive to a similarity in energized conditions of said first relays for sequentially and progressively connecting said control means with the other relays of said second group until connection is made with a relay of said second group which is in a different energized condition than the relay of the first group associated therewith, said last mentioned means being adapted to cause said control means to apply an operating potential to said electric motor in a sense determined by the energized one of said latter associated relays which are in different energized conditions.

8. In a data conversion system having a rotatable element, a source of first plurality of electrical impulses in unique combinations each representative, in binary digital impulse code, of a desired discrete angular disposition of said rotatable element and transducer means associated with said rotatable element for generating a second and like plurality of electrical impulses in unique combinations each representative, in binary digital impulse code, of a discrete angular disposition of said rotatable element; means for comparing said first and second electrical impulses, for sensing differences in the combination thereof and for providing an electrical quantity representative of said differences; said latter means comprising a pair of electrical circuits for each of the digits of a code combination, each of said electrical circuits having an open condition and a closed condition each corresponding respectively to a binary impulse of said code; means for connecting one electrical circuit of each pair to said source and the other electrical circuit of each pair to said transducer whereby each of said electrical circuits will assume the condition thereof corresponding to the binary impulse applied thereto, a first group of relays each arranged to be energized through a respective one of the electrical circuits connected to said source; a second group of relays each arranged to be energized through a respective one of the electrical circuits connected to said transducer; driving means including an electric motor arranged to rotate said rotatable element; control means responsive to a difference in energized conditions of a first relay of each group associated with a first pair of said electrical circuits for applying an operating potential to said electric motor in a sense determined by the energized one of the first relays; means responsive to a similarity in energized conditions of said first relays for sequentially and progressively connecting said control means with the other relays of said second group until connection is made with a relay of said second group which is in a different energized condition than the relay of the first group associated therewith, said last mentioned means being adapted to cause said control means to apply an operating potential to said electric motor in the same sense; and relay means responsive to a predetermined combination of conditions in a plurality of associated relays of the first and second groups for reversing the sense in which the operating potential is applied to said electric motor.

9. In a data conversion system having a rotatable element, a source of a first plurality of electrical impulses in unique combinations each representative, in binary digital impulse code, of a desired discrete angular disposition of said rotatable element, said source comprising a first plurality of switching means; transducer means comprising a second and like plurality of switching means and being associated with said rotatable element for generating a second and like plurality of electrical impulses in unique combinations each representative, in binary digital impulse code, of a discrete angular disposition of said rotatable element; each of the first switching means being associated with a respective one of the second switching means, and each of the switching means having a first condition and a second condition each corresponding respectively to a binary impulse of said code; voltage responsive driving means adapted to rotate said rotatable element; control means responsive to a difference in condition of a selected one of said first switching means and the associated second switching means for applying a voltage to said driving means; and means responsive to a similarity in condition of the selected first switching means and associated second switching means for sequentially and progressively connecting said control means with other ones of said switching means until connection is made with a switching means which is in a different condition than the switching means of the other group associated therewith, said last mentioned means being adapted to cause said control means to apply an operating potential to said driving means while the connected switching means and associated switching means of the other group are in different conditions.

10. In a data conversion system having a rotatable element, a source of a first plurality of electrical impulses in unique combinations each representative, in binary digital impulse code, of a desired discrete angular disposition of said rotatable element, said source comprising a first plurality of switching means; transducer means comprising a second and like plurality of switching means and being associated with said rotatable element for generating a second and like plurality of electrical impulses in unique combinations each representative, in binary digital impulse code, of a discrete angular disposition of said rotatable element; each of the first switching means being associated with a respective one of the second switching means, and each of the switching means having a first condition and a second condition each corresponding respectively to a binary impulse of said code; voltage responsive driving means adapted to rotate said rotatable element; control means responsive to a difference in condition of a selected one of said first switching means and the associated second switching means for applying a voltage to said driving means; and means responsive to a similarity in condition of the selected first switching means and associated second switching means for sequentially and progressively connecting said control means with other ones of said switching means until connection is made with a switching means which is in a different condition than the switching means of the other group associated therewith, said last mentioned means being adapted to cause said control means to apply an operating potential to said driving means while the connected switching means and associated switching means of the other group are in different conditions, said control means being adapted to apply said operating potential to said driving means in a sense to cause said rotatable element to rotate in a direction to decrease differences between the combinations of the first plurality of electrical impulses and the combinations of the second plurality of electrical impulses.

11. A data conversion system, comprising a rotatable element, an electric motor coupled to said rotatable element for rotating the latter, and manually operable switching means for supplying an operating potential to said electric motor, said switching means comprising a manually rotatable shaft, a first radially extending block member affixed to said shaft and arranged to rotate therewith, a pair of scissor arms pivotally mounted on said shaft adjacent the point of crossing of said scissor arms, one end of each scissor arm being adapted normally to engage said first block member, a second radially extending block member arranged to rotate with said rotatable element and being disposed adjacent the other ends of said scissor arms, an insulating member pivotally carried by said second block member and being disposed between said other ends of said scissor arms, first cooperating contact means carried by said insulating member and by one of said scissor arms, second cooperating contact means carried by said insulating member and by the other of said scissor arms, said contact means being normally open, each of said contact means being adapted to be closed upon engagement of the associated scissor arm and the insulating block responsive to rotation of the shaft in a respective direction, first circuit means intercoupling a source of operating potential and said contact means, and second circuit means intercoupling said contact means and said electric motor whereby rotation of said shaft causes said electric motor to rotate said rotatable element by an amount proportional to the extent of rotation of said shaft and in a direction determined by the direction of rotation of said shaft.

12. A shaft turning mechanism comprising a first rotatable shaft, an electric motor coupled to said first shaft for rotating the latter, and manually operable switching means for supplying an operating potential to said electric motor, said switching means comprising a second and manually rotatable shaft, a first radially extending block member affixed to said second shaft and arranged to rotate therewith, a pair of scissor arms pivotally mounted on said second shaft adjacent the point of crossing of said scissor arms, said scissor arms being spring urged together whereby one end of each scissor arm is adapted normally to engage said first block member, a second radially extending block member arranged to rotate with said first shaft and extending to a point adjacent the other ends of said scissor arms, an insulating member pivotally carried by said second block member and being disposed between said other ends of said scissor arms, first cooperating normally open contact means carried by said insulating member and by one of said scissor arms, second cooperating normally open contact means carried by said insulating member and by the other of said scissor arms, each of said contact means being adapted to be closed upon engagement of the associated scissor arm and the insulating block responsive to rotation of the second shaft in a respective direction, limiting means for preventing separation of said scissor arms by more than a predetermined angle, first circuit means intercoupling a source of operating potential and said contact means, and second circuit means intercoupling said contact means and said electric motor whereby rotation of said second shaft causes said electric motor to rotate said first shaft by an amount proportional to the extent of rotation of said second shaft and in a direction determined by the direction of rotation of said second shaft.

13. In a data conversion system having a rotatable element and a plurality of electrical circuits, a transducer associated with said rotatable element for providing in said electrical circuits a plurality of electrical impulses in unique combinations each representative, in binary digital code, of a discrete angular disposition of said rotatable element, said transducer comprising a code wheel assembly arranged to rotate at a predetermined speed relative to said rotatable element, said code wheel assembly comprising a plurality of circular code elements each adapted to provide a pair of electrical paths, each code element of said assembly having a track formed by a respectively different even number of segments, alternate segments belonging to different paths, a first group of brushes arranged in pairs, each pair of brushes wiping a respective code element and each brush in each pair wiping a respective path to provide an individual electrical connection to such path of the associated code element, and a second group of brushes each arranged to wipe the track of a respective code element.

14. In a data conversion system having a rotatable element and a plurality of electrical circuits, a transducer associated with said rotatable element for providing in said electrical circuits a plurality of electrical impulses in unique combinations each representative, in binary digital code, of a discrete angular disposition of said rotatable element, said transducer comprising a code wheel assembly arranged to rotate at a predetermined speed relative to said rotatable element, said code wheel assembly comprising a plurality of circular code elements each providing a pair of electrical paths, each code element of said assembly having a track formed by a respectively different even number of segments, alternate segments belonging to different paths, first brush means for providing an individual electrical connection to each path of each code element, and second brush means for providing an individual electrical connection to each track of each code element, said track and each of said paths of each code wheel being included in an individual one of said electrical circuits, the relative speeds of rotation of said code wheel assembly and said rotatable element being selected so that said individual electrical circuits associated with different ones of said code elements are opened and closed a respectively different number of times for a predetermined arc of rotation of said rotatable element whereby said electrical impulses are produced in said individual electrical circuits.

15. A data conversion system, comprising a rotatable member, means for producing a first plurality of electrical indications in unique combinations each representative in binary digital code of a desired discrete angular dispostion of said rotatable member, transducer means associated with said rotatable member for generating a second plurality of electrical indications in unique combinations each representative in binary digital code of a discrete angular disposition of said rotatable member, said transducer means comprising a code wheel assembly including a plurality of circular code elements each providing a pair of electrical paths, each code element of said assembly having a track formed by a respectively different even number of segments, alternate segments being included in different paths, a first group of brushes arranged in pairs, each pair of brushes wiping a respective code element and each brush in each pair wiping a respective path to provide an individual electrical connection to such path and a second group of brushes each arranged to wipe the track of a respective code element, means to derive said second plurality of electrical indications from said second group of brushes, means for comparing said first and second electrical indications, for sensing differences in the combinations thereof and for providing an electrical quantity representative of said differences, and means responsive to said electrical quantity for rotating said rotatable member until the electrical indication generated by said transducer means matches the electrical indication produced by said first mentioned means.

16. A data conversion system, comprising a rotatable member, means for producing a first plurality of electrical indications in unique combinations each representative in binary digital code of a desired discrete angular disposition of said rotatable member, transducer means associated with said rotatable member for generating a second plurality of electrical indications in unique combinations each representative in binary digital code of a discrete angular disposition of said rotatable member, said transducer means comprising a code wheel assembly including a plurality of circular code elements each providing a pair of electrical paths, each code element of said assembly having a track formed by a respectively different even number of segments, alternate segments being included in different paths, a first group of brushes arranged in pairs, each pair of brushes wiping a respective code element and each brush in each pair wiping a respective path to provide an individual electrical connection to such path and a second group of brushes each arranged to wipe the track of a respective code element to provide an individual electrical connection to such track, means to derive said second plurality of electrical indications from said second group of brushes, means for comparing said first and second electrical indications, for sensing differences in the combinations thereof and for providing an electrical voltage representative of said differences, and means responsive to the polarity of said electrical voltage for rotating said rotatable member until the electrical indication generated by said transducer means matches the electrical indication produced by said first mentioned means.

References Cited in the file of this patent

UNITED STATES PATENTS

| | | |
|---|---|---|
| 2,023,221 | Fischer et al. | Dec. 3, 1935 |
| 2,318,591 | Couffignal | May 11, 1943 |
| 2,397,604 | Hartley et al. | Apr. 2, 1946 |
| 2,476,673 | May et al. | July 19, 1949 |
| 2,554,171 | Brunot et al. | May 22, 1951 |
| 2,620,980 | Brown | Dec. 9, 1952 |
| 2,620,981 | Benson et al. | Dec. 9, 1952 |
| 2,630,481 | Johnson | Mar. 3, 1953 |
| 2,643,355 | Hallman, Jr. | June 23, 1953 |
| 2,666,912 | Gow | Jan. 19, 1954 |
| 2,685,054 | Brenner et al. | July 27, 1954 |
| 2,710,934 | Senn | June 14, 1955 |
| 2,713,680 | Ackerlind | July 19, 1955 |
| 2,798,994 | Dicke | July 9, 1957 |